(12) United States Patent
Giaquinta et al.

(10) Patent No.: US 11,099,449 B1
(45) Date of Patent: Aug. 24, 2021

(54) EC DEVICES WITH NANOSTRUCTRED THIN FILM ANODES

(71) Applicant: KINESTRAL TECHNOLOGIES, INC., Hayward, CA (US)

(72) Inventors: Daniel Giaquinta, South San Francisco, CA (US); Hye-Jin Choi, South San Francisco, CA (US); John Roudebush, South San Francisco, CA (US); Brian Wiers, South San Francisco, CA (US); Ellen Murphy, South San Francisco, CA (US); Howard Turner, South San Francisco, CA (US)

(73) Assignee: KINESTRAL TECHNOLOGIES, INC., Hayward, CA (US)

( * ) Notice: Subject to any disclaimer, the term of this patent is extended or adjusted under 35 U.S.C. 154(b) by 0 days.

(21) Appl. No.: 15/691,293

(22) Filed: Aug. 30, 2017

Related U.S. Application Data

(60) Provisional application No. 62/381,373, filed on Aug. 30, 2016.

(51) Int. Cl.
| G02F 1/1523 | (2019.01) |
| G02F 1/153 | (2006.01) |
| G02F 1/1524 | (2019.01) |

(52) U.S. Cl.
CPC ........... *G02F 1/1525* (2013.01); *G02F 1/153* (2013.01); *G02F 1/15245* (2019.01)

(58) Field of Classification Search
CPC ....... G02F 1/1525; G02F 1/153; G02F 1/1527
USPC .......................... 359/265–275, 900; 345/105
See application file for complete search history.

(56) References Cited

U.S. PATENT DOCUMENTS

| 2013/0182307 A1* | 7/2013 | Gillaspie | .................. C09K 9/00 |
| | | | 359/265 |
| 2016/0216588 A1* | 7/2016 | Ah | .......................... G02F 1/155 |

* cited by examiner

*Primary Examiner* — Tuyen Tra
(74) *Attorney, Agent, or Firm* — Womble Bond Dickinson (US) LLP

(57) ABSTRACT

A method of manufacturing a thin film is provided. The method includes providing a plurality of crystalline anodic electrochromic particles, size-reducing the crystalline anodic electrochromic particles by grinding to produce crystalline hexagonal tungsten trioxide nanostructures, and coating the crystalline anodic electrochromic nanostructures onto a substrate to produce a thin film. An electrochromic multi-layer stack is also provided.

14 Claims, 28 Drawing Sheets

Hexacyanometallate

NASICON

LiFePO₄

Rock Salt

LiNiO$_2$

Li$_3$Ni$_2$SbO$_6$

Li$_3$Ni$_2$NbO$_6$

NaNiO$_2$

Na$_2$Ni$_2$TeO$_6$

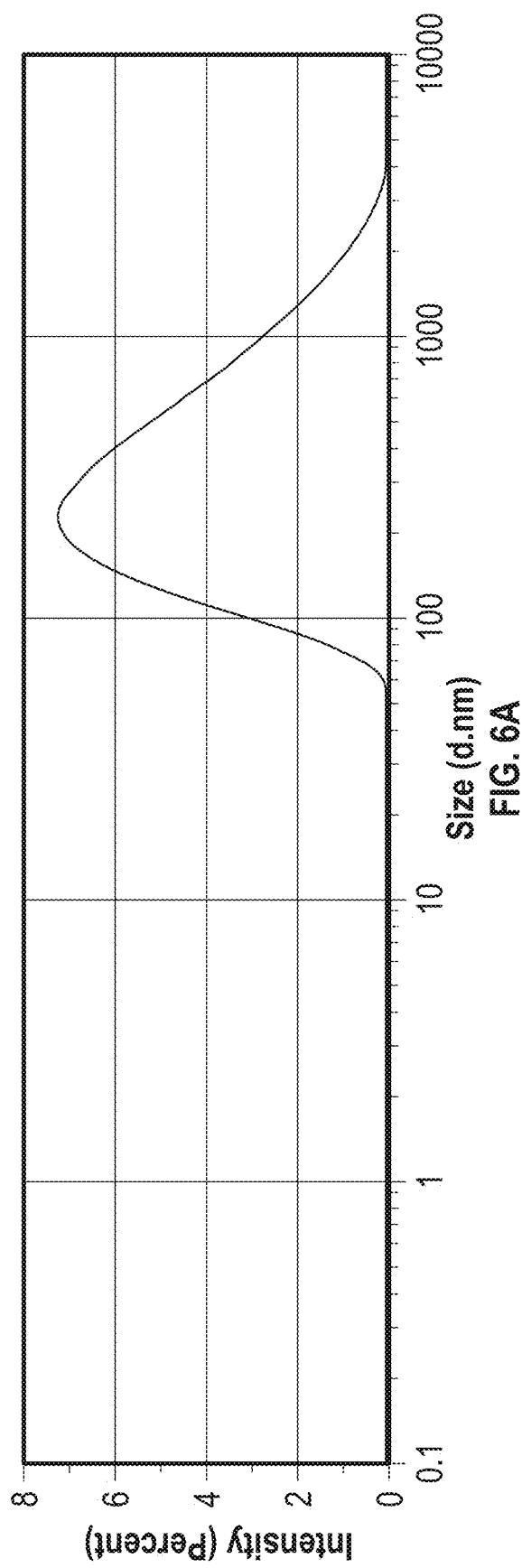
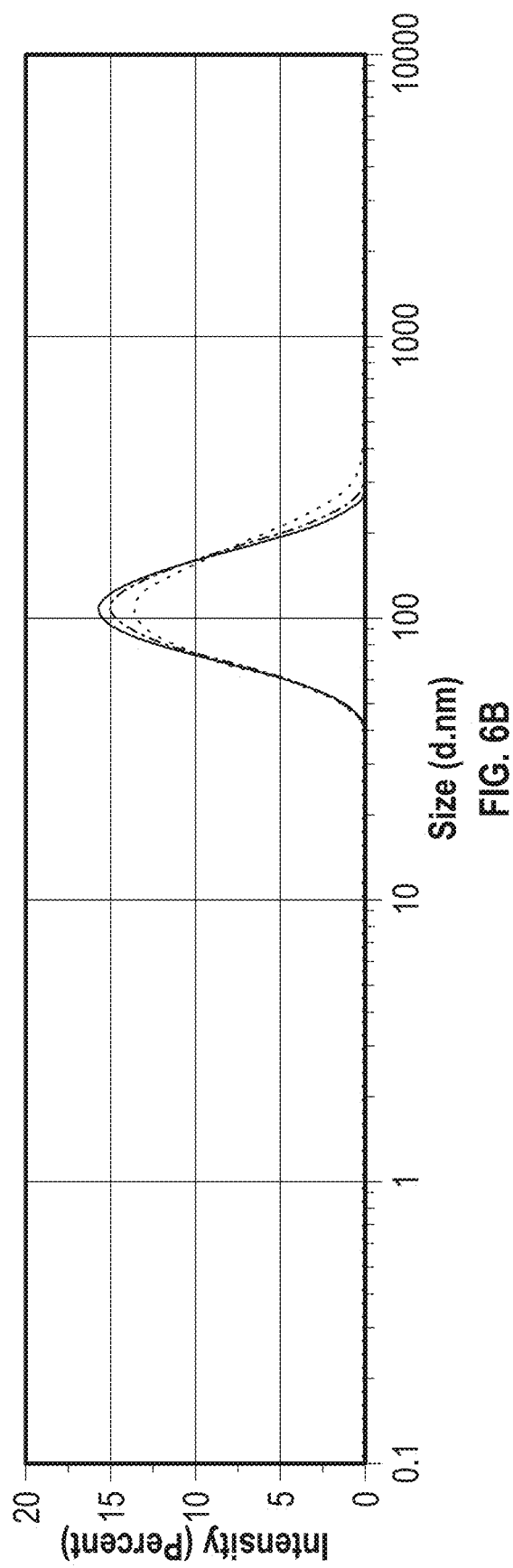
FIG. 6A
FIG. 6B

EC DEVICES WITH NANOSTRUCTRED THIN FILM ANODES

FIELD OF INVENTION

The present disclosure generally relates to thin films of crystalline anodic electrochromic nanostructures and methods for preparing the nanostructures, thin films, electrochromic multi-layer stacks and electrochromic devices. This disclosure also relates to the different properties of the thin films and electrochromic devices containing the crystalline anodic electrochromic nanostructures.

BACKGROUND

Metal oxide materials are useful for their electrochemical and electrochromic (EC) behavior, and they are widely used in both electrochemical and EC devices. Variables that include synthesis methods, deposition techniques, deposition atmospheres and temperatures in addition to composition are critical to electrochemical and EC performance and there are many different synthesis methods and deposition techniques and compositions of metal oxides that have been used to prepare electrochemical and EC devices.

Commercial switchable glazing devices, also commonly known as smart windows and EC window devices, are well known for use as mirrors in motor vehicles, aircraft window assemblies, sunroofs, skylights, and architectural windows. Such devices may comprise, for example, active inorganic EC layers, organic EC layers, inorganic, ion-conducting layers, organic, ion-conducting layers and hybrids of these sandwiched between two conducting layers. When a voltage is applied across these conducting layers the optical properties of a layer or layers in between change. Such optical property changes typically include a modulation of the transmissivity of the visible portion or the solar sub-portion of the electromagnetic spectrum.

The broad adoption of EC window devices in the construction and automotive industries will require a ready supply of low cost, aesthetically appealing, durable products in large area formats. EC window devices based on metal oxides represent the most promising technology for these needs. Typically, such devices comprise two EC materials (a cathode and an anode) separated by an ion-conducting film and sandwiched between two transparent conducting oxide (TCO) layers. In operation, a voltage is applied across the device that causes current to flow in the external circuit, and causes oxidation and reduction of the electrode materials. During this process, charge balance is maintained by mobile cations entering and leaving the electrodes. This facile electrochemical process causes the window to reversibly change from a more bleached (e.g., a relatively greater optical transmissivity) to a more darkened state (e.g., a relatively lesser optical transmissivity).

EC devices often may utilize a combination of two types of EC materials, one of which becomes optically less transmissive (e.g., takes on color) in its electrochemically oxidized state while the other becomes optically less transmissive (e.g., takes on color) in its electrochemically reduced state. Such a device where both anodic and cathodic EC materials can simultaneously darken or bleach may be called a complementary EC device. For example, nickel oxide assumes a dark color in its electrochemically oxidized state and becomes lightly colored by reduction, while tungsten trioxide assumes a blue color in its electrochemically reduced state and becomes colorless by oxidation. When the two are used as separate EC layers separated by an ion conductor layer in a multi-layer stack, the stack may be reversibly cycled between a dark color (when the nickel oxide material is in its electrochemically oxidized state and tungsten trioxide is in its reduced state) and a transparent state (when the nickel oxide material is in its electrochemically reduced state and tungsten trioxide is in its electrochemically oxidized state) by application of an appropriate voltage across the stack.

Some substrates, especially low temperature and other flexible substrates, have previously precluded the use of conventional solid state synthesis methods for the preparation of some crystalline EC materials. For example, mixed metal oxides, including lithium nickel oxides, tellurates, phosphates, pyrophosphates and others may require high temperatures when preparing single phase crystalline materials, especially when using conventional solid state techniques. Regardless of the exact synthetic method however, in some cases the need for high temperatures has taught away both from certain synthesis techniques and implicitly from crystallinity because of the inability of even glass substrates to tolerate the synthesis and processing temperatures commonly required.

Metal oxides including lithium nickel oxide materials have been used extensively in electrochemical and EC devices (Kalyani and Kalaiselvi Sci. Technol. Adv. Mater. 2005, 6, 689, and Niklasson and Granqvist J. Mater. Chem. 2007, 17, 127). In general, battery materials are often comprised of powders and less commonly thin films. In those cases where thin films are preferred, the temperatures required to crystallize single phase materials precludes the use of certain substrates and/or synthetic methods. This issue is even more important in the case of EC applications which are commonly thin film-based. For these materials, substrate stabilities will limit the range of temperatures which may be utilized to prepare materials. Furthermore, the nature of EC devices requires the existence of a highly transmissive state that may be modulated to a less transmissive state through the transfer of electrons and ions. In the case of battery materials, electronic and ionic mobility between particles is commonly facilitated by the use of carbon. This method is less feasible in thin film EC materials where a highly transmissive state is required. Finally, in the preparation of thin film materials, additives such as binders are commonly employed to improve film integrity and film-to-substrate adhesion. For example, batteries have been produced using particulate lithium metal oxide ($Li_xM_yO2$ with $0.623 \leq y \leq 0.85$, $0 \leq x+y \leq 2$, and M=Al, Ti, V, Cr, Mn, Fe, Co, Ni, Cu, Zn, Zr, Nb, Mo, Ru, Sn, and/or Sb) mixed with carbon black and a PTFE binder. [MIT, US20140099549A1]

Mixed metal oxides including lithium nickel oxide materials doped with at least one other metal have also been used in electrochemical and EC devices. In certain instances, the addition of a third metal (or more) has been useful to impact characteristics such as structural stability upon cycling or total capacity. In other instances, the addition of a third metal (or more) has been useful to impact optical characteristics such as transmissivity or color. Examples of doped lithium nickel oxide materials include Li—Ni—Ti—Mo—O materials described by Lee et al. (Energy Environ Sci. 2015, 8 3255) and lithium nickel oxides described by Choi et al. (provisional U.S. patent appl. 62/028,257 KNSTRL 14-3000).

BRIEF DESCRIPTION OF THE DRAWINGS

To facilitate further description of the embodiments, the following drawings are provided in which:

FIGS. 6a and 6b show particle size distribution (PSD) of $Li_{1.186}Ni_{0.417}Sb_{0.396}O_2$ after milling, washing, and separating from the washing fluid. FIG. 6a shows the PSD of the particles size-reduced in water solvent, and FIG. 6b shows the PSD of the particles size-reduced in 1-propanol solvent.

Figure 1:
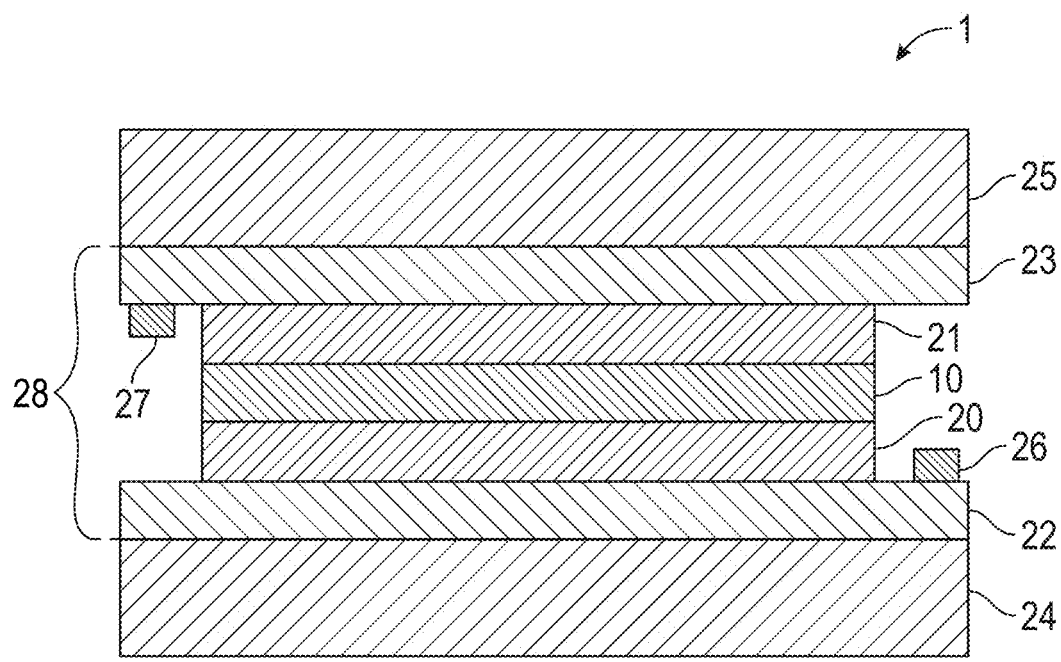
FIG. 1 depicts a cross-sectional structural diagram of electrochromic (EC) device.
Figure 2A:
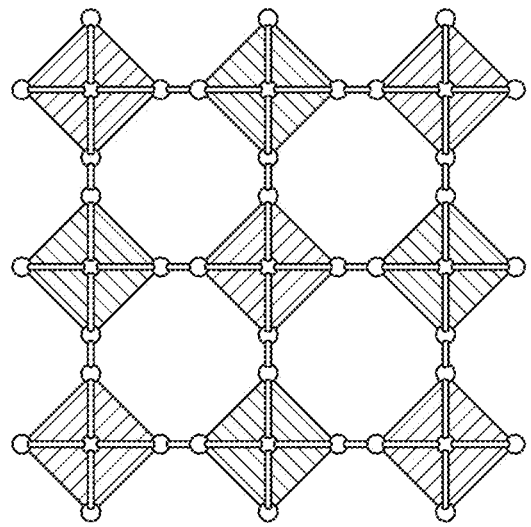
FIGS. 2a-2i illustrate some examples of different structure types for crystalline anodic EC nanostructures.
Figure 2B:
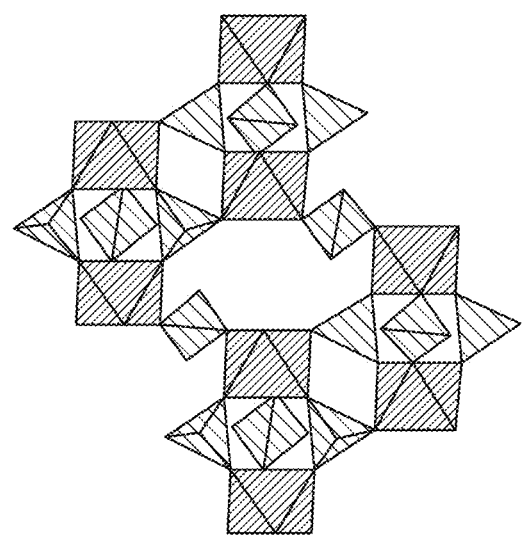
Figure 2C:
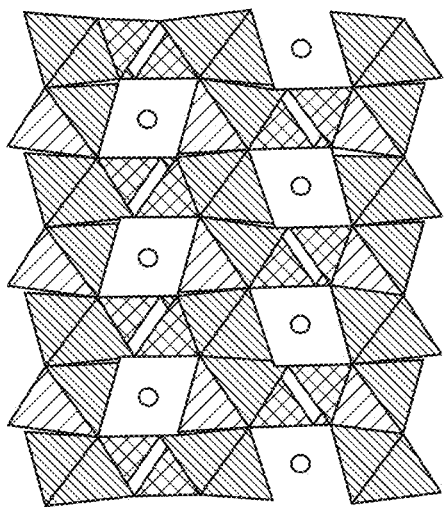
Figure 2D:
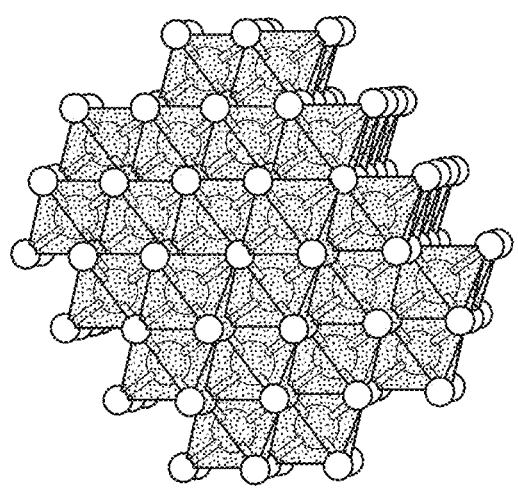
Figure 2E:
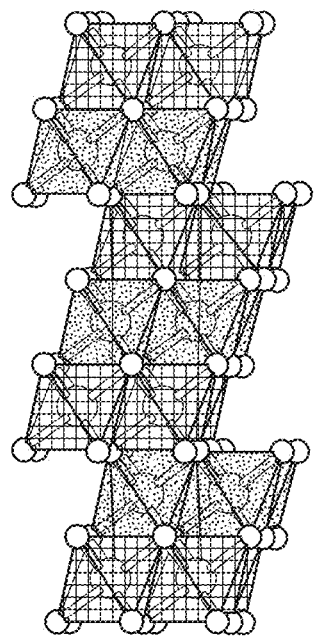
Figure 2F:
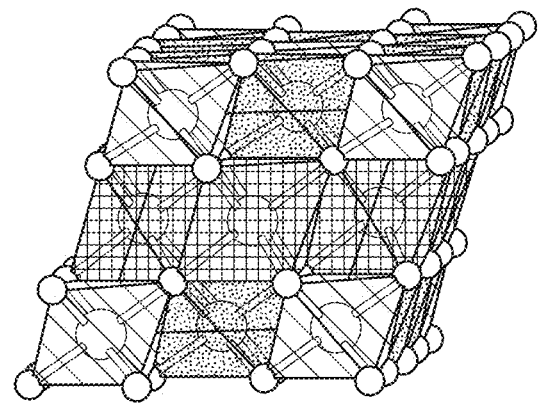
Figure 2G:
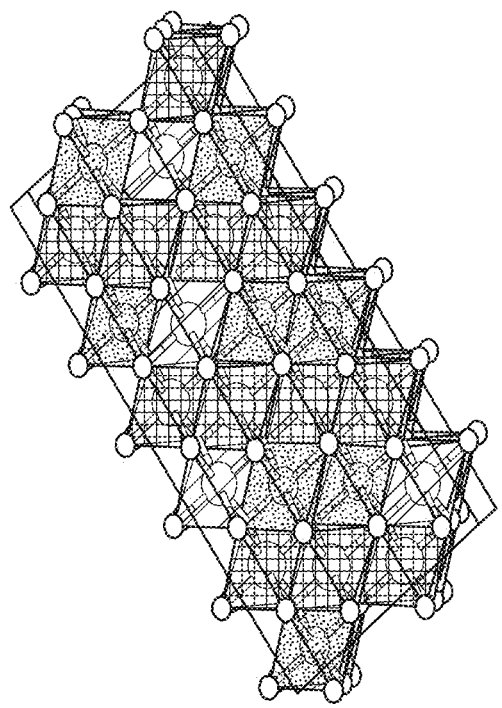
Figure 2H:
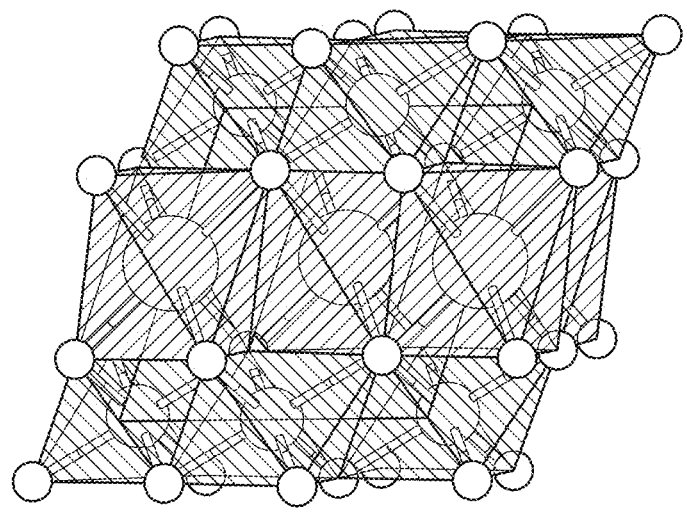
Figure 2I:
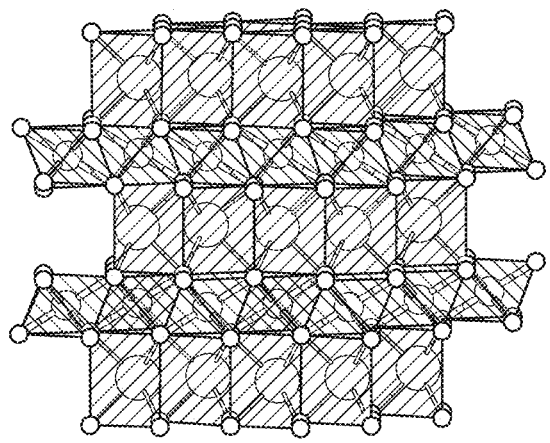

Corresponding reference characters indicate corresponding parts throughout the drawings. Additionally, relative thicknesses of the layers in the different figures do not represent the true relationship in dimensions. For example, the substrates are typically much thicker than the other layers. The figures are drawn only for the purpose to illustrate connection principles, not to give any dimensional information.

Abbreviations and Definitions

The following definitions are provided to better define the embodiments of the present disclosure and to guide those of ordinary skill in the art in the practice of the present disclosure. Unless otherwise noted, terms are to be understood according to conventional usage by those of ordinary skill in the relevant art.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that an activity, process, method, system, article, device, or apparatus that comprises a list of elements is not necessarily limited to those elements, but may include other elements not expressly listed or inherent to such activity, process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the disclosure described herein are, for example, capable of operation in other orientations than those illustrated or otherwise described herein.

The terms "couple," "coupled," "couples," "coupling," and the like should be broadly understood and refer to connecting two or more elements or signals, electrically, ionically, mechanically and/or otherwise. Two or more electrical elements may be electrically coupled but not be mechanically or otherwise coupled; two or more mechanical elements may be mechanically coupled, but not be electrically or otherwise coupled; two or more electrical elements may be mechanically coupled, but not be electrically or otherwise coupled. Coupling may be for any length of time (e.g., permanent or semi-permanent or only for an instant).

"Electrical coupling" and the like should be broadly understood and include coupling involving any electrical signal, whether a power signal, a data signal, and/or other types or combinations of electrical signals.

"Ionic coupling" and the like should be broadly understood and include coupling involving or permitting the transfer of ions between discrete layers or compositions.

"Mechanical coupling" and the like should be broadly understood and include mechanical coupling of all types.

The absence of the word "removably," "removable," and the like near the word "coupled," and the like does not mean that the coupling, etc. in question is or is not removable.

The terms "anodic electrochromic (EC) layer" and "anodic electrochromic (EC) material" refer to an electrode layer or electrode material, respectively, that upon the removal of ions and electrons becomes less transmissive to electromagnetic radiation.

The term "bleach" refers to the transition of an EC material from a first optical state to a second optical state wherein the first optical state is less transmissive than the second optical state.

The term "bleached state voltage" refers to the open circuit voltage ($V_{oc}$) of the anodic EC layer versus Li/Li+ in an electrochemical cell in a propylene carbonate solution containing 1M lithium perchlorate when the transmissivity of said layer is at 95% of its "fully bleached state" transmissivity.

The term "fully bleached state" as used in connection with an anodic EC material refers to the state of maximum transmissivity of an anodic EC layer in an electrochemical cell at or above 1.5V versus Li/Li+ in a propylene carbonate solution containing 1 M lithium perchlorate at 25° C. (under anhydrous conditions and in an Ar atmosphere).

The terms "cathodic EC layer" and "cathodic EC material" refer to an electrode layer or electrode material, respectively, that upon the insertion of ions and electrons becomes less transmissive to electromagnetic radiation.

The term "coloration efficiency" or "CE" refers to a property of an EC layer that quantifies how a layer's optical density changes as a function of its state of charge. CE can vary significantly depending on layer preparation due to differences in structure, material phases, and/or composition. These differences affect the probability of electronic transitions that are manifest as color. As such, CE is a sensitive and quantitative descriptor of an EC layer encompassing the ensemble of the identity of the redox centers, their local environments, and their relative ratios. CE is calculated from the ratio of the change in optical absorbance to the amount of charge density passed. In the absence of significant changes in reflectivity, this wavelength dependent property can be measured over a transition of interest using the following equation:

$$CE_\lambda = \frac{\log_{10}\left(\frac{T_{ini}}{T_{final}}\right)}{Q_A}$$

where QA is the charge per area passed, $T_{ini}$ is the initial transmission, and $T_{final}$ is the final transmission. For anodically coloring layers this value is negative, and may also be stated in absolute (non-negative) values. A simple electro-optical setup that simultaneously measures transmission and charge can be used to calculate CE. Alternatively, the end transmission states can be measured ex situ before and after electrical switching. CE is sometimes alternatively reported on a natural log basis, in which case the reported values are approximately 2.3 times larger.

The term "darken" refers to the transition of an EC material from a first optical state to a second optical state wherein the first optical state is more transmissive than the second optical state.

The term "electrochromic (EC) material" refers to materials that change in transmissivity to electromagnetic radiation, reversibly, as a result of the insertion or extraction of ions and electrons. For example, an EC material may change between a colored, translucent state and a transparent state.

The color of the EC material, layer or device in the bleached or colored state can also be described by the L*a*b* color space. In this color space L* indicates the lightness with the darkest black at L*=0 and the brightest white at L*=100, a* indicates the red/green component of color with green at negative a* and red at positive a* values, and b* indicates the yellow/blue component of color with blue at negative b* and yellow at positive b* values. The color channels, a* and b*, will represent true neutral gray values at a*=0 and b*=0.

For convenience of description herein, change of these one or more optical properties of EC devices (i.e., switching or cycling of the EC devices) is primarily discussed as occurring between a pair of optical states (i.e., an optically less transmissive state and an optically more transmissive state), but it should be understood that these are merely examples and relative terms. For example, the optically less and more transmissive states can be a pair of optical states between a pair of more extreme optically less and more transmissive states that are attainable by a specific EC device. Further, there could be any number of optical states between the optically less and more transmissive states.

The term $T_{ini}$ is defined as the % transmission measured at 550 nm through the as-synthesized film before any electrochemical switching has been performed. The term $T_{clear}$ is defined as the % transmission measured at 550 nm at the first cycle reduction, when the absolute current reaches less than 25 μA at the lowest applied voltage. The term $T_{dark}$ is defined as the % transmission measured at 550 nm at the first cycle oxidation, when the absolute current reaches less than 25 μA at the highest applied voltage.

The term "electrochromic (EC) layer" refers to a layer comprising an EC material.

The term "electrode layer" refers to a layer capable of conducting ions as well as electrons. The electrode layer contains a species that can be reduced when ions are inserted into the material and contains a species that can be oxidized when ions are extracted from the layer. This change in oxidation state of a species in the electrode layer is responsible for the change in optical properties in the device.

The term "electrical potential," or simply "potential," refers to the voltage occurring across a device comprising an electrode/ion conductor/electrode assembly.

The term "electrochemically matched" refers to a set of cathode and anode EC films or materials with similar charge capacities and complementary oxidation states such that when joined together by a suitable ion-conducting and electrically insulating layer, a functional EC device is formed that shows reversible switching behavior over a substantial range of the theoretical charge capacities of the films or materials, respectively.

The terms "halide," "halogen" or "halo" as used herein alone or as part of another group refer to chlorine, bromine, fluorine, and iodine.

The term "inorganic electrochromic (EC) film" or "inorganic electrochromic (EC) material" as used herein describes a film or material, respectively, comprising metals that undergo reversible oxidation and reduction reactions during the cycling of an EC device. Inorganic EC materials and films often lack solubility in common organic and neutral aqueous solvents, and typically possess extended structures where metal ions are bridged to and share counter anions such as oxide, sulfide, nitride and halide, or complex anions such as phosphate or sulfate. Inorganic EC films comprising metal ions and carbon-containing counter anions in a 3-dimensional lattice are also known. These may be particle-based EC materials. Examples include Prussian blue, Prussian blue analogs, nitroprusside compounds and other framework compounds comprising metal ions and cyanide anions or other anions similar to cyanide. These systems may also be referred to as organometallic EC materials.

The term "transmissivity" refers to the fraction of light transmitted through an EC film. Unless otherwise stated, the transmissivity of an EC film is represented by the number Tvis. Tvis is calculated/obtained by integrating the transmission spectrum in the wavelength range of 400-730 nm using the spectral photopic efficiency l_p(lambda) (CIE, 1924) as a weighting factor. (Ref: ASTM E1423).

The term "transparent" is used to denote substantial transmission of electromagnetic radiation through a material such that, for example, bodies situated beyond or behind the material can be distinctly seen or imaged using appropriate image sensing technology.

The term "nanostructure" or "nanostructures" as used herein refers to nanowires, nanoparticles, nanofoams, nanoporous films, or any structure with dimensions between microscopic and molecular scale structures. In some embodiments, nanostructures possess features in the submicron size regime. Such features may be of a nanometer scale, or may be of 10s of nanometers in scale, or may be of 100s of nanometers in scale.

The term "ink" as used herein refers to a mixture containing a liquid and suspended particles that is used for coating a film. For an ink to be usable for coating it must be stable and not significantly precipitate in the time required between the preparation of the particles in a liquid and coating. The term dispersion may also be used to express the same meaning.

The term "grinding" as used herein refers to size-reduction of particles by mechanical means. Some examples of grinding apparatuses are a mortar and pestle, various types of ball mills (e.g., planetary ball mill, agitator ball mill, etc.), various types of mills not using balls as the milling media (e.g., rod mill, vibrating mill, etc.), machines using an abrasive wheel as the cutting tool (e.g., a belt grinder or a bench grinder), or other methods using mechanical force to size-reduce particles. Additionally, size-reducing particles can refer to reducing the size of the primary particles, or reducing the size of hard or soft agglomerates comprising primary particles.

The term "mixed metal oxide" refers to a metal- and oxygen-containing material in which at least two metals are present (e.g., M1 and M2). In certain embodiments, these metals include a metal that may become mobile under the application of voltage and a metal that may undergo oxidation and/or reduction (redox) under the application of voltage. In certain embodiments, the mobile metal, M1, may be an alkali metal, and the redox metal, M2, may be a transition metal. The term "oxide" comprises materials in which oxygen is an anion and may include complex anions like phosphate, $[PO_4]^{3-}$, or sulfate, $[SO_4]^{2-}$, for example, as well as others commonly known in the art.

The term "alkali nickel metal oxide" refers to a material that contains an alkali metal (such as Li or Na), Ni, and O and also contains another metal such as Zn, Y, Ti, Zr, Hf, V, Nb, Ta, Mo, W, B, Al, Ga, In, Si, Ge, Sn, P, Sb and combinations thereof either as dopants, for example in stoichiometric quantities that are 1-10%, or as primary components in which they may be present in stoichiometric quantities that are approximately equal to the alkali or Ni. The alkali is a mobile species that can intercalate and de-intercalate, such as Na or Li. The metal is a redox-active metal that changes oxidation state. Alkali nickel metal oxide also comprises Li, Ni, O and Sb and sometimes Li, Ni, O, Sb and Nb and even $Li_xNi_{(2-(4x/3))}(Sb_yNb_{1-y})(x/3)O_2$, wherein x is from 1 to 1.2 and y is from 0 to 0.5. Since alkali nickel metal oxide is an oxide, oxygen is an anion in the material, and it may include complex oxygen containing anions like phosphate, $[PO_4]^{3-}$, or sulfate, $[SO_4]^{2-}$, for example, as well as others commonly known in the art. Alkali nickel metal oxide may also comprise Li, Ni, Te and O and even Li, Ni, Co, Te and O. Alkali nickel metal oxide comprises many structure types that are known in the art including but not limited to rock salt, disordered rock salt, layered $LiMO_2$, layered $LiMO_2$ polytypes and many others. Delmas et al. (Physica 1980 99B 81) have described the structures of many alkali nickel metal oxides through variations in the packing of octahedral and tetrahedral sheets of metal and oxygen. In many of these materials, $MO_6$ edge-sharing octahedra form $MO_2$ sheets between which alkali atoms are positioned. In such a description, if M were equal to Ni and the alkali atom were equal to Li, the stoichiometry would be $LiNiO_2$. In fact, M may equal Ni and at least one other metal such as Zn, Y, Ti, Zr, Hf, V, Nb, Ta, Mo, W, B, Al, Ga, In, Si, Ge, Sn, P, Sb. At the same time, the alkali metal may comprise Li, Na and/or other +1 metals. The manner by which the sheets of metal and oxygen are repeated may vary resulting in the possibility of many different structural polytypes. For example, depending on how the $MO_2$ sheets overlay, the alkali atoms may reside in octahedral, tetrahedral or prismatic coordination. Such polytypes would have a primary designation of O, T and P, respectively. Further designation arises based on exactly how the sheets repeat in the perpendicular direction. Not being held to any particular theory, the coordination of the alkali and the manner by which the metal-oxygen layers repeat may have an impact on the electrochemical and/or EC characteristics.

The term "lithium nickel oxide" refers to a material that contains Li, Ni, and O and may also contain metals such as Zn, Y, Ti, Zr, Hf, V, Nb, Ta, Mo, W, B, Al, Ga, In, Si, Ge, Sn, P, Sb and combinations thereof either as dopants, for example in stoichiometric quantities that are 1-10%, or as primary components in which they may be present in stoichiometric quantities that are approximately equal to Li or Ni. Lithium is a mobile species that can intercalate and de-intercalate. The metal is a redox active metal that changes oxidation state. Lithium nickel oxide also comprises Li, Ni, O and Sb and sometimes Li, Ni, O, Sb and Nb and even $Li_xNi_{(2-(4x/3))}(Sb_yNb_{1-y})(x/3)O_2$, wherein x is from 1 to 1.2 and y is from 0 to 0.5. Since lithium nickel oxide is an oxide, oxygen is an anion in the material, and it may include complex oxygen containing anions like phosphate, $[PO_4]^{3-}$, or sulfate, $[SO_4]^{2-}$, for example, as well as others commonly known in the art. Lithium nickel oxide may also comprise Li, Ni, Te and O and even Li, Ni, Co, Te and O. Lithium nickel oxide comprises many structure types that are known in the art including but not limited to rock salt, disordered rock salt, layered $LiMO_2$, layered $LiMO_2$ polytypes as described herein and many others.

The term "alkali transition metal tellurate" refers to a material that contains an alkali, a transition metal, tellurium and oxygen. The alkali is a mobile species that can intercalate and de-intercalate, such as Na or Li. The transition metal is a redox active metal that changes oxidation state, such as Ni, Fe, Co, and Mn. The material can also include other dopant elements, such as Zn, Y, Ti, Zr, Hf, V, Nb, Ta, Mo, W, B, Al, Ga, In, Si, Ge, Sn, P, and/or Sb. The material also contains tellurium and oxygen.

The term "alkali transition metal phosphate" refers to a material that contains an alkali, a transition metal and an oxyanion of phosphorous. The alkali is a mobile species that can intercalate and deintercalate, such as Na or Li. The transition metal is a redox active metal that changes oxidation state, such as Ni, Fe, Co, and Mn. The material can also include other dopant elements, such as Zn, Y, Ti, Zr, Hf, V, Nb, Ta, Mo, W, B, Al, Ga, In, Si, Ge, Sn, P, and/or Sb. The material also contains phosphate or pyrophosphate anions.

The above materials, including mixed metal oxides, lithium nickel metal oxides, alkali transition metal tellurates, and alkali transition metal phosphates can be crystalline, or partially crystalline. Different compounds of these materials can display various crystal structures including disordered rock salt, ordered rock salt, hexagonal layered $AMO_2$ (for example A=alkali, M=Ni but many other combinations are known), layering polytypes of $AMO_2$ (e.g., $A_3(M_2M')O_6$ with M-M' ordering, and O3, P2 and P3 polytypes), spinel, olivine (e.g., conventional $LiFePO_4$), NASICON (i.e., sodium super ionic conductor), alluaudite (related to $LiFePO_4$), or many pyrophosphates. Some examples of structures are depicted in FIG. 2 along with some example compounds for each type.

The term "thermal treatment" refers to calcination, annealing, sintering, hydrothermal methods and many others known in the art. Thermal treatment may imply a series of heating steps such as calcination followed by annealing, for example, and is not intended to be limiting.

As used herein, the term "amorphous" implies a general lack of ordering within the crystal lattice of a powder or plurality of particles such that common laboratory techniques including powder x-ray diffraction (PXRD) do not result in the presence of peaks. Amorphous as used herein does not necessarily imply the complete lack of atomic ordering or even a complete lack of peaks as seen by PXRD. In this regard, the term "partially crystalline" refers to a state of order that is higher than amorphous but lower than crystalline while the term "crystalline" comprises a well-ordered material that is readily measured by PXRD and in such an experiment may be described as showing a series of sharp peaks. In this discussion, the terms amorphous, partially crystalline or crystalline imply nothing about particle size.

DETAILED DESCRIPTION

Electrochromic Nanostructure Anodic Thin Films, Multi-layer Stacks, and Devices

FIG. 1 depicts a cross-sectional structural diagram of electrochromic (EC) device 1 according to a first embodiment of the present disclosure. Moving outward from the center, EC device 1 comprises an ion conductor layer 10. First electrode layer 20 is on one side of and in contact with a first surface of ion conductor layer 10, and second electrode layer 21 is on the other side of and in contact with a second surface of ion conductor layer 10. In addition, at least one of first and second electrode layers 20, 21 comprises EC material; in one embodiment, first and second electrode layers 20, 21 each comprise EC material. The central structure, that is, layers 20, 10, 21, is positioned between first and second electrically conductive layers 22 and 23 which, in turn, are arranged against "outer substrates" 24, 25. Elements 20, 21, 10, and optionally elements 22, 23, 24 and/or 25 are collectively referred to as an EC stack 28.

Electrically conductive layer 22 is in electrical contact with one terminal of a power supply (not shown) via bus bar 26 and electrically conductive layer 23 is in electrical contact with the other terminal of a power supply (not shown) via bus bar 27 whereby the transmissivity of the EC stack 28 may be changed by applying a voltage pulse to electrically conductive layers 22 and 23. The pulse causes electrons and ions to move between first and second electrode layers 20 and 21 and, as a result, EC material in the first and/or second electrode layer(s) change(s) optical states, thereby switching EC stack 28 from a more transmissive state to a less transmissive state, or from a less transmissive state to a more transmissive state. In one embodiment, EC stack 28 is transparent before the voltage pulse and less transmissive (e.g., more reflective or colored) after the voltage pulse or vice versa.

It should be understood that the reference to a transition between a less transmissive and a more transmissive state is non-limiting and is intended to describe the entire range of transitions attainable by EC materials to the transmissivity of electromagnetic radiation. For example, the change in transmissivity may be a change from a first optical state to a second optical state that is (i) relatively more absorptive (i.e., less transmissive) than the first state, (ii) relatively less absorptive (i.e., more transmissive) than the first state, (iii) relatively more reflective (i.e., less transmissive) than the first state, (iv) relatively less reflective (i.e., more transmissive) than the first state, (v) relatively more reflective and more absorptive (i.e., less transmissive) than the first state or (vi) relatively less reflective and less absorptive (i.e., more transmissive) than the first state. Additionally, the change may be between the two extreme optical states attainable by an EC device, e.g., between a first transparent state and a second state, the second state being opaque or reflective (mirror). Alternatively, the change may be between two optical states, at least one of which is intermediate along the spectrum between the two extreme states (e.g., transparent and opaque or transparent and mirror) attainable for a specific EC device. Unless otherwise specified herein, whenever reference is made to a less transmissive and a more transmissive, or even a bleached-colored transition, the corresponding device or process encompasses other optical state transitions such as non-reflective-reflective, transparent-opaque, etc. Further, the term "bleached" may refer to an optically neutral state, e.g., uncolored, transparent or translucent. Still further, unless specified otherwise herein, the "color" of an EC transition is not limited to any particular wavelength or range of wavelengths. As understood by those of skill in the art, the choice of appropriate EC and counter electrode materials governs the relevant optical transition.

In general, the change in transmissivity preferably comprises a change in transmissivity to electromagnetic radiation having a wavelength in the range of infrared to ultraviolet radiation. For example, in one embodiment the change in transmissivity is predominately a change in transmissivity to electromagnetic radiation in the infrared spectrum. In a second embodiment, the change in transmissivity is to electromagnetic radiation having wavelengths predominately in the visible spectrum. In a third embodiment, the change in transmissivity is to electromagnetic radiation having wavelengths predominately in the ultraviolet spectrum. In a fourth embodiment, the change in transmissivity is to electromagnetic radiation having wavelengths predominately in the ultraviolet and visible spectra. In a fifth embodiment, the change in transmissivity is to electromagnetic radiation having wavelengths predominately in the infrared and visible spectra. In a sixth embodiment, the change in transmissivity is to electromagnetic radiation having wavelengths predominately in the ultraviolet, visible and infrared spectra.

In one embodiment, the EC materials comprised by the anode electrode (i.e., the first or second electrode 20, 21; see FIG. 1) of a multi-layer stack of the present disclosure are inorganic or organometallic and the EC materials comprised by the cathode (i.e., the other of the first or second electrode 20, 21; see FIG. 1) are independently inorganic or organometallic. More specifically, the EC materials comprised by the anode and/or the cathode are inorganic or organometallic solid state materials with 3-D framework structures comprising metals bridged or separated by anionic atoms or ligands such as oxide, hydroxide, phosphate, cyanide, halide, that further comprise mobile ions such as protons, lithium, sodium, potassium that can intercalate and de-intercalate as the material is reduced or oxidized during the EC cycle.

Oxides of W, Nb, Ta, Ti, V, and Mo color under charge insertion (reduction) and are referred to as cathodic EC materials. Oxides of Ni, Cr, Mn and Ir color upon charge extraction (oxidation) and are anodic EC materials. In one embodiment, cathodically coloring films include oxides based on tungsten, molybdenum, niobium, and titanium.

In some embodiments, the anode of the multi-layer stacks described herein are crystalline anodic EC nanostructures. In some embodiments, the crystalline anodic EC nanostructures comprise an alkali metal oxide material. In some embodiments, the alkali metal oxide material comprises one or more metals, wherein the metals are selected from the group consisting of Ni, Fe, W, Zn, Y, Ti, Zr, Hf, V, Nb, Ta, Mo, B, Al, Ga, In, Si, Ge, Sn, P, Sb, Te, Mn, Co, and combinations thereof. The crystalline anodic EC nanostructures materials and methods are described in more detail throughout this disclosure.

A variety of cathodically coloring films comprising W, Nb, Ta, Ti, V, and Mo are known in the art and can be prepared by a number of deposition processes including vapor deposition processes, wet-coating processes, spray coating processes, dip coating, and electrodeposition. Many of these cathodic films are mixed metal oxides where lithium or protons are intercalated to balance charge during cycling. Additionally, non-oxide based materials can be useful as cathodic EC films. In one embodiment, cathodically coloring films include oxides, hydroxides and/or oxy-hydrides based on V, W, Nb, Ta, Cr, Mo, Ti, Zr, Hf, Sb, Bi, Sn, and combinations thereof.

Cathodically coloring EC films can also contain nanostructures. In some cases, tungsten oxide and tungsten trioxide nanostructures and the substituted versions of each can be incorporated in EC multi-layer stacks and EC devices. Tungsten oxide nanostructures in cathodes can also include different dopant materials, as well as different phases of tungsten oxide or trioxide nanostructures including monoclinic, triclinic, orthorhombic, tetragonal, and hexagonal structure types. More specifically, tungsten oxide nanostructure cathodes can be a material with the formula $A_y W_{1-x} M_x O_{3\pm z}\cdot kH_2O$ and have any crystal structure where A is situated within interstitial spaces and where M is substituted within the W—O lattice. As such, A is often a monovalent species such as a proton, an ammonium ion, and/or an alkali metal and may sometimes be an alkaline earth metal. M is a transition metal, other metal, lanthanide, actinide, EC metal or non-EC metal in octahedral coordination. Under these conditions, x is from about 0 to about 1, y is from above 0 to about 0.5, and where z can be from about −0.5 to about 0.5. A and/or M also comprise more than one element and be expressed as $A'_a + A''_b + A'''_c$ and/or $M'_d + M''_e + M'''_f$ where A', A" and A''' and/or M', M" and M''' are different elements, where a+b+c=y and d+e+f=x. In some cases tungsten oxide nanostructure cathodes can contain atoms other than tungsten and oxygen and may display alternative structures, including but not limited to, substituted tungsten oxide, substituted triclinic tungsten oxide, substituted monoclinic tungsten oxide, substituted orthorhombic tungsten oxide, substituted tetragonal tungsten oxide, substituted hexagonal tungsten oxide, or substituted cubic tungsten oxide. Furthermore, "tungsten trioxide" can refer to structures comprising hexagonal tungsten bronze materials, hexagonal tungsten bronze-like materials, tetragonal tungsten bronze materials, tetragonal tungsten bronze-like materials, pyrochlore materials, pyrochlore-like materials, defected pyrochlore materials, defected pyrochlore-like materials, substituted pyrochlore materials or substituted pyrochlore-like materials.

In some embodiments, the EC devices described here can contain a cathode produced using a method of providing crystalline cathodic electrochromic (EC) particles; size-reducing the crystalline cathodic EC particles by grinding to produce crystalline cathodic EC nanostructures; and coating the crystalline cathodic EC nanostructures onto a substrate to produce an EC thin film. In some embodiments, the crystalline cathodic EC nanostructures in the above method comprise an alkali metal oxide material comprising one or more metals, wherein the metals are selected from the group consisting of V, W, Nb, Ta, Cr, Mo, Ti, Zr, Hf, Sb, Bi, Sn, and combinations thereof.

In some embodiments, the electrochromic (EC) multi-layer stacks described herein further comprise: an EC cathode layer comprising crystalline cathodic EC nanostructures; an electrically conductive layer; and an outer substrate, wherein the multi-layer stack is incorporated into an EC device, and wherein the EC cathode layer does not comprise a binder. In some embodiments, the crystalline cathodic EC nanostructures comprise an alkali metal oxide material comprising one or more metals, wherein the metals are selected from the group consisting of V, W, Nb, Ta, Cr, Mo, Ti, Zr, Hf, Sb, Bi, Sn, and combinations thereof.

The thickness of anode layer 20 and cathode layer 21 will depend upon the EC material selected for the EC layer and the application. In some embodiments, anode layer 20 will have a thickness in the range of about 25 nm to about 2000 nm. For example, in one embodiment anode layer 20 has a thickness of about 50 nm to about 2000 nm. By way of further example, in one embodiment anode layer 20 has a thickness of about 25 nm to about 1000 nm. By way of further example, in one such embodiment, anode layer 20 has an average thickness between about 100 nm and about 700 nm. In some embodiments, anode layer 20 has a thickness of about 250 nm to about 500 nm. Cathode layer 21 will typically have thicknesses in the same ranges as those stated for anode layer 20. One of skill in the art will appreciate that certain relationships exist between the thickness of the anode or cathode layer, and the materials deposited to comprise the anode or cathode layer. For example, if the average thickness of the anode or cathode layer is between about 250 nm to about 500 nm, then anode or cathode precursor materials that comprise the liquid mixtures used to deposit the anode or cathode layers will likely be composed of species that are smaller than 250 nm to 500 nm.

Ion conductor layer 10 serves as a medium through which ions are transported (in the manner of an electrolyte) when the EC device switches between an optically less transmissive ("colored") state and an optically more transmissive ("bleached") state. Stated differently, the ion conducting layer permits sufficient ionic conduction between the first and second electrode layers 20, 21 upon the application of a voltage across EC stack 28. Depending on the choice of materials, such ions include lithium ions ($Li^+$) and hydrogen ions ($H^+$) (i.e., protons). Other ions may also be employed in certain embodiments. These include deuterium ions (D+), sodium ions ($Na^+$), potassium ions ($K^+$), rubidium ions ($Rb^+$), cesium ions ($Cs^+$), ammonium ions ($NH_4^+$), calcium ions ($Ca^{++}$), barium ions ($Ba^{++}$), strontium ions ($Sr^{++}$), magnesium ions ($Mg^{++}$) or others. In one embodiment, ion conductor layer 10 has a lithium ion conductivity of at least about $10^{-5}$ S/cm at room temperature (i.e., 25° C.). For example, in one such embodiment, ion conductor layer 10 has a lithium ion conductivity of at least about $10^{-4}$ S/cm at room temperature. By way of further example, in one such embodiment ion conductor layer 10 has a lithium ion conductivity of at least about $10^{-3}$ S/cm at room temperature. By way of further example, in one such embodiment ion conductor layer 10 has a lithium ion conductivity of at least about $10^{-2}$ S/cm at room temperature. Preferably, ion conductor layer 10 has sufficiently low electron conductivity that negligible electron transfer takes place during normal operation.

Ion conductor layer 10 is also preferably sufficiently durable so as to withstand repeated cycling of the EC device between an optically less transmissive state and an optically more transmissive state. For example, in one such embodiment, lithium ion conductivity of ion conductor layer 10 varies less than about 5% upon cycling of the EC device between a less transmissive state (e.g. about 5% transmissive) and a more transmissive state (e.g. about 70% transmissive) for at least 100 hours at 85° C. By way of further example, in one such embodiment lithium ion conductivity of ion conductor layer 10 varies less than about 4% upon cycling of the EC device between a less transmissive state and a more transmissive state for at least 100 hours at 85° C. By way of further example, in one such embodiment lithium ion conductivity of ion conductor layer 10 varies less than about 3% upon cycling of the EC device between a less transmissive state and a more transmissive state for at least 100 hours at 85° C. By way of further example, in one such embodiment lithium ion conductivity of ion conductor layer 10 varies less than about 2% upon cycling of the EC device between a less transmissive state and a more transmissive state for at least 100 hours at 85° C. By way of further example, in one such embodiment lithium ion conductivity of ion conductor layer 10 varies less than about 1% upon cycling of the EC device between a less transmissive state and a more transmissive state for at least 100 hours at 85° C. By way of further example, in one such embodiment lithium ion conductivity of ion conductor layer 10 varies less than about 0.5% upon cycling of the EC device between a less transmissive state and a more transmissive state for at least 100 hours at 85° C.

Additionally, to enable EC stack 28 to endure a range of physical stresses to which it may be exposed during the manufacture of EC device 1, its incorporation into a structure (e.g., an automobile, aircraft, or building), and/or its intended end-use environment (e.g., as an architectural window, sunroof, skylight, mirror, etc., in such a structure), ion conductor layer 10 also possesses sufficient cohesion and adhesion to the first and second electrode layers 20, 21. For example, in one embodiment, ion conductor layer 10 has a lap shear strength of at least 100 kPa, as measured at 1.27 mm/min, at room temperature, in accordance with ASTM International standard D1002 or D3163. For example, in one embodiment ion conductor layer 10 has a lap shear strength of at least 200 kPa. By way of further example, in one such embodiment ion conductor layer 10 has a lap shear strength of at least 300 kPa. By way of further example, in one such embodiment ion conductor layer 10 has a lap shear strength of at least 400 kPa. By way of further example, in one such embodiment ion conductor layer 10 has a lap shear strength of at least 500 kPa. By way of further example, in one such embodiment ion conductor layer 10 has a lap shear strength of at least 600 kPa. Preferably, ion conductor layer 10 is elastically deformable. In one exemplary embodiment, ion conductor layer 10 has an elongation to failure of at least 1 mm.

Some non-exclusive examples of electrolytes typically incorporated into ion conductor layer 10 are: solid polymer electrolytes (SPE), such as poly(ethylene oxide) with a dissolved lithium salt; gel polymer electrolytes (GPE), such as mixtures of poly(methyl methacrylate) and propylene carbonate with a lithium salt; composite gel polymer electrolytes (CGPE) that are similar to GPE's but with an addition of a second polymer such a poly(ethylene oxide), and liquid electrolytes (LE) such as a solvent mixture of ethylene carbonate/diethyl carbonate with a lithium salt; and composite organic-inorganic electrolytes (CE), comprising an LE with an addition of titania, silica or other oxides. Some non-exclusive examples of lithium salts used are LiTFSI—$CF_3SO_2NLiSO_2CF_3$ (lithium bis(trifluoromethane) sulfonimide), $LiBF_4$ (lithium tetra fluoroborate), $LiAsF_6$ (lithium hexafluoro arsenate), $LiCF_3SO_3$ (lithium trifluoromethane sulfonate), and $LiClO_4$ (lithium perchlorate). Additional examples of suitable ion conducting layers include silicates, silicon oxides, tungsten oxides, tantalum oxides, niobium oxides, and borates. The silicon oxides include silicon-aluminum-oxide. These materials may be doped with different dopants, including lithium. Lithium doped silicon oxides include lithium silicon aluminum-oxide. In some embodiments, the ion conducting layer comprises a silicate based structure. In other embodiments, suitable ion conductors particularly adapted for lithium ion transport include, but are not limited to, lithium silicate, lithium aluminum silicate, lithium aluminum borate, lithium aluminum fluoride, lithium borate, lithium nitride, lithium zirconium silicate, lithium niobate, lithium borosilicate, lithium phosphosilicate, and other such lithium-based ceramic materials, silicas, or silicon oxides, including lithium silicon-oxide.

The thickness of the ion conductor layer 10 will vary depending on the material. In some embodiments using an inorganic ion conductor, the ion conductor layer 10 is about 250 nm to 1 nm thick, preferably about 50 nm to 5 nm thick. In some embodiments using an organic ion conductor, the ion conductor layer is about 1000000 nm to 1000 nm thick or about 250000 nm to 10000 nm thick. The thickness of the ion conductor layer is also substantially uniform. In one embodiment, a substantially uniform ion conductor layer varies by not more than about +/−10% in each of the aforementioned thickness ranges. In another embodiment, a substantially uniform ion conductor layer varies by not more than about +/−5% in each of the aforementioned thickness ranges. In another embodiment, a substantially uniform ion conductor layer varies by not more than about +/−3% in each of the aforementioned thickness ranges.

In one embodiment, the ion-conducting film is produced from the ion conducting formulation by depositing the liquid formulation with the anode film, cathode film, or both films in a sufficient quantity to form a continuous pre-crosslinked film having a uniform thickness between 50 and 500 microns between the anode and cathode plates. This assembly may then be placed in a vacuum laminator and heated under vacuum to form a sealed assembly. Polymerization of the monomer/co-monomer may be initiated either thermally or photochemically. In one embodiment, any thermal processing of the device, particularly one where the substrate is plastic, is below the temperature of 200° C., and more particularly 150° C., and even more particularly 100° C.

Alternatively, free standing, fully formulated ion-conducting films may be used in place of the crosslinking IC formulation or the liquid IC formulation may be used in a "cast in place" process where a pre-formed cavity between the anode and cathode is produced (edge sealed) and the formulation is forced into this cavity through fill ports.

In some embodiments, the electrically conductive layers are selected from a group consisting of: transparent conductive oxides, thin metallic coatings, networks of conductive nanoparticles (e.g., rods, tubes, dots), conductive metal nitrides, and composite conductors.

At least one of the two electrically conductive layers 22, 23 is also preferably transparent in order to reveal the EC properties of the stack 28 to the surroundings. In one embodiment, electrically conductive layer 23 is transparent. In another embodiment, electrically conductive layer 22 is transparent. In another embodiment, electrically conductive layers 22, 23 are each transparent. In certain embodiments, one or both of the electrically conductive layers 22, 23 is inorganic and/or solid. Electrically conductive layers 22 and 23 may be made from a number of different transparent materials, including transparent conductive oxides, thin metallic coatings, networks of conductive nanoparticles (e.g., rods, tubes, and dots), conductive metal nitrides, and composite conductors. Transparent conductive oxides include metal oxides and metal oxides doped with one or more metals. Examples of such metal oxides and doped metal oxides include indium oxide, indium tin oxide, doped indium oxide, tin oxide, doped tin oxide, zinc oxide, aluminum zinc oxide, doped zinc oxide, ruthenium oxide, doped ruthenium oxide and the like. Transparent conductive oxides are sometimes referred to as (TCO) layers. Thin metallic coatings that are substantially transparent may also be used. Examples of metals used for such thin metallic coatings include gold, platinum, silver, aluminum, nickel, and alloys of these. Examples of transparent conductive nitrides include titanium nitrides, tantalum nitrides, titanium oxynitrides, and tantalum oxynitrides. Electrically conducting layers 22 and 23 may also be transparent composite conductors. Such composite conductors may be fabricated by placing highly conductive ceramic and metal wires or conductive layer patterns on one of the faces of the substrate and then over-coating with transparent conductive materials such as doped tin oxides or indium tin oxide. Ideally, such wires should be thin enough as to be invisible to the naked eye (e.g., about 100 µm or thinner). Non-exclusive examples of electron conductors 22 and 23 transparent to visible light are thin films of indium tin oxide (ITO), tin oxide, zinc oxide, titanium oxide, n- or p-doped zinc oxide and zinc oxyfluoride. Metal-based layers, such as ZnS/Ag/ZnS and carbon nanotube layers have been recently explored as well. Depending on the particular application, one or both electrically conductive layers 22 and 23 may be made of or include a metal grid.

The thickness of the electrically conductive layer may be influenced by the composition of the material comprised within the layer and its transparent character. In some embodiments, electrically conductive layers 22 and 23 are transparent and each have a thickness that is between about 1000 nm and about 50 nm. In some embodiments, the thickness of electrically conductive layers 22 and 23 is between about 500 nm and about 100 nm. In other embodiments, the electrically conductive layers 22 and 23 each have a thickness that is between about 400 nm and about 200 nm. In general, thicker or thinner layers may be employed so long as they provide the necessary electrical properties (e.g., conductivity) and optical properties (e.g., transmittance). For certain applications it will generally be preferred that electrically conductive layers 22 and 23 be as thin as possible to increase transparency and to reduce cost.

Referring again to FIG. 1, the function of the electrically conductive layers is to apply the electric potential provided by a power supply over the entire surface of the EC stack 28 to interior regions of the stack. The electric potential is transferred to the conductive layers though electrical connections to the conductive layers. In some embodiments, bus bars, one in contact with first electrically conductive layer 22 and one in contact with second electrically conductive layer 23 provide the electrical connection between the voltage source and the electrically conductive layers 22 and 23.

In one embodiment, the sheet resistance, $R_s$, of the first and second electrically conductive layers 22 and 23 is about 500Ω/□ to 1Ω/□. In some embodiments, the sheet resistance of first and second electrically conductive layers 22 and 23 is about 100Ω/□ to 5Ω/□. In general, it is desirable that the sheet resistance of each of the first and second electrically conductive layers 22 and 23 be about the same. In one embodiment, first and second electrically conductive layers 22 and 23 each have a sheet resistance of about 20Ω/□ to about 8 Ω/□.

In some embodiments, one or both of the electrically conducting layers are gradient electrically conductive layers. An electrically conductive layer with a "gradient", as defined herein, refers to an electrically conducting layer with spatially varying sheet resistance, or resistance to current flow substantially parallel to a major surface of the layer that varies as a function of position within the electrically conductive layer. Other embodiments include, a "gradient ECL", or a "gradient TCO", or a "gradient transparent conducting layer", all of which are electrically conducting layers with gradients as defined above. In some embodiments, the electrically conducting layers are a gradient based on thickness of the transparent conductive oxide (TCO) material and have an inverse symmetry. In other embodiments, the resistance gradient in the transparent conductive layer may be formed by different techniques such as by creating a gradient in the composition of the transparent conductive layer, or by patterning the materials with a scribe or etchant to effectively create an "electron maze." Regardless of the technique used, the gradients may have an inverse symmetry to one another. The gradient transparent conductive layer allows for the use of EC devices in panels used for large scale applications such as architectural windows or in transportation applications such as buses and trains or automobiles. This is because with a gradient transparent conductive layer there is not a drop in effective voltage across an EC panel or device once the voltage is applied to the EC panel or device at the bus bars, which provides for a uniform transition between tint states across all dimensions of the EC panel. More details on gradient transparent conductive layers and different embodiments applicable to the EC devices described in this specification can be found in U.S. Pat. No. 8,717,658 entitled EC Multi-Layer Devices With Spatially Coordinated Switching (incorporated herein by reference), U.S. Pat. No. 9,091,895 EC Multi-Layer Devices With Composite Electrically Conductive Layers (incorporated herein by reference), U.S. Pat. No. 9,091,868 EC Multi-Layer Devices With Composite Current Modulating Structure (incorporated herein by reference), and patent application number US 2014/0043668 EC Multi-Layer Devices With Current Modulating Structure (incorporated herein by reference.) The gradient transparent conductive layers can not only remove the "iris effect" problem that larger scale EC devices have by enabling the uniform transition between states across the entire surface of the EC panel, but also enable the fast transition between tint states (i.e., a short switching time, or a fast switching speed) and in particular from the clear state to the dark state and vice versa.

In some embodiments, the outer substrates are selected from a group consisting of: glass (e.g. soda lime glass or borosilicate glass), and plastic (e.g. polycarbonates, polyacrylics, polyurethanes, urethane carbonate copolymers, polysulfones, polyimides, polyacrylates, polyethers, polyester, polyethylenes, polyalkenes, polyimides, polysulfides, polyvinylacetates and cellulose-based polymers).

In some embodiments, the substrate has a melting point less than 800° C., or less than 700° C., or less than 600° C., or less than 500° C., or less than 400° C., or less than 300° C., or less than 250° C., or less than 200° C., or less than 150° C., or less than 100° C., or from 100° C. to 200° C., or from 200° C. to 300° C., or from 300° C. to 400° C., or from 400° C. to 500° C., or from 500° C. to 600° C., or from 600° C. to 700° C., or from 700° C. to 800° C., or from 800° C. to 900° C., or from 900° C. to 1000° C., or from 1000° C. to 1100° C., or from 1100° C. to 1200° C., or from 120° C. to 1300° C., or from 1300° C. to 1400° C., or from 1400° C. to 1500° C., or from 1500° C. to 1600° C.

In some embodiments, the substrate is thicker than 50 microns, or thicker than 10 microns, or thicker than 100 microns, or from 10 microns to 10 mm, or from 10 microns to 6 mm, or from 1 mm to 10 mm, or from 10 to 1000 microns, or from 50 to 1000 microns.

Referring again to FIG. 1, the power supply (not shown) connected to bus bars 26, 27 is typically a voltage source with optional current limits or current control features and may be configured to operate in conjunction with local thermal, photosensitive or other environmental sensors. The voltage source may also be configured to interface with an energy management system, such as a computer system that controls the EC device according to factors such as the time of year, time of day, and measured environmental conditions. Such an energy management system, in conjunction with large area EC devices (e.g., an EC architectural window), can dramatically lower the energy consumption of a building.

In some embodiments, the EC multilayer stacks and EC multilayers stacks including crystalline anodic EC nanostructures can be incorporated into EC panels and/or EC devices. Independent of application, the EC structures and devices of the present disclosure may have a wide range of sizes. In general, it is preferred that the EC device comprise a substrate having a surface with a surface area of at least 0.001 meter$^2$. For example, in certain embodiments, the EC device comprises a substrate having a surface with a surface area of at least 0.01 meter$^2$, or at least 0.1 meter$^2$, or at least 1 meter$^2$, or at least 5 meter$^2$, or at least 10 meter$^2$.

In some cases, the EC panels and/or EC devices have desirable optical properties. Some examples of desirable optical properties are uniform transitioning from one optical state to another across the entire device or panel (e.g., where all tinted states have a deltaE less than 10 across the area of the panel), a clearer clear state with no perceptible color (e.g., where the clear state has an average CIE-Lab b* from 3 to 6, an average CIE-Lab a* from −4 to 2, and an average CIE-Lab L* from 85 to 90), and a more black colored dark state (e.g., where the dark state has an average CIE-Lab b* from −5 to −2, an average CIE-Lab a* from −7 to −5, and an average CIE-Lab L* from 10 to 30).

In some embodiments, the EC panels and/or EC devices have a low transmission dark state (e.g., with Tvis less than 5%) and a high transparency clear state (e.g., with Tvis greater than 70%), and a continuum of tinted states with varying transmission between these two end states. In some embodiments, the EC device or panel can be used as privacy glass with a low transmission dark state (e.g., with Tvis less than 0.1%) and a high transparency clear state (e.g., with Tvis greater than 55%), and a continuum of tinted states with varying transmission between the clear and dark states. In some embodiments, the EC panel or also comprises a continuum of tinted states with varying transmission between these two end states, and the dark state, the clear state and the tinted states all have colors that are close to neutral (e.g., with a* from −4 to 4, and b* from −6 to 6). In some embodiments, the EC panel or device may also have very fast switching speed (e.g., less than 5 minutes, or less than 10 minutes) as well as uniform transitions between states (e.g., where the clear state, dark state and all tinted states have deltaE across the area of the panel less than 10) by including one or more gradient transparent conductive layers in each EC device or panel. The EC device or panels described herein may be used in many applications such as architectural or transportation. The architectural applications may include glass used on the exterior of the building such as windows or doors having insulated glass units (IGU's.) The architectural applications may also include interior applications such as partitions, windows, or doors.

Description of Functional Devices with Crystalline Anodic Electrochromic Nanostructures The EC multi-layer stacks and/or devices incorporating the nanostructures described in this disclosure may also be particle-based EC multi-layer stacks and/or devices. A particle-based EC device is an EC structure where one or more of the functional layers is formed of nanoparticles or nanostructures, such as those described above. The functional layers include the transparent conductive layers, the electrodes (anode and or cathode), and the ion conductor. In one embodiment, an EC particle-based system is one where the particles or nanoparticles in such a system are crystalline, semi-crystalline or amorphous solid state materials with an extended solid state crystal structure and have substitutable atoms such as metals and ligands that can be modified to tune the EC properties. A unit cell of the crystal structure is the smallest repeatable unit within that structure and can be used both to describe the contents of the crystal and to estimate the number of atoms and/or unit cells in a particle of a given size. The number of atoms/unit cells in a particle can be estimated based on known bond lengths between different atoms and the positions of the atoms in the unit cells. The EC particles may range from 1-200 nm at the largest and 10-50 nm as a more preferred range.

Although a range of EC materials could be used in particle-based EC systems, cathode or anode films that can be prepared by simple low temperature single-step deposition processes to produce EC electrodes (i.e., EC cathodes, EC anodes or EC anodes and cathodes) with improved thermal stability, high optical clarity in their as-deposited states, and that can be tuned via composition and film thickness to adopt a wide variety of area charge capacities and optical switching properties may be useful in the field.

In general, the particle-based systems may be tuned to obtain EC materials (EC systems) that reversibly change from a transparent state having a desirable $T_{vis}$ to a dark color having a high coloration efficiency. In various embodiments of this invention, the EC properties that may be tuned are the coloration of the bleached state of material or of the dark state of the material, coloration efficiency, switching speed of the electrochromic device between different states, voltage matching of the anode and cathode, the coloration of the anode, the coloration of the cathode, and the coloration of the anode and cathode in combination.

Both anodic and cathodic EC particle-based materials may be tuned for any of the above properties using methods of substituting metals and ligands. Of particular interest is tuning the color of the EC particle-based materials. The particle-based anode material may be any of crystalline anodic EC nanostructures described in this disclosure. The particle-based cathode materials may be any material compatible with the other materials selected as part of the EC device, from a chemical compatibility standpoint as well as from a device functionality standpoint. Chemically the materials should be compatible in that they do not detrimentally interact with one another. From a device functionality standpoint the device materials can be selected to provide a device that performs within parameters determined to be optimal for the various products into which it may be integrated. For example the anode and cathode may be selected to have dark-state colors that combine to provide a desired color. In another example the materials may be selected to provide a particular switching speed or coloration efficiency.

The ion conductor material used in particle-based EC devices in one embodiment may be produced from a liquid formulation that comprises an electrolyte solvent or plasticizer, a polymerizable monomer or set of monomers, an optional polymerization initiator, and a salt such as a lithium salt or an acid. The formulation may also comprise other additives to promote device performance such as pH buffers, UV stabilizers, and the like. In another embodiment, the ion-conducting film is produced from the ion conducting formulation by depositing the liquid formulation with the anode film, cathode film, or both films in a sufficient quantity to form a continuous pre-crosslinked film having a uniform thickness between 50 and 500 microns between the anode and cathode plates. This assembly may then be placed in a vacuum laminator and heated under vacuum to form a sealed assembly. Polymerization of the monomer/co-monomer may be initiated either thermally or photochemically. In one embodiment, any thermal processing of the device, particularly one where plastic is the substrate, is below the temperature of 200° C., and m ore particularly 150° C., and even more particularly 100° C.

Alternatively, free standing fully formulated ion-conducting films may be used in place of the crosslinking IC formulation or the liquid IC formulation may be used in a "cast in place" process where a pre-formed cavity between the anode and cathode is produced (edge sealed) and the formulation is forced into this cavity through fill ports. Typical monomers used in these formulations are polar organic olefins such as acrylates, or other well-known polymerization systems such as silicones, urethanes and the like.

In an alternative embodiment, the structure of the EC device may employ a symmetric electrode assembly, where each of the electrode layers include a mixture of both anode and cathode EC particles.

In another embodiment, the EC device may be formed by a combination of both anodic and cathodic particles dispersed in a single layer between two conductive layers where at least one of the anodic or cathodic particles are transparent in both oxidized and reduced states so that the color is created by only one of the anodic or cathodic particles.

Particle-based formulations for the different components in EC devices allows for alternative techniques for making EC devices having the components described above including the anode, cathode, ion conductor, and the transparent conductive layers. A particle-based coating technology may also enable novel device architectures to exploit the potential for greatly reduced device complexity, growing EC films post-deposition (of particular value for curved applications), and post-device completion defect repair.

In one embodiment the particle-based devices and techniques may be mixed-particle films, such as anode materials mixed with cathode materials to produce a film that functions as both. In another embodiment the mixed particle films may be formed of non-EC particles mixed with EC particles in a binder material to enhance specific properties, where the non-EC particles may be charge sequestration particles or additives to increase the ionic or electronic conductivity of the device. The binder may be an organic material that is both adhesive and ion-conducting. The transparent conductive layer (TCL) may also be particle-based and be incorporated into an adhesive film. The TCL particles may be approximately 2 microns and create a resulting TCL film having a sheet resistance of about 50Ω/□ to about 100Ω/□. A particle based TCL with high transparency and low haze but with low conductivity can also be used in these types of systems due to the thinness of the TCL's. This is because any total conductivity can be achieved by layering the TCL layers. For example, 10 stacked 5 layer devices with TCL films having 250Ω/□ would have net 25Ω/□ resistance resulting in exceptional film performance with relatively low volumetric charge capacity—and thus less need for a high conductivity TCL. This is valuable because the high conductivity TCL's are more expensive.

An example of a mixed-particle device may have the TCL adhesive film sandwiching an adhesive ion conducting film which incorporates both anode and cathode particles. Alternatively there may be two adhesive ion conducting films sandwiched between the TCL adhesive film, where one of the adhesive ion conducting films incorporates the anode material and the other adhesive ion conducting film incorporates the cathode material. There may be more than two of the electrode and ion conducting adhesive films present in these types of devices in order to provide multiple discrete EC layers. Roll-to-roll processing using flexible films would enable efficient processing of such devices.

In some embodiments the films or devices containing crystalline anodic EC nanostructures may possess one or more characteristics. The characteristic may be the ability of the films or devices to be synthesized in a structurally and compositionally pure state. The stability of the films or devices under ambient conditions. The stability of the films or devices under temperatures amenable to low temperature or high temperature substrates, where low temperature substrates may be flexible or polymeric materials that are stable in temperatures of 150° C. or less and high temperature substrates are materials such as glass. Another characteristic may be the stability of the films or devices in the presence of light, oxygen, and humidity at 85° C. or less. The ability of the electrochromic device to intercalate and deintercalate lithium. The ability of the electrochromic device or film to intercalate and deintercalate lithium with concomitant reduction/oxidation of a metal in the material, which in some embodiments may be a transition metal. In the instance where the film is a cathode, then it will intercalate and deintercalate with a metal being reduced then re-oxidized. In the instance where the film is an anode then it will deintercalate and intercalate with a metal being oxidized then reduced. The electochromic films or devices of the present invention may also possess the ability to intercalate and deintercalate lithium reversibly with a reversible metal redox reaction to have a low lattice strain upon intercalation/deintercalation. In some embodiments the films or devices may have the ability to intercalate and deintercalate lithium reversibly with reversible metal redox reaction without irreversible structural changes and preferably with no structural changes and preferably with no structural changes in a voltage range of approximately 2.5-4.2 V.

The size reduced anodic nanostructure material may be formulated into a stable dispersion or ink that comprises the size reduced material, a solvent and possibly various additives that (a) improve dispersion of the size reduced material, (b) improve the properties of the solvent, (c) improve the drying characteristics of the wet film, (d) improve the optical characteristics of the dried film, or other characteristics. Stable implies a dispersion or ink that will remain dispersed for a period of time sufficient to perform a coating experiment. (e.g., greater than 8 hr, and preferably greater than days or weeks). The anodic nanostructures may be formed into a stable dispersion or ink and coated onto a substrate in using conventional coating methods.

In some embodiments the devices formed according to methods described herein may be cycled with an acceptable rate per cycle, cycled without degradative losses and more particularly cycled without degradative losses in the presence of light, oxygen, and humidity at 85° C. or less for at least 5000 cycles.

Methods for EC Nanostructure Anodes

This section describes methods of manufacturing a thin film, in some embodiments, comprising: providing a plurality of crystalline anodic electrochromic (EC) particles; size-reducing the crystalline anodic EC particles by grinding to produce crystalline anodic EC nanostructures; and coating the crystalline anodic EC nanostructures onto a substrate to produce an EC thin film.

Embodiments of the current invention describe methods of producing EC thin films, multi-layer stacks, and devices containing crystalline anodic EC nanostructures using methods that are amenable to high volume, low cost manufacturing. Additionally, embodiments of the current invention also describe films having robust mechanical properties and deposition methods that are compatible with substrates requiring low maximum processing temperatures.

The method provides a low temperature process for the formation of a film on a substrate by preparing the deposited material in an earlier higher temperature process. In many embodiments of the current invention, the process of making the particles includes both preparing the particles using a thermal treatment, and then grinding the particles using a process such as milling to form nanostructures of the particles. The term "thermal treatment" refers to calcination, annealing, sintering, hydrothermal methods and many others known in the art. The nanostructures may then be dispersed into an ink and deposited onto a substrate for form a thin film. In some embodiments, these films are also incorporated into multi-layer stacks, and EC devices. The methods described herein enable high temperature processing (e.g., that is required to create crystalline EC material) to be performed before the EC material is deposited on the substrate, which then enables EC materials requiring high temperature processing to be deposited on a substrate in a low temperature process. A benefit of this type of a process is that high quality EC films can be deposited on substrates that have relatively low melting points relative to the temperatures required to form the EC materials. Some examples of the properties of high quality EC films are good optical properties (e.g., high optical transmission and b* near zero), good electrical properties (e.g., high capacity), and good durability (e.g., low fade).

In some embodiments, a method of producing the anode of an EC multi-layer stack comprises synthesizing crystalline anodic EC particles; size-reducing the crystalline anodic EC particles by grinding to produce crystalline anodic EC nanostructures; and coating the crystalline anodic EC nanostructures on a substrate.

This disclosure also describes a method to produce an EC mixed metal oxide thin film. In some embodiments the substrate may be stable under high temperature conditions of 300° C. or higher or 600° C. or higher. These stable substrates may be glass, quartz or sapphire. In other embodiments, the substrate may be unstable under high temperature conditions (300° C. or higher or 60 0° C. or higher), for example plastics (e.g. polycarbonates, polyacrylics, polyurethanes, urethane carbonate copolymers, polysulfones, polyimides, polyacrylates, polyethers, polyester, polyethylenes, polyalkenes, polyimides, polysulfides, polyvinylacetates and cellulose-based polymers).

There are a number of advantages of this approach to create these types of EC thin films on a substrate, such as enabling the use of liquid coating precursors, performing synthesis before depositing on a substrate, eliminating the requirement to remove materials from the substrate except for drying, eliminating the exposure of the substrate to high temperatures, and reducing the equipment and materials costs compared to other state of the art methods such as hydrothermal synthesis directly on a substrate, sol-gel followed by calcination and annealing, and physical vapor deposition onto a heated or unheated substrate followed by annealing.

The methodology for forming EC films described in this disclosure enables the use of any synthetic method and any temperature that may be necessary because synthesis is partially or entirely removed from the substrate and performed in advance of the deposition of the EC material on the substrate. Furthermore, the method also allows for a significantly greater opportunity for purification and characterization of the active species since the material is prepared before deposition to the substrate. Regarding durability, rate and coloration efficiency considerations, EC behavior can vary widely depending on the composition, crystal structure (and polymorph) of the material in the device. Not being held to any particular theory, the fact that the materials described herein are structurally stable upon insertion and de-insertion of lithium, sodium and other ions is believed to be beneficial.

In some embodiments the reagents of inorganic metal precursors, such as metal salts, oxides, hydroxides, carbonates, or bicarbonates were used for the synthesis of a powder of crystalline anodic EC particles. In some cases, the mixtures of reagents are finely ground to mix well, and then calcined at high temperature.

In some embodiments, materials may be produced via conventional solid state reactions comprising repetitive heating and grinding cycles, hydrothermal synthesis, sol-gel synthesis methods where reactive species are hydrolyzed to form colloids, inert atmosphere reactions, flux reactions, nanosynthesis reactions, microwave synthesis reactions, laser pyrolysis reactions, spray drying, or the like. In some embodiments, different characteristics of the previously listed synthesis methods are combined in a step-by-step manner. In some embodiments, variable heat treatment steps are required while in others, only a single heat treatment step is necessary. Heat treatment may comprise precursor decomposition, calcination, sintering and even melting. In some embodiments, the temperature range of the thermal treatment is from 150° C. to 300° C., or from 100° C. to 1000° C., or from 100° C. to 800° C., or from 100° C. to 600° C., or above 1000° C., or in other embodiment s, the temperature range may comprise whatever temperature is required to create a single phase, crystalline material.

In some embodiments, the mixture of reagents is ball-milled prior to thermal treatment (e.g., calcination) for intimate mixing between the solid-state precursors. The reagent mixtures can be ball-milled at 300 rpm for from 45 to 90 cycles with a 3 minute run and 5 minute break at each cycle in a solvent (e.g., acetone). In some embodiments, the reagent mixtures can be ball-milled at from 100 rpm to 500 rpm, for from 20 to 200 cycles, with run times from 1 min to 10 min, and with break times from 1 min to 10 min, before thermal treatment. After milling the milled slurry can be filtered to remove milling media and can be washed with a solvent (e.g., acetone). The filtrate slurry may be dried in the oven (e.g., at 150° C. for 2 h). After cooling, the powder may be pressed into a pellet, and thermally treated (e.g., calcined at 800° C. for 12h in air).

In some embodiments the heat treated crystalline anodic EC particles are washed on a filter. In some embodiments the heat treated particles are washed using a centrifuge washing method. In some embodiments, DI water is used to wash the heat treated particles. In some embodiments, DI water followed by isopropyl alcohol is used to wash the heat treated particles. In other embodiments, any solvent in which the additive reagents are soluble followed by water can be used in the washing process, such as 1 M LiOH followed by DI water.

In some embodiments, the heat treated crystalline anodic EC particles are washed, and separated from the washing fluid by centrifuging at 3000 rpm, or at 3500 rpm, or at 4000 rpm, or at 4500 rpm, or at 5000 rpm, or at 5500 rpm, or at 6000 rpm. In some embodiments, the heat treated particles are washed, and separated from the washed contaminants by washing and centrifuging once, or by washing and centrifuging twice, by washing and centrifuging three times, by washing and centrifuging four times, by washing and centrifuging five times, by washing and centrifuging six times, by washing and centrifuging using a continuous flow centrifuge process. In some embodiments, the washing fluid can be removed from the heat treated particles using a membrane filtering method.

Size-Reduction of Crystalline Anodic EC Particles

In some embodiments, the crystalline anodic EC particles could be size-reduced by grinding. In some embodiments the particles could be size-reduced using a mortar and pestle, or using an agitator bead mill, or using a planetary mill, or using a linear impact mill, or any method which reduces particle size through mechanical means.

In some embodiments an agitator bead mill, or a planetary mill is used to reduce the size of the crystalline anodic EC particles, using milling media that is 0.03 mm in diameter, or 0.05 mm in diameter, or 0.1 mm in diameter, or 0.2 mm in diameter, or 0.3 mm in diameter, or 0.4 mm in diameter, or 0.5 mm in diameter. In some embodiments an agitator bead mill, or a planetary mill is used to reduce the size of the particles, using milling media that comprises a hard ceramic material, such as a hard ceramic material containing $ZrO_2$, or $HfO_2$, or $Y_2O_3$, or an alloy of $ZrO_2$ and $HfO_2$, or an alloy of $ZrO_2$ and $Y_2O_3$, or an alloy of $ZrO_2$ and $HfO_2$ and $Y_2O_3$, or $CeO_2$, or an alloy of $ZrO_2$ and $CeO_2$, or $SiO_2$, or an alloy of $ZrO_2$ and $SiO_2$, or even steel.

In some embodiments an agitator bead mill, or a planetary mill is used to reduce the size of the particles, using water, isopropyl alcohol (IPA), propylene glycol propyl ether (PGPE), or heptanol as the solvent. In some embodiments, low molecular weight alcohols (e.g., propanol or butanol), or organic solvents with viscosity less than 5 cP are used as a solvent. In some embodiments an agitator bead mill, or a planetary mill is used to reduce the size of the particles, using multiple milling cycles, wherein each cycle has an active milling period and an inactive period wherein the mill is allowed to cool. In some embodiments an agitator bead mill, or a planetary mill is used to reduce the size of the particles, using a milling speed of 200 rpm, or 300 rpm, or 400 rpm, or 500 rpm, or 600 rpm, or 700 rpm, or 800 rpm, or 900 rpm, or 1000 rpm. In some embodiments an agitator bead mill, or a planetary mill is used to reduce the size of the particles, wherein the active milling period has a duration of from 1 to 10 min, and an inactive duration of from 1 to 10 min, and a total of from 5 to 50 cycles. In some embodiments an agitator bead mill, or a planetary mill is used to reduce the size of the particles, wherein the active milling period has a duration of 1 min, or 2 min, or 3 min, or 4 min, or 5 min, or 6 min, or 7 min, or 8 min, or 9 min, or 10 min, or from 1 to 10 min, or from 2 to 5 min, or from 3 to 6 min, and an inactive duration of 1 min, or 2 min, or 3 min, or 4 min, or 5 min, or 6 min, or 7 min, or 8 min, or 9 min, or 10 min, or from 1 to 10 min, or from 2 to 7 min, or from 2 to 6 min, and a total of from 5 cycles, or 10 cycles, or 15 cycles, or 20 cycles, or 25 cycles, or 30 cycles, or 35 cycles, or 40 cycles, or 45 cycles, or 50 cycles, or from 5 to 50 cycles, or from 10 to 30 cycles, or from 10 to 20 cycles, or from 20 to 30 cycles. In some embodiments an agitator bead mill, or a planetary mill is used to reduce the size of the particles, wherein the mill is cooled and milling is performed for a duration of 10 min to 10 hours, or 20 min, or 30 min, or 40 min, or 50 min, or 1 hour, or 1.5 hours, or 2 hours, or 3 hours, or 5 hours, or 7.5 hours, or 10 hours, or from 1 to 2 hours, or from 1 to 3 hours, or from 1 to 5 hours. In some embodiments an agitator bead mill, or a planetary mill is used to reduce the size of the particles, wherein the milling is performed until the average particle size is less than 500 nm in diameter, or less than 300 nm in diameter, or less than 250 nm diameter, or less than 200 nm diameter, or less than 150 nm diameter, or less than 100 nm diameter.

In some embodiments, milling is performed in a continuous manner. In some embodiments, milling is performed in a continuous manner with fractions of the total milling volume. In some embodiments, milling is performed in a continuous manner with fractions of the total milling volume where the remainder of the total milling volume is stored in a storage vessel allowing cooling. In some embodiments, milling is performed in a continuous manner such that the active milling period and the inactive milling period are the same as milling performed in a batch manner. In some embodiments, milling is performed using a mill with continuous circulation of the slurry from a holding tank to the milling chamber and/or a cooled milling chamber, which optionally enables milling processes without cooling periods.

In some embodiments, there is a first grinding step and a second grinding step using different methods to reduce the size of the crystalline anodic EC particles. In some embodiments, the first grinding step to reduce the size of particles comprises a mortar and pestle, and the second grinding step to reduce the size of the particles comprises an agitator bead mill, or a planetary mill. In some embodiments the first grinding step comprises an agitator bead mill, or a planetary mill with a larger media size and the second grinding step comprises an agitator bead mill, or a planetary mill with a smaller media size.

In some embodiments the mean particle size of the size-reduced crystalline anodic EC nanostructures after grinding is from 50 to 300 nm, or from 100 to 300 nm, or from 150 to 300 nm, or from 200 to 300 nm, or from 250 to 300 nm, or from 100 to 250 nm, or from 50 to 250 nm, or from 50 to 200 nm, or from 50 to 150 nm, or from 50 to 100, or less than 300 nm, or less than 250 nm, or less than 200 nm, or less than 150 nm, or less than 100 nm. In some embodiments the median particle size of the size-reduced crystalline anodic EC nanostructures after grinding is from 50 to 300 nm, or from 100 to 300 nm, or from 150 to 300 nm, or from 200 to 300 nm, or from 250 to 300 nm, or from 100 to 250 nm, or from 50 to 250 nm, or from 50 to 200 nm, or from 50 to 150 nm, or from 50 to 100, or less than 300 nm, or less than 250 nm, or less than 200 nm, or less than 150 nm, or less than 100 nm.

In some embodiments the polydispersity index (as defined in the ISO standard document 13321:1996 E and ISO 22412:2008) of the particle size distribution of the crystalline anodic EC nanostructures after grinding is less than 0.4, or less than 0.35 or less than 0.3, or less than 0.25, or less than 0.2, or less than 0.15, or less than 0.1, or from 0.1 to 0.2, or from 0.1 to 0.3. In some embodiments the coefficient of variation of the size-reduced crystalline anodic EC nanostructures after grinding is less than 0.6, or less than 0.55 or less than 0.5, or less than 0.45, or less than 0.4, or less than 0.35, or less than 0.3, or from 0.3 to 0.45, or from 0.3 to 0.55.

In some embodiments the mean particle size of the size-reduced crystalline anodic EC nanostructures after grinding, washing, and separating from the washing fluid, is from 50 to 300 nm, or from 100 to 300 nm, or from 150 to 300 nm, or from 200 to 300 nm, or from 250 to 300 nm, or from 100 to 250 nm, or from 50 to 250 nm, or from 50 to 200 nm, or from 50 to 150 nm, or from 50 to 100, or less than 300 nm, or less than 250 nm, or less than 200 nm, or less than 150 nm, or less than 100 nm. In some embodiments the median particle size of the size-reduced crystalline anodic EC nanostructures after grinding, washing, and separating from the washing fluid, is from 50 to 300 nm, or from 100 to 300 nm, or from 150 to 300 nm, or from 200 to 300 nm, or from 250 to 300 nm, or from 100 to 250 nm, or from 50 to 250 nm, or from 50 to 200 nm, or from 50 to 150 nm, or from 50 to 100, or less than 300 nm, or less than 250 nm, or less than 200 nm, or less than 150 nm, or less than 100 nm.

In some embodiments the polydispersity index (as defined in the ISO standard document 13321:1996 E and ISO 22412:2008) of the particle size distribution of the size-reduced crystalline anodic EC nanostructures after grinding, washing, and separating from the washing fluid, is less than 0.4, or less than 0.35 or less than 0.3, or less than 0.25, or less than 0.2, or less than 0.15, or less than 0.1, or from 0.1 to 0.2, or from 0.1 to 0.3. In some embodiments the coefficient of variation of the particle size distribution of the size-reduced crystalline anodic EC nanostructures after grinding, washing, and separating from the washing fluid, is less than 0.6, or less than 0.55 or less than 0.5, or less than 0.45, or less than 0.4, or less than 0.35, or less than 0.3, or from 0.3 to 0.45, or from 0.3 to 0.55.

In some embodiments the mean particle size of the crystalline anodic EC nanostructures after a first grinding step is from 50 to 300 nm, or from 100 to 300 nm, or from 150 to 300 nm, or from 200 to 300 nm, or from 250 to 300 nm, or from 100 to 250 nm, or from 50 to 250 nm, or from 50 to 200 nm, or from 50 to 150 nm, or from 50 to 100, or less than 300 nm, or less than 250 nm, or less than 200 nm, or less than 150 nm, or less than 100 nm. In some embodiments the polydispersity index (as defined in the ISO standard document 13321:1996 E and ISO 22412:2008) of the particle size distribution of the size-reduced crystalline anodic EC nanostructures after a first grinding step, is less than 0.4, or less than 0.35 or less than 0.3, or less than 0.25, or less than 0.2, or less than 0.15, or less than 0.1, or from 0.1 to 0.2, or from 0.1 to 0.3. In some embodiments the coefficient of variation of the particle size distribution of the size-reduced crystalline anodic EC nanostructures after a first grinding step, is less than 0.6, or less than 0.55 or less than 0.5, or less than 0.45, or less than 0.4, or less than 0.35, or less than 0.3, or from 0.3 to 0.45, or from 0.3 to 0.55.

In some embodiments the mean particle size of the heat treated crystalline anodic EC nanostructures after a first grinding step, and a second grinding step is from 50 to 300 nm, or from 100 to 300 nm, or from 150 to 300 nm, or from 200 to 300 nm, or from 250 to 300 nm, or from 100 to 250 nm, or from 50 to 250 nm, or from 50 to 200 nm, or from 50 to 150 nm, or from 50 to 100, or less than 300 nm, or less than 250 nm, or less than 200 nm, or less than 150 nm, or less than 100 nm. In some embodiments the polydispersity index (as defined in the ISO standard document 13321:1996 E and ISO 22412:2008) of the particle size distribution of the crystalline anodic EC nanostructures after a first grinding step, and a second grinding step is less than 0.4, or less than 0.35 or less than 0.3, or less than 0.25, or less than 0.2, or less than 0.15, or less than 0.1, or from 0.1 to 0.2, or from 0.1 to 0.3. In some embodiments the coefficient of variation of the particle size distribution of the crystalline anodic EC nanostructures after a first grinding step, and a second grinding step is less than 0.6, or less than 0.55 or less than 0.5, or less than 0.45, or less than 0.4, or less than 0.35, or less than 0.3, or from 0.3 to 0.45, or from 0.3 to 0.55.

To those of ordinary skill in the relevant art, the methodology of size-reduction of particles by mechanical means is an exercise that must be optimized. For example, if the materials are insufficiently size-reduced, the average particle size may be too large for the application. In an application where the size-reduced particles will be formulated with a liquid and suspended as a dispersion, insufficiently size-reduced particles may be unstable as a dispersion or may be stable as a dispersion but not usable because the insufficiently size-reduced particles may precipitate in a time less than the time required between the preparation of the dispersion and the coating of the dispersion. Sometimes it is also possible to overly size-reduce the particles. In some circumstances, overly size-reduced particles may agglomerate into larger particles. In other circumstances, overly size-reduced particles may become less crystalline than desired, alter crystal structure, or even decompose. To those of skill in the art, the required degree of size-reduction may be modified by the use of additives that support increased dispersion stability and/or decreased agglomeration. Certain measurements such as the determination of zeta potential may guide the operator to the appropriate degree of size-reduction for a given material and in a given solvent.

In some embodiments, after crystalline anodic EC particles are size-reduced by grinding, the resulting nanostructures are filtered to remove the grinding media and any other large diameter solids. In some embodiments the filter pore diameter is 0.7 micron or less. In some embodiments the filter pore diameter is 0.45 micron or less. In some embodiments the filter pore diameter is 0.18 micron or less.

Coating Crystalline Anodic EC Nanostructures

In some embodiments, the crystalline anodic EC nanostructures are coated onto a substrate using slot die coating, and the wet coating thickness is from 25 to 40 microns, or from 30 to 50 microns, or from 50 to 80 microns. The concentration by mass of the solid nanostructures determines what wet coating thickness is required to achieve a target dry film thickness. In some embodiments, the dry film thickness is approximately 1 micron, or from 0.1 to 10 microns, or from 0.5 to 1.5 microns, or from 0.2 to 2 microns.

In some embodiments, a dry film of crystalline anodic EC nanostructures is targeted, which has an approximate thickness of 0.5 microns, or 1 microns, or 1.5 microns, or 2 microns, or from 0.2 to 2 microns, and an approximate capacity of 10 mC/cm$^2$, or 20 mC/cm$^2$, or 30 mC/cm$^2$, or 40 mC/cm$^2$, or 50 mC/cm$^2$, or from 10 mC/cm$^2$ to 50 mC/cm$^2$, or from 20 mC/cm$^2$ to 40 mC/cm$^2$. In order to obtain the targeted dry films, an ink can be coated with a solids loading greater than 4 wt %, or greater than 6 wt %, or greater than 8 wt %, or greater than 10 wt %, or greater than 15 wt %, or greater than 20 wt %, or from 2 to 50 wt %, or from 2 to 20 wt %, or from 5 to 15 wt %, or from 2 to 10 wt %, and have a wet coating thickness of greater than 2 microns, or greater than 5 microns, or greater than 10 microns, or greater than 20 microns, or greater than 30 microns, or greater than 40 microns, or greater than 50 microns, or from 2 to 60 microns.

In some embodiments, the crystalline anodic EC nanostructures are coated onto a substrate using slot die coating, and the coating speed is from 400 to 600 cm/min, or from 200 to 500 cm/min. Different solvents can be used for coating, such as water, 1-propanol, 2-propanol, propylene glycol propyl ether (PGPE), di(propylene glycol) methyl ether (diPGME), and/or di(ethylene glycol) ethyl ether (diEGEE), and the optimal coating speed will be different for different types of solvents. For example, crystalline anodic EC nanostructures dispersed in isopropyl alcohol (IPA) has an optimal coating speed of approximately 50 cm/min, or approximately 100 cm/min, or approximately 200 cm/min, or approximately 400 cm/min, and a process window of approximately 50 to 500 cm/min. In another example, the nanostructures dispersed in PGPE has an optimal coating speed of approximately 50 cm/min, or approximately 100 cm/min, or approximately 200 cm/min, or approximately 400 cm/min, and a process window of approximately 50 to 500 cm/min.

In some embodiments, crystalline anodic EC nanostructures are coated onto a substrate using slot die coating, and the die lip to substrate gap is from 60 to 160 microns. The die lip to substrate gap is larger for thicker desired wet coating thicknesses. In some embodiments, the die lip to substrate gap is twice as large as the desired wet coating thickness.

In some embodiments, the crystalline anodic EC nanostructures are coated onto a substrate using slot die coating, and the gap between the die halves is approximately 100 microns.

In some embodiments, the crystalline anodic EC nanostructures are coated onto a substrate using wet coating techniques, and subsequently dried at 25° C., or 50° C., or 100° C., or 200° C., or 300° C., or 400° C., or 500° C., or from 25° C. to 50° C., or from 25° C. to 100° C., or from 50° C. to 100° C., or from 100° C. to 150° C., or from 100° C. to 200° C., or from 100° C. to 500° C. for 1 min, or 10 min, or 20 min, or 100 min, or 2 hours, or 4 hours, or 10 hours, or from 1 min to 10 hours, or from 10 to 20 min, or from 1 hour to 10 hours, or from 20 min to 2 hours.

In some embodiments the crystalline anodic EC nanostructures are coated onto a substrate using wet coating techniques, and subsequently dried in a vacuum. If a low vapor pressure solvent is used to coat the nanostructures, then a vacuum dry can improve the uniformity and process time required to remove the solvent. In some embodiments, di(propylene glycol) methyl ether (diPGME), and/or di(ethylene glycol) ethyl ether (diEGEE) are used as the coating solvent and vacuum dried at from approximately 150 to 200 mTorr for from approximately 1 to 2 min per approximately 235 cm2 area of wet coated substrate.

In some embodiments the crystalline anodic EC nanostructures are coated onto a substrate using wet coating techniques, and leveling agents are used to improve the coated film uniformity. In some embodiments, a low vapor pressure solvent (e.g., PGPE) is used with a leveling agent with a low surface tension (e.g., 2,3-butane diol).

In some embodiments, a thin film containing the crystalline anodic EC nanostructures does not comprise a binder material. In some embodiments, crystalline anodic EC particles are produced via heat treatment, a colloidal dispersion of crystalline anodic EC nanostructures is produced, and then the ink is coated on a substrate to produce a thin film of crystalline anodic EC nanostructures, wherein the thin film does not comprise a binder material. Many thin films formed from pluralities of nanostructures utilize a binder material to improve the mechanical properties of the resulting films. Silver nanoparticles or nanowires, used for conducting lines on electronic devices use binder materials (such as urethane acrylate, polyvinyl alcohol, gelatin, polypyrrolidone, epoxies, phenolic resins, acrylics, urethanes, silicones, styrene allyl alcohols, polyalkylene carbonates, and/or polyvinyl acetals) to improve the electrical and/or mechanical properties of the films. [U.S. Patent Application Publication 2009/0130433 A1] [WO 2013036519 A1] In some embodiments, the nanostructures described in this disclosure do not require binder materials to achieve good adhesion to the substrates.

In some embodiments, the thin film of crystalline anodic EC nanostructures is arranged on a substrate that comprises a material with a low melting point, and/or a low glass transition temperature, and/or a low softening point. One advantage of the methods described in some embodiments in this disclosure is that crystalline, partially crystalline or amorphous crystalline anodic EC nanostructures can be synthesized, and subsequently deposited on a substrate using low temperature deposition processes. This enables high temperature materials synthesis to impart certain properties to the produced materials, without the need to expose the substrate to high temperatures. In some embodiments, the substrate is exposed to a maximum temperature of 50° C., or a maximum temperature of 100° C., or a maximum temperature of 150° C., or a maximum temperature of 200° C., or a maximum temperature of 250° C., or a maximum temperature of 300° C., or a maximum temperature of 350° C., or a maximum temperature of 400° C., or a maximum temperature of 450° C., or a maximum temperature of 500° C. In some embodiments, the substrate comprises a material with a melting point less than 800° C., or less than 700° C., or less than 600° C., or less than 500° C., or less than 400° C., or less than 300° C., or less than 250° C., or less than 200° C., or less than 150° C., or less than 100° C., or from 100° C. to 200° C., or from 200° C. to 300° C., or from 300° C. to 400° C., or from 400° C. to 500° C., or from 500° C. to 600° C., or from 600° C. to 700° C., or from 700° C. to 800° C., or from 800° C. to 900° C., or from 900° C. to 1000° C., or from 1000° C. to 1100° C., or from 1100° C. to 1200° C., or from 1200° C. to 1300° C., or from 1300° C. to 1400° C., or from 1400° C. to 1500° C., or from 1500° C. to 1600° C., or a glass transition temperature less than 1000° C., or less than 900° C., or less than 800° C., or less than 700° C., or less than 600° C., or less than 500° C., or less than 400° C., or less than 300° C., or less than 250° C., or less than 200° C., or less than 150° C., or less than 100° C., or from 75° C. to 125° C., or from 125° C. to 175° C., or from 175° C. to 225° C., or from 225° C. to 275° C., or from 275° C. to 325° C., or from 325° C. to 375° C., or from 375° C. to 425° C., or from 425° C. to 500° C., or from 500° C. to 600° C., or from 600° C. to 700° C., or from 700° C. to 800° C., or from 800° C. to 900° C., or a softening point less than 1000° C., or less than 900° C., or less than 800° C., or less than 700° C., or less than 600° C., or less than 500° C., or less than 400° C., or less than 300° C., or less than 250° C., or less than 200° C., or less than 150° C., or less than 100° C., or from 75° C. to 125° C., or from 125° C. to 175° C., or from 175° C. to 225° C., or from 225° C. to 275° C., or from 275° C. to 325° C., or from 325° C. to 375° C., or from 375° C. to 425° C., or from 425° C. to 500° C., or from 500° C. to 600° C., or from 600° C. to 700° C., or from 700° C. to 800° C., or from 800° C. to 900° C.

The crystalline anodic EC nanostructures described in this disclosure can be deposited onto substrates using many different low temperature deposition methods. For example, crystalline anodic EC nanostructures can be deposited by wet coating techniques, such as spin, dip, spray, gravure, slot, roll, and ink-jet coating. In some embodiments, these methods can be used to deposit the films onto individual substrates. In some embodiments, these methods can be used to deposit the films in a continuous roll-to-roll process. In some embodiments, the films are deposited in a low-particle clean room environment. In some embodiments, the solvent for the crystalline anodic EC nanostructures can be evaporated in air at room temperature, or the coating solvent can be removed using applied heat, or vacuum, or both applied heat and vacuum. In some embodiments, a post deposition heat treatment can be used, in an air, or inert, or reactive environment. The temperatures used in the post-deposition processes are generally much lower than the temperatures used during particle synthesis. In some cases, the temperature of the post-deposition processes are less than 600° C., or less than 500° C., or less than 400° C., or less than 300° C., or less than 250° C., or less than 200° C., or less than 150° C., or less than 100° C., or from 75° C. to 125° C., or from 125° C. to 175° C., or from 175° C. to 225° C., or from 225° C. to 275° C., or from 275° C. to 325° C., or from 325° C. to 375° C., or from 375° C. to 425° C., or from 425° C. to 500° C., or from 500° C. to 600° C. In some embodiments, the deposited crystalline anodic EC nanostructures film is unreactive with oxygen and/or moisture. In some embodiments, the deposited crystalline anodic EC nanostructures film is maintained in an inert environment (e.g., humidity controlled air or nitrogen) to avoid undesirable reactions with oxygen and/or moisture.

EC Nanostructure Anode Materials and Crystal Structures

This section describes, in some embodiments, an electrochromic (EC) multi-layer stack is described comprising: an EC anode layer comprising crystalline anodic EC nanostructures; an electrically conductive layer; and an outer substrate, wherein the multi-layer stack is incorporated into an EC device, and wherein the EC anode layer does not comprise a binder. The different groups of crystalline anodic EC nanostructures described in this section are compatible with the methods described herein.

In some embodiments, the anode of the multi-layer stacks described herein are crystalline anodic EC nanostructures, for example comprising an alkali metal oxide material. In some embodiments, the alkali metal oxide material comprises one or more metals, for example Mn, Fe, Co, Ni, Sn or combinations thereof. In some embodiments, the alkali metal oxide material comprises one or more first set of metals, for example Mn, Fe, Co, Ni, Sn and combinations thereof, and one or more second set of metals, wherein the second set of metals are selected from the group consisting of Ni, Fe, W, Zn, Y, Ti, Zr, Hf, V, Nb, Ta, Mo, B, Al, Ga, In, Si, Ge, Sn, P, Sb, Te, Mn, Co, and combinations thereof.

In some embodiments, the alkali metal oxide material of the crystalline anodic EC nanostructures comprises an alkali metal, one or more metals, and oxygen. The alkali metal oxide material can contain one or more metals, oxygen, and an alkali metal selected from the group of hydrogen, lithium and sodium.

In some embodiments, the alkali metal oxide material comprises an alkali metal, oxygen, and one or more multivalent anodic elements. The alkali metal oxide material can contain an alkali metal, oxygen, one or more multivalent anodic elements, and one or more maingroup elements that commonly form complex anions. In some embodiments, the multivalent anodic elements are selected from the group of Mn, Fe, Co, Ni, Sn and combinations thereof. In some embodiments, the maingroup elements that commonly form complex anions are selected from the group of P, B, Si, Ge, Sn, Sb, Te and combinations thereof. In some cases, the alkali metal oxide material comprises an alkali metal, oxygen, a first metal selected from the group of Mn, Fe, Co, Ni or Sn, and a second metal selected from the group of P, B, Si, Ge, Sn and Sb.

In some embodiments, the alkali metal oxide material of the crystalline anodic EC nanostructures comprises Li, Ni, O, and at least one metal selected from the group of Al, Ti, Zn, Nb, Mo, Sb, and Te.

In some embodiments, the alkali metal oxide material comprises an alkali metal, oxygen, one or more multivalent anodic elements, and one or more high oxidation state metals. In some embodiments, the multivalent anodic elements are selected from the group of Mn, Fe, Co, Ni, Sn and combinations thereof. The high oxidation state metals can have oxidation states of +6, or +5, or +4. In some embodiments, the high oxidation state metals have oxidation states of +6 and are selected from the group of Cr, Mo, W, Te and combinations thereof. In some embodiments, the high oxidation state metals have oxidation states of +5 and are selected from the group of V, Nb, Ta, P, Sb and combinations thereof. In some embodiments, the high oxidation state metals have oxidation states of +4 and are selected from the group of Ti, Zr, Hf, Sn and combinations thereof.

In some embodiments, the alkali metal oxide material comprises an alkali metal, oxygen, one or more multivalent anodic elements, and one or more fixed oxidation state metals. In some embodiments, the fixed oxidation state metals have oxidation states of +3 and are selected from the group of Y, Al, Ga, In and combinations thereof.

In some embodiments, the alkali metal oxide material of the crystalline anodic EC nanostructures comprises Li, Ni, O, and at least one metal selected from the group of Al, Ti, Zn, Nb, Mo, Sb, and Te.

In some embodiments, the crystalline anodic EC nanostructures comprise an alkali metal oxide material selected from the group consisting of $Li_4NiMO_6$ (where M is W or Te), $LiMn_2O_4$, $Na_2NiMo_2O_8$, $NaNi_{0.5}Ti_{0.5}O_2$, $LiTi_2(PO_4)_3$, $LiMSiO_4$ (where M is Fe, Mn, or Ni), $Na_2Fe(SO_4)_2$, $Li_2Fe(SO_4)_2$, $Li_2Fe_2(SO_4)_3$, $LiFeBO_3$, $LiFe(SO_4)OH$, $ACoSbO_4$, $A_4FeSbO_6$, $Li_{0.8}M(H_2O)_2B(PO_4)_2 \cdot H_2O$ (where M is Mn, Fe and Ni), Prussian blue, $LiNi_{1-x}M_xO_2$ (where M is Al, Co, or Mn), $Li_2Ni(WO_4)_2$, $Na_4M_3(PO_4)_2(P_2O_7)$ (where M is Mn, Fe, Co, or Ni), $Na_7M_4(PO_4)(P_2O_7)_4$, $Na_7M_3(P_2O_7)_3$, $NaK_5Ni_5(P_2O_7)_4$, $Li_{0.9}Ni_{0.45}Ti_{0.55}O_2$, $Li_{1+x/100}Ni_{1/2-x/120}Ti_{1/2-x/120}Mo_{x/150}O_2$ (where x=50, or 20), $Na_3Ni_2MO_6$ (where M is Ta, or Sb), $LiMPO_4$ (where M is Mn, Fe, Co, Ni and/or Zn and Mg), $Li_2M_2(M'O_4)_3$ (where M is Ni, or Fe, and M' is Mo, or W, $Li_3Ni_{2-x}M'_xMO_6$ (where M is Nb, Ta, or Sb, and M' is Zn, Al, or Ti), $A_2M_2TeO_6$ (where A is alkali, and M is Ni, Co, Mg, Mn, or Zn), $Li_xNi_{(2-(4x/3))}Sb_{(x/3)}O_2$, and Prussian blue analogs.

In some embodiments, the anodic EC nanostructures are crystalline, semi-crystalline or amorphous. As used herein, the term "amorphous" implies a general lack of ordering within the crystal lattice of a powder or plurality of particles such that common laboratory techniques including powder x-ray diffraction (PXRD) do not result in the presence of peaks. Amorphous as used herein does not necessarily imply the complete lack of atomic ordering or even a complete lack of peaks as seen by PXRD. In this regard, the term "partially crystalline" refers to a state of order that is higher than amorphous but lower than crystalline while the term "crystalline" comprises a well-ordered material that is readily measured by PXRD and in such an experiment may be described as showing a series of sharp peaks. In this discussion, the terms amorphous, partially crystalline or crystalline imply nothing about particle size. Crystalline does not necessarily imply that the material is completely crystalline, however, and a crystalline material can contain some fraction of amorphous or partially crystalline materials. Additionally, crystalline materials can contain more than one crystal structure (i.e., there can be some degree of phase separation).

In some embodiments, the crystalline anodic EC nanostructures comprise an alkali metal oxide material with a stoichiometry that crystallizes with layers allowing lithium intercalation/deintercalation. In some embodiments, the crystalline anodic EC nanostructures comprise an alkali metal oxide material with a stoichiometry that has a crystal structure containing layers allowing lithium intercalation/deintercalation. Some examples of alkali metal oxide materials that can have such layers are $LiNiO_2$, $LiNi_{1-x}M_xO_2$ (where M is Al, Co, or Mn or combinations thereof), $Li_4NiMO_6$ (where M is W or Te or combinations thereof), $A_2M_2TeO_6$ (here A is alkali and M is Ni, Co, Mg, Mn or Zn or combinations thereof), $Na_3Ni_2MO_6$ (where M is Ta or Sb or combinations thereof), $NaNi_{0.5}Ti_{0.5}O_2$ and $Li_xNi_{(2-(4x/3))}Sb_{(x/3)}O_2$.

In some embodiments, the crystalline anodic EC nanostructures comprise an alkali metal oxide material with a stoichiometry that crystallizes with tunnels allowing lithium intercalation/deintercalation. In some embodiments, the crystalline anodic EC nanostructures comprise an alkali metal oxide material with a stoichiometry that has a crystal structure containing tunnels allowing lithium intercalation/deintercalation. Some examples of alkali metal oxide materials that can have such tunnels are $LiMn_2O_4$, $Li_2Ti_2(PO_4)_3$, $Na_4M_3(PO_4)_2(P_2O_7)$ (where M is Mn, Fe, Co or Ni or combinations thereof), $Na_7M_4(PO_4)(P_2O_7)_4$ (where M is Mn, Fe, Co or Ni or combinations thereof), $(Na_7M_3(P_2O_7)_3$ (where M is Mn, Fe, Co or Ni or combinations thereof), $NaK_5Ni_5(P_2O_7)_4$ (where M is Mn, Fe, Co or Ni or combinations thereof), $LiMPO_4$ (where M is Mn, Fe, Co, Ni and/or Zn, and Mg or combinations thereof).

In some embodiments, the crystalline anodic EC nanostructures comprise an alkali metal framework material with a stoichiometry that crystallizes with tunnels allowing lithium intercalation/deintercalation. In some embodiments, the crystalline anodic EC nanostructures comprise an alkali metal framework material with a stoichiometry that has a crystal structure containing tunnels allowing lithium intercalation/deintercalation. Some examples of alkali metal framework materials that can have such tunnels are Prussian Blue and Prussian blue analogues.

In some embodiments, the crystalline anodic EC nanostructures comprise an alkali metal oxide material with a stoichiometry that crystallizes with hopping pathways allowing lithium intercalation/deintercalation. In some embodiments, the crystalline anodic EC nanostructures comprise an alkali metal oxide material with a stoichiometry that has a crystal structure containing hopping pathways allowing lithium intercalation/deintercalation. Some examples of alkali metal oxide materials that can have such hopping pathways are $Li_3Ni_{2-x}M'_xMO_6$ (where M is Nb, Ta or Sb or combinations thereof, and M' is Zn, Al or Ti or combinations thereof) and $Li_{1+x/100}Ni_{1/2-x/120}Ti_{1/2-x/120}Mo_{x/150}O_2$ (where x=50, or 20).

In some embodiments, the crystalline anodic EC nanostructures comprise a crystal structure selected from the group consisting of disordered rock salt, ordered rock salt, layered $AMO_2$, alpha-$NaFeO_2$, hollandite, layering polytypes, spinel, olivine, Prussian blue crystal structures, NASICON crystal structures, alluaudite crystal structures, pyrophosphate crystal structures, and borophosphate crystal structures.

In some embodiments, the crystalline anodic EC nanostructures have a crystal structure with a structure type that contains layers, tunnels and/or hopping pathways. In some embodiments, the crystalline anodic EC nanostructures have a crystal structure with a structure type that contains layers, tunnels and/or hopping pathways that allow for Li intercalation/deintercalation. Some examples of crystalline anodic EC nanostructures have a crystal structure with a structure type that contain layers are disordered rock salt, layered $AMO_2$, alpha-$NaFeO_2$ and layering polytypes. Some examples of crystalline anodic EC nanostructures have a crystal structure with a structure type that contain tunnels are olivine, alluaudite, hollandite, NASICON, Prussian blue, pyrophosphate and borophosphate. Some examples of crystalline anodic EC nanostructures have a crystal structure with a structure type that contain hopping pathways are ordered rock salt and spinel.

In some embodiments, the lithium nickel oxide or alkali transition metal tellurate nanostructures comprise crystalline, semi-crystalline or amorphous lithium nickel oxide (containing Nb, Ta, Sb, Zn, Al and/or Ti), or alkali transition metal tellurate (containing Ni, Co, Mg, Mn and/or Zn). One advantage identified by the preparation of films using embodiments of the methodologies disclosed herein is that the mixed metal oxides, and in particular the lithium nickel oxides and alkali transition metal tellurates, may not experience a phase change upon repetitive intercalation and de-intercalation with Li during the switching of the EC material from one state to another. Not to be limited by theory, the mixed metal oxides crystal structures may have large open channels or layering throughout, (FIG. 2) that are hypothesized to aid in the diffusion of Li and can accommodate the Li ions without detrimental lattice strain and phase changes that may be associated with poor EC durability. It is therefore desirable to produce mixed metal oxide thin films containing Li diffusion pathways such as large open channels, hopping pathways, or layering. Not to be limited by theory, in a material in which ions are to be repetitively intercalated and deintercalated, it is desirable to have an interstitial site that is sufficiently large to enable ion mobility. Further, it is desirable to have an interstitial site that is sufficiently large such that repetitive ion removal and insertion does not result in significant lattice strain, furthermore, it is desirable to have a crystal structure that can tolerate repetitive ion removal and insertion without undergoing a structural phase transition. In some cases, crystal structures with large open channels, hopping pathways or layering can accommodate Li ions in interstitial positions without significant lattice strain. In some crystal structures, 5 Å spaces are seen. In other structures, 4 Å, or 3 Å, or 2 Å spaces are present that facilitate mobility of the Li. This includes mixed metal oxide, including lithium nickel oxide, alkali nickel metal oxide, alkali transition metal tellurate, or alkali transition metal phosphate thin films with crystal structures that include disordered rock salt, ordered rock salt, hexagonal layered $AMO_2$ (for example A=alkali, M=Ni but many other combinations are known), layering polytypes of $AMO_2$ (e.g., $A_3(M_2M')O_6$ with M-M' ordering, and O3, P2 and P3 polytypes), spinel, olivine (e.g., conventional or substituted $LiFePO_4$), NASICON, LISICON, alluaudite (related to $LiFePO_4$), or many pyrophosphates, for use as EC active layers in EC multi-layer stacks and devices.

One non-limiting example of an alkali that can be included in the crystalline anodic EC nanostructures is lithium. Lithium has ionic mobility in closest-packed structures and in low dimensional structures (England et al. J. Solid State Chem. 1983, 49, 289). Metal-oxygen ordering in crystalline or partially crystalline particles of crystalline anodic EC nanostructures containing mixed metal oxides is relevant to Li ion diffusion. The term "mixed metal oxide" refers to a metal and oxygen containing material in which at least two metals are present (e.g., M1 and M2). In certain embodiments, these metals include a metal that may become mobile under the application of voltage and a metal that may undergo oxidation and/or reduction (redox) under the application of voltage. In certain embodiments, the mobile metal, M1, may be an alkali metal, and the redox metal, M2, may be a transition metal. In fact, even materials that may be described as nominally amorphous will contain a degree of local metal-oxygen ordering that is similar to what may be seen in crystalline or partially crystalline materials. Not be held to any particular theory, in this discussion, local metal-oxygen ordering in amorphous materials may be viewed as similar to certain crystal structures or structure types even when the ability to measure such structure is limited by the nature of the material. Furthermore, the presence of certain types of metals may also be relevant to Li ion diffusion. For example, if M1 is lithium and M2 is nickel, the presence of a third metal, M2', may be beneficial. In provisional U.S. patent appl. 62/028,257 KNSTRL 14-3000, the term "bleached state stabilizing element" was used to mean an element that acts to increase the bleached state voltage of lithium nickel oxide without adversely affecting the transmissivity of its fully bleached state. In general, bleached state stabilizing elements are those elements that readily form as colorless or lightly colored oxide solids in their highest oxidation state (e.g., often formally d0), and where the highest oxidation state is 3+ or greater. One example of a crystalline anodic EC nanostructures is lithium nickel oxide. In the case of lithium nickel oxide (containing Nb, Ta, Sb, Zn, Al and/or Ti), or alkali transition metal tellurate (containing Ni, Co, Mg, Mn and/or Zn), Nb, Ta, Sb, Zn, Al and Ti or Co, Mg, Mn and Zn, respectively, may be described as M2'. These metals may be partially substituted for M2 (Ni) but they often may not undergo reduction and/or oxidation upon the application of voltage, or may undergo reduction and/or oxidation upon the application of a different voltage. Instead, these metals may function as a structural spacer in a manner that is beneficial to Li ion diffusion. Again, not to be held to any particular theory, these structural spacers can facilitate repetitive lithium intercalation and de-intercalation by reducing lattice strain and/or by generating an environment that is less susceptible to the lattice strain that does exist. Certain compounds and structures, including those other than lithium nickel oxide, may be described in this manner. For example, the NaCl or rock salt structure is one of the most common AX structure types (illustrated in FIG. 2d). Both anions and cations are octahedrally coordinated resulting in an interconnected 3-dimensional network of edge-sharing octahedra. If M1 and M2 are randomly ordered on the A-site, the structure may be described as disordered rock salt. If M1 and M2 are ordered on the A-site, the structure may be described as ordered rock salt. Many examples of both structure types are known to exist. Furthermore, if X is oxygen and A is an equal mixture of M1 and M2 then the structure may be represented as $M1_xM2_yO_z$ where z=x*(the oxidation state of M1)+y*(the oxidation state of M2)/2. For example when M1=Li+ and M2=$Fe^{3+}$ in $LiFeO_2$, x and y=1 and z=2. Differences between the local environments of ordered and disordered rock salt structures may be seen in FIG. 2d vs. 2g. These differences arise both from the ratio of metals and from the manner by which the metals are ordered. In certain instances, different types of ordering are possible. For example in the case of $LiNiO_2$, $Li^+$ and $Ni^{3+}$ are ordered in the (111) direction of rock salt leading to a 2D layer structure (illustrated in FIG. 2e). In such an ordering, it is also possible to create stacking polytypes such as O3, T1, P2 and P3, as described above. As an example, the structural differences between mixed metal oxides of the lithium nickel oxide or alkali transition metal tellurate types are seen in FIG. 2. In some embodiments, the structure of lithium nickel oxide (containing Nb, Ta, Sb, Zn, Al and/or Ti), or alkali transition metal tellurate (containing Ni, Co, Mg, Mn and/or Zn) may comprise largely the same arrangement of atoms, however certain combinations of metals may result in further order or disorder within a structure type without entirely impacting the relative arrangement of metal-oxygen octahedra.

Other types of materials are known which demonstrate the characteristics listed above. For example, materials such as $Li_{0.8}Fe(H_2O)_2B(PO_4)_2*H_2O$ (not shown) comprise octahedrally coordinated Fe where the coordinated oxygens come partially from the tetrahedral phosphate groups and partially from coordinated water molecules. Oxygens bound to tetrahedrally coordinated boron bridge borate and phosphate tetrahedra. These borate and phosphate groups polymerize into helical chains that are interconnected by Fe octahedra in between which empty locations exist that host $Li^+$ ions. A more detailed description of this material may be found in Asl et al. Chem. Materials 2015, 27(20) 7058-7069.

In some embodiments, crystalline, semi-crystalline or crystalline anodic EC nanostructures may be nano-scale in two dimensions (nanowires) or nano-scale in 3 dimensions (nanoparticles).

In some cases, a nanostructure ink and/or thin film containing crystalline anodic EC nanostructures do not contain additives, such as dispersants to prevent the nanostructures from agglomerating, or binders to improve the mechanical properties of the films. In some embodiments, the crystalline, semi-crystalline or amorphous crystalline anodic EC particles are produced by heat treatment, then size-reduced by grinding to produce crystalline, semi-crystalline or amorphous anodic EC nanostructures, then the nanostructures are formulated into an ink, then the ink is coated onto a substrate. In an embodiment, the ink is made without the addition of a binder which simplifies the formulation of the material and improves the manufacturability of EC films deposited using methods described herein.

Electrochromic Devices with EC Nanostructure Anodes

In some embodiments, the anode of an EC multi-layer stack comprises crystalline anodic EC nanostructures and has desirable optical and electrical characteristics.

EC panels with crystalline anodic EC nanostructures described herein can contain one EC multi-layer stack (or, one device), or more than one EC multi-layer stack (or, more than one device). In some embodiments, EC panels described herein contain more than one EC device arranged such that incident light passes through both devices. An example is a panel with two EC devices laminated together, which has a very low Tvis in the dark state because the absorption of both devices is compounded. In some embodiments, the EC devices and panels are formed within an insulated glass unit (IGU). In some embodiments, more than one EC device is integrated into a single EC panel and electrically connected in series or in parallel.

This section describes the incorporation of the thin films and multi-layer stacks described herein into an EC device. In some embodiments, the anode of an EC device comprises crystalline anodic EC nanostructures. The crystalline anodic EC nanostructure anodes in EC devices can be synthesized with crystal structures containing large channels and/or layered crystal structures. In some embodiments, the anode of an EC device comprises crystalline anodic EC nanostructures, synthesized by heat treatment, that were size-reduced by grinding, and coated on a substrate.

In some embodiments, the anode of an EC multi-layer stack comprises crystalline anodic EC nanostructures, and the anode film has a charge capacity (Q) greater than 1 $mC/cm^2$, or greater than 2 $mC/cm^2$, or greater than 5 $mC/cm^2$, or greater than 10 $mC/cm^2$, or greater than 15 $mC/cm^2$, or greater than 20 $mC/cm^2$, or greater than 25 $mC/cm^2$, or greater than 30 $mC/cm^2$, or greater than 35 $mC/cm^2$, or greater than 40 $mC/cm^2$, or greater than 45 $mC/cm^2$, or greater than 50 $mC/cm^2$, or greater than 60 $mC/cm^2$, or greater than 80 $mC/cm^2$, or from 1 to 100 $mC/cm^2$, or from 10 to 100 $mC/cm^2$, or from 20 to 100 $mC/cm^2$, or from 20 to 60 $mC/cm^2$.

In some embodiments, EC devices comprising crystalline anodic EC nanostructures have fast switching speeds. In some cases the rate, defined as the percent loss of the charge capacity when the constant current is applied for the materials to switch within 2 minutes, is greater than −5%, or greater than −10%, or greater than −15%, or greater than −20%, or greater than −25%, or greater than −30%, or from 0 to −5%, or from 0 to −10%, or from 0 to −15%, or from 0 to −20%, or from 0 to −25%, or from 0 to −30%. Not to be limited by theory, the crystal structure of lithium nickel oxide or alkali transition metal tellurate enables a high ionic mobility for the intercalated ions (e.g. Lit).

In some embodiments, the anode of an EC multi-layer stack comprises crystalline anodic EC nanostructures, and the anode or the multi-layer stack has a transmission at 550 nm in the clear state ($T_{clear}$) or bleached state ($T_{bleached}$) greater than 30%, or greater than 40%, or greater than 50%, or greater than 60%, or greater than 65%, or greater than 70%, or greater than 75%, or greater than 80%, or greater than 85%, or greater than 90%, or greater than 95%, or from 30% to 99%, or from 40% to 99%, or from 50% to 99%, or from 60% to 99%, or from 70% to 99%.

In some embodiments, the anode of an EC multi-layer stack comprises crystalline anodic EC nanostructures, and the anode or the multi-layer stack has a transmission at 550 nm in the dark state ($T_{dark}$) less than 30%, or less than 25%, or less than 20%, or less than 15%, or less than 10%, or less than 5%, or from 30% to 0.01%, or from 25% to 0.01%, or from 20% to 0.01%, or from 15% to 0.01%, or from 10% to 0.01%.

In some embodiments, the anode of an EC multi-layer stack comprises crystalline anodic EC nanostructures, and the anode film has a coloration efficiency at 550 nm greater than 10 $cm^2/C$, or greater than 15 $cm^2/C$, or greater than 20 $cm^2/C$, or greater than 25 $cm^2/C$, or greater than 30 $cm^2/C$, or greater than 35 $cm^2/C$, or greater than 40 $cm^2/C$, or greater than 45 $cm^2/C$, or greater than 50 $cm^2/C$, or from 10 $cm^2/C$ to 60 $cm^2/C$, or from 15 $cm^2/C$ to 60 $cm^2/C$, or from 20 $cm^2/C$ to 60 $cm^2/C$, or from 25 $cm^2/C$ to 60 $cm^2/C$, or from 30 $cm^2/C$ to 60 $cm^2/C$, or from 20 $cm^2/C$ to 50 $cm^2/C$, or from 30 $cm^2/C$ to 50 $cm^2/C$.

In some embodiments, the anode of an EC multi-layer stack comprises crystalline anodic EC nanostructures, and the anode or the multi-layer stack has a b* in the clear state ($T_{clear}$) or bleached state ($T_{bleached}$) from −20 to 20, or from −15 to 15, or from −10 to 10, or from −20 to 10, or from 0 to 10, or from 0 to 20, or from −5 to 5, or from −2 to 2, or from −2 to 5, or from −5 to 2, or from −5 to 10, or from −10 to 5, or from −10 to 2, or from −2 to 10.

In some embodiments, the EC panels with crystalline anodic EC nanostructures described herein have a clear state CIE-Lab b* in transmission from −10 to 10, or from −8 to 8, or from −6 to 6, or from −5 to 5, or from 0 to 10, or from 2 to 8, or from 3 to 6, or from 4 to 5, or approximately 5, or approximately 4.5, or approximately 4, or approximately 2, or approximately −5, or approximately −4, or approximately −2, or approximately 0. In some embodiments, the EC panels described herein have a clear state CIE-Lab a* in transmission from −10 to 10, or from −8 to 8, or from −5 to 5, or from −4 to 4, or from −4 to 2, or from −2 to 4, or from −2 to 2, or from −1 to 1, or approximately −1, or approximately −0.5, or approximately 0, or approximately 0.5, or approximately 1. In some embodiments, the EC panels described herein have a clear state CIE-Lab L* in transmission from 50 to 100, or from 60 to 100, or from 70 to 100, or from 80 to 100, or from 85 to 100, or from 50 to 95, or from 60 to 95, or from 70 to 95, or from 80 to 95, or from 85 to 95, or from 85 to 90, or from 70 to 95, or approximately 90, or approximately 87.5, or approximately 85.

In some embodiments, the EC panels with crystalline anodic EC nanostructures described herein have a clear state CIE-Lab b* in transmission from −10 to 10, or from −8 to 8, or from −6 to 6, or from −5 to 5, or from 0 to 10, or from 2 to 8, or from 3 to 6, or from 4 to 5, or approximately 5, or approximately 4.5, or approximately 4, or approximately 2, or approximately −5, or approximately −4, or approximately −2, or approximately 0; and CIE-Lab a* in transmission from −10 to 10, or from −8 to 8, or from −5 to 5, or from −4 to 4, or from −4 to 2, or from −2 to 4, or from −2 to 2, or from −1 to 1, or approximately −1, or approximately −0.5, or approximately 0, or approximately 0.5, or approximately 1; and a CIE-Lab L* in transmission from 50 to 100, or from 60 to 100, or from 70 to 100, or from 80 to 100, or from 85 to 100, or from 50 to 95, or from 60 to 95, or from 70 to 95, or from 80 to 95, or from 85 to 95, or from 85 to 90, or from 70 to 95, or approximately 90, or approximately 87.5, or approximately 85.

In some embodiments, the EC panels with crystalline anodic EC nanostructures described herein have a clear state $T_{vis}$ greater than 50%, or greater than 55%, or greater than 60%, or greater than 65%, or greater than 70%, or greater than 75%, or greater than 80%, or greater than 85%, or greater than 90%, or greater than 95%, or from 60% to 99%, or from 60% to 95%, or from 60% to 90%, or from 70% to 90%, or from 70% to 85%, or from 70% to 80%.

In some embodiments, the EC panels with crystalline anodic EC nanostructures described herein have a clear state color uniformity (deltaE) in transmission less than 15, or less than 10, or less than 8, or less than 5, or from 0 to 15, or from 0 to 10, or from 0 to 5.

In some embodiments, the EC panels with crystalline anodic EC nanostructures described herein have a dark state CIE-Lab b* in transmission from −10 to 10, or from −8 to 8, or from −6 to 6, or from −5 to 5, or from 0 to 10, or from 2 to 8, or from 3 to 6, or from 4 to 5, or from −10 to 0, or from −8 to 0, or from −6 to −1, or from −5 to −2, or approximately −4, or approximately −3.5, or approximately −3, or approximately 5, or approximately 4.5, or approximately 4, or approximately 2, or approximately −5, or approximately −2, or approximately 0. In some embodiments, the EC panels described herein have a dark state CIE-Lab a* in transmission from −10 to 0, or from −8 to 2, or from −8 to 4, or from −8 to 8, or from −7 to −5, or from −6.5 to −5.5, or approximately −6.5, or approximately −6, or approximately −5.5. In some embodiments, the EC panels described herein have a dark state CIE-Lab L* in transmission from 0 to 40, or from 0 to 30, or from 0 to 20, or from 10 to 30, or from 15 to 25, or approximately 10, or approximately 15, or approximately 20.

In some embodiments, the EC panels with crystalline anodic EC nanostructures described herein have a dark state CIE-Lab b* in transmission from −10 to 10, or from −8 to 8, or from −6 to 6, or from −5 to 5, or from 0 to 10, or from 2 to 8, or from 3 to 6, or from 4 to 5, or from −10 to 0, or from −8 to 0, or from −6 to −1, or from −5 to −2, or approximately −4, or approximately −3.5, or approximately −3, or approximately 5, or approximately 4.5, or approximately 4, or approximately 2, or approximately −5, or approximately −2, or approximately 0; and a CIE-Lab a* in transmission from −10 to 0, or from −8 to 2, or from −8 to 4, or from −8 to 8, or from −7 to −5, or from −6.5 to −5.5, or approximately −6.5, or approximately −6, or approximately −5.5; and a CIE-Lab L* in transmission from 0 to 40, or from 0 to 30, or from 0 to 20, or from 10 to 30, or from 15 to 25, or approximately 10, or approximately 15, or approximately 20.

In some embodiments, the EC panels with crystalline anodic EC nanostructures described herein have a dark state $T_{vis}$ less than 35%, or less than 30%, or less that 25%, or less than 20%, or less than 15%, or less than 10%, or less than 5%, or less than 4%, or less than 3%, or less than 2%, or less than 1%, or less than 0.1%, or less than 0.01%, or less than 0.001%, or from 0.001% to 20%, or from 0.001% to 15%, or from 0.001% to 10%, or from 0.001% to 5%, or from 0.01% to 5%, or from 0.1% to 50%.

In some embodiments, the EC panels with crystalline anodic EC nanostructures described herein have a dark state color uniformity (deltaE) in transmission less than 15, or less than 10, or less than 8, or less than 5, or from 0 to 15, or from 0 to 10, or from 0 to 5.

In some embodiments, the EC panels with crystalline anodic EC nanostructures described herein have a tinted state CIE-Lab b* in transmission from 0 to 10, or from 2 to 8, or from 3 to 6, or from 4 to 5, or from −10 to 0, or from −8 to 0, or from −6 to −1, or from −5 to −2, or from −10 to 10, or from −8 to 8, or from −6 to 6, or from −4 to 4, or from −2 to 2, or approximately 5, or approximately 4.5, or approximately 4, or approximately 2, or approximately 0, or approximately −2, or approximately −4, or approximately −3.5, or approximately −3. In some embodiments, the EC panels described herein have a tinted state CIE-Lab a* in transmission from −10 to 10, or from −8 to 8, or from −5 to 5, or from −4 to 4, or from −4 to 2, or from −2 to 4, or from −2 to 2, or from −1 to 1, or from −10 to 0, or from −8 to 2, or from −8 to 4, or from −7 to −5, or from −6.5 to −5.5, or approximately −6.5, or approximately −6, or approximately −5.5, or approximately −4, or approximately −2, or approximately 2, or approximately 4, or approximately −1, or approximately −0.5, or approximately 0, or approximately 0.5, or approximately 1. In some embodiments, the EC panels described herein have a tinted state CIE-Lab L* in transmission from 0 to 90, or from 20 to 90, or from 40 to 90, or from 60 to 90, or approximately 90, or approximately 87.5, or approximately 85, or from 80 to 100, or from 85 to 100, or from 85 to 95, or from 85 to 90, or approximately 90, or approximately 87.5, or approximately 85, or from 0 to 40, or from 0 to 30, or from 0 to 20, or from 10 to 30, or from 15 to 25, or approximately 90, or approximately 87.5, or approximately 85, or approximately 70, or approximately 60, or approximately 50, or approximately 40, or approximately 30, or approximately 20, or approximately 10, or approximately 15.

In some embodiments, the EC panels with crystalline anodic EC nanostructures described herein have a tinted state CIE-Lab b* in transmission from 0 to 10, or from 2 to 8, or from 3 to 6, or from 4 to 5, or from −10 to 0, or from −8 to 0, or from −6 to −1, or from −5 to −2, or from −10 to 10, or from −8 to 8, or from −6 to 6, or from −4 to 4, or from −2 to 2, or approximately 5, or approximately 4.5, or approximately 4, or approximately 2, or approximately 0, or approximately −2, or approximately −4, or approximately −3.5, or approximately −3; and -Lab a* in transmission from −10 to 10, or from −8 to 8, or from −5 to 5, or from −4 to 4, or from −4 to 2, or from −2 to 4, or from −2 to 2, or from −1 to 1, or from −10 to 0, or from −8 to 2, or from −8 to 4, or from −7 to −5, or from −6.5 to −5.5, or approximately −6.5, or approximately −6, or approximately −5.5, or approximately −4, or approximately −2, or approximately 2, or approximately 4, or approximately −1, or approximately −0.5, or approximately 0, or approximately 0.5, or approximately 1; and a CIE-Lab L* in transmission from 0 to 90, or from 20 to 90, or from 40 to 90, or from 60 to 90, or approximately 90, or approximately 87.5, or approximately 85, or from 80 to 100, or from 85 to 100, or from 85 to 95, or from 85 to 90, or approximately 90, or approximately 87.5, or approximately 85, or from 0 to 40, or from 0 to 30, or from 0 to 20, or from 10 to 30, or from 15 to 25, or approximately 90, or approximately 87.5, or approximately 85, or approximately 70, or approximately 60, or approximately 50, or approximately 40, or approximately 30, or approximately 20, or approximately 10, or approximately 15.

In some embodiments, the EC panels with crystalline anodic EC nanostructures described herein have a tinted state $T_{vis}$ greater than 50%, or greater than 55%, or greater than 60%, or greater than 65%, or greater than 70%, or greater than 75%, or greater than 80%, or greater than 85%, or greater than 90%, or greater than 95%%, or less than 20%, or less than 15%, or less than 10%, or less than 5%, or less than 4%, or less than 3%, or less than 2%, or less than 1%, or less than 0.1%, or less than 0.01%, or less than 0.001%, or from 0.001% to 99%, or from 0.01% to 99%, or from 0.1% to 99%, or from 10% to 90%, or from 10% to 80%, or from 10% to 70%, or from 20% to 70%, or from 50% to 70%, or from 20% to 50%, or from 40% to 60%, or from 20% to 40%, or from 60% to 70%.

In some embodiments, the EC panels with crystalline anodic EC nanostructures described herein have a tinted state color uniformity (deltaE) in transmission less than 15, or less than 10, or less than 8, or less than 5, or from 0 to 15, or from 0 to 10, or from 0 to 5.

In some embodiments, the anode of an EC multi-layer stack comprises crystalline anodic EC nanostructures, and the anode or the multi-layer stack has a % fade (percent change in capacity between cycle 2 and cycle 23) less than 20%, or less than 15%, or less than 10%, or less than 5%, or less than 1%, or from 0.01% to 20%, or from 0.01% to 15%, or from 0.01% to 10%, or from 0.01% to 5%, or from 0.01% to 1%.

EXAMPLES

The following non-limiting examples are provided to further illustrate the present disclosure. It should be appreciated by those of skill in the art that the techniques disclosed in the examples that follow represent approaches the inventors have found function well in the practice of the disclosure, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the disclosure.

Examples 1-17

Electrochromic Lithium Nickel Oxide Nanoparticle Anode; Powder and Film Synthesis, Material Characterization, and Half-Cell and Device EC Performance Target compositions of lithium nickel oxide anode materials are shown in Tables 1 and 2. Synthetic parameters for lithium nickel oxide as-synthesized particles before size-reduction (i.e., powders) are shown in Table 3. Metal precursor compounds of each metal component were weighed to the desired amounts, and were ground in a mortar and pestle in the presence of acetone. To improve mixing, some precursor mixtures were ball-milled prior to calcination (Table 2). In this case, the mixture was milled at 300 rpm for 90 cycles with 3 min-run and 5 min-break at each cycle. After milling, the resulting slurry was dried in an oven at 150° C., and then pressed into a pellet prior to calcination at 800° C.

Unless otherwise noted, the metal precursor mixture was placed into a crucible, was ramped to 650° C. with a rate 180° C./h, and held at a temperature for 12 h. After cooling, the powder was ground in the presence of acetone, and calcined again at 800° C. for 12 h.

TABLE 1

Target compositions of $Li_xNi_{2-4x/3}(M_{1-y}M'_y)_{x/3}O_2$ anode materials

| Example No. | M | M' | x | y | composition |
|---|---|---|---|---|---|
| 1 | Sb | — | 1 | 0 | $Li_1Ni_{0.67}Sb_{0.33}O_2$ |
| 2 | Sb | — | 1.077 | 0 | $Li_{1.077}Ni_{0.564}Sb_{0.359}O_2$ |
| 3 | Sb | — | 1.15 | 0 | $Li_{1.15}Ni_{0.47}Sb_{0.38}O_2$ |
| 4 | Sb | Nb | 1.15 | 0.2 | $Li_{1.15}Ni_{0.47}(Sb_{0.8}Nb_{0.2})_{0.38}O_2$ |
| 5 | Sb | Nb | 1.15 | 0.5 | $Li_{1.15}Ni_{0.47}(Sb_{0.5}Nb_{0.5})_{0.38}O_2$ |
| 6 | Sb | — | 1.186 | 0 | $Li_{1.186}Ni_{0.417}Sb_{0.396}O_2$ |
| 7 | Sb | — | 1.205 | 0 | $Li_{1.205}Ni_{0.404}Sb_{0.398}O_2$ |
| 8 | Sb | — | 1.258 | 0 | $Li_{1.258}Ni_{0.326}Sb_{0.419}O_2$ |
| 9 | Nb | — | 1 | 0 | $Li_1Ni_{0.67}Nb_{0.33}O_2$ |
| 10 | Nb | — | 1.2 | 0 | $Li_{1.2}Ni_{0.4}Nb_{0.4}O_2$ |

TABLE 2

Target compositions of $A_xNi_yM_zM'_\delta O_2$ (A = Li or Na) anode materials

| Example No. | A | M | M' | x | y | z | δ | composition |
|---|---|---|---|---|---|---|---|---|
| 11 | Li | Ti | — | 1 | 0.5 | 0 | 0 | $Li_{1.0}Ni_{0.5}Ti_{0.5}O_2$ |
| 12 | Li | Ti | Mo | 1.05 | 0.458 | 0.453 | 0.033 | $Li_{1.05}Ni_{0.458}Ti_{0.453}Mo_{0.033}O_2$ |
| 13 | Li | Ti | Mo | 1.20 | 0.320 | 0.350 | 0.135 | $Li_{1.2}Ni_{0.32}Ti_{0.35}Mo_{0.135}O_2$ |
| 14 | Li | Sb | Al | 1 | 0.583 | 0.33 | 0.0553 | $Li_1Ni_{0.583}Al_{0.0553}Sb_{0.33}O_2$ |
| 15 | Li | Sb | Zn | 1 | 0.583 | 0.33 | 0.083 | $Li_1Ni_{0.583}Zn_{0.083}Sb_{0.33}O_2$ |
| 16 | Li | Nb | Al | 1 | 0.633 | 0.33 | 0.022 | $Li_1Ni_{0.633}Al_{0.022}Nb_{0.33}O_2$ |
| 17 | Na | Te | — | 0.667 | 0.667 | 0.33 | 0 | $Na_{0.667}Ni_{0.667}Te_{0.33}O_2$ |

TABLE 3

Particle synthesis parameters of lithium nickel oxide anode materials

| Example No. | Composition | Metal precursor | Precursor milling | Temp(° C.) and dwell time (h) at calcination |
|---|---|---|---|---|
| 1 | $Li_1Ni_{0.67}Sb_{0.33}O_2$ | $Li_2CO_3$, $Ni(OH)_2$, $Sb_2O_3$ | Yes | 800° C., 12 h |
| 2 | $Li_{1.077}Ni_{0.564}Sb_{0.359}O_2$ | $Li_2CO_3$, $Ni(OH)_2$, $Sb_2O_3$ | Yes | 800° C., 12 h |
| 3 | $Li_{1.15}Ni_{0.47}Sb_{0.38}O_2$ | $Li_2CO_3$, $Ni(OH)_2$, $Sb_2O_3$ | Yes | 800° C., 12 h |
| 4 | $Li_{1.15}Ni_{0.47}(Sb_{0.8}Nb_{0.2})_{0.38}O_2$ | $Li_2CO_3$, $Ni(OH)_2$, $Sb_2O_3$, $Nb_2O_5$ | Yes | 800° C., 12 h |
| 5 | $Li_{1.15}Ni_{0.47}(Sb_{0.5}Nb_{0.5})_{0.38}O_2$ | $Li_2CO_3$, $Ni(OH)_2$, $Sb_2O_3$, $Nb_2O_5$ | Yes | 800° C., 12 h |
| 6 | $Li_{1.186}Ni_{0.417}Sb_{0.396}O_2$ | $Li_2CO_3$, $Ni(OH)_2$, $Sb_2O_3$ | Yes | 800° C., 12 h |
| 7 | $Li_{1.205}Ni_{0.404}Sb_{0.398}O_2$ | $Li_2CO_3$, $Ni(OH)_2$, $Sb_2O_3$ | Yes | 800° C., 12 h |
| 8 | $Li_{1.258}Ni_{0.326}Sb_{0.419}O_2$ | $Li_2CO_3$, $Ni(OH)_2$, $Sb_2O_3$ | Yes | 800° C., 12 h |
| 9 | $Li_1Ni_{0.67}Nb_{0.33}O_2$ | $Li_2CO_3$, $NiCO_3$, $Nb_2O_5$ | No | 650° C., 12 h, then 1100° C., 36 h |

TABLE 3-continued

Particle synthesis parameters of lithium nickel oxide anode materials

| Example No. | Composition | Metal precursor | Precursor milling | Temp(° C.) and dwell time (h) at calcination |
|---|---|---|---|---|
| 10 | $Li_{1.2}Ni_{0.4}Nb_{0.4}O_2$ | $Li_2CO_3$, $Ni(OH)_2$, $Nb_2O_5$ | Yes | 800° C., 12 h |
| 11 | $Li_{1.0}Ni_{0.5}Ti_{0.5}O_2$ | $Li_2CO_3$, $Ni_2CO_3$, $TiO_2$ | Yes | 750° C., 12 h |
| 12 | $Li_{1.05}Ni_{0.458}Ti_{0.453}Mo_{0.033}O_2$ | $Li_2CO_3$, $NiCO_3$, $TiO_2$, $MoO_2$ | Yes | 750° C., 2 h |
| 13 | $Li_{1.2}Ni_{0.32}Ti_{0.35}Mo_{0.135}O_2$ | $Li_2CO_3$, $NiCO_3$, $TiO_2$, $MoO_2$ | Yes | 750° C., 2 h |
| 14 | $Li_1Ni_{0.583}Al_{0.0553}Sb_{0.33}O_2$ | $Li_2CO_3$, $Ni(OH)_2$, $Al_2O_3$, $Sb_2O_3$ | Yes | 800° C., 12 h |
| 15 | $Li_1N_{0.583}Zn_{0.083}Sb_{0.33}O_2$ | $Li_2CO_3$, $Ni(OH)_2$, $ZnO$, $Sb_2O_3$ | Yes | 800° C., 12 h |
| 16 | $Li_1Ni_{0.633}Al_{0.022}Nb_{0.33}O_2$ | $Li_2CO_3$, $NiCO_3$, $Al_2O_3$, $Nb_2O_5$ | No | 650° C., 12 h, then 1100° C., 36 h |
| 17 | $Na_{0.667}Ni_{0.667}Te_{0.33}O_2$ | $Li_2CO_3$, $NiCO_3$, $TeO_3$ | No | 650° C., 12 h, then 900° C., 24 h |

After synthesis, the resulting solid was pulverized in a mortar and pestle, and PXRD measurements were performed. Samples were analyzed using a Bruker D8 Advance diffractometer employing CuKα radiation. Scans were performed in Bragg-Brentano geometry using a Ni filter between 5-70° 2 Θ with a step size of 0.01°.

Figure 3A:
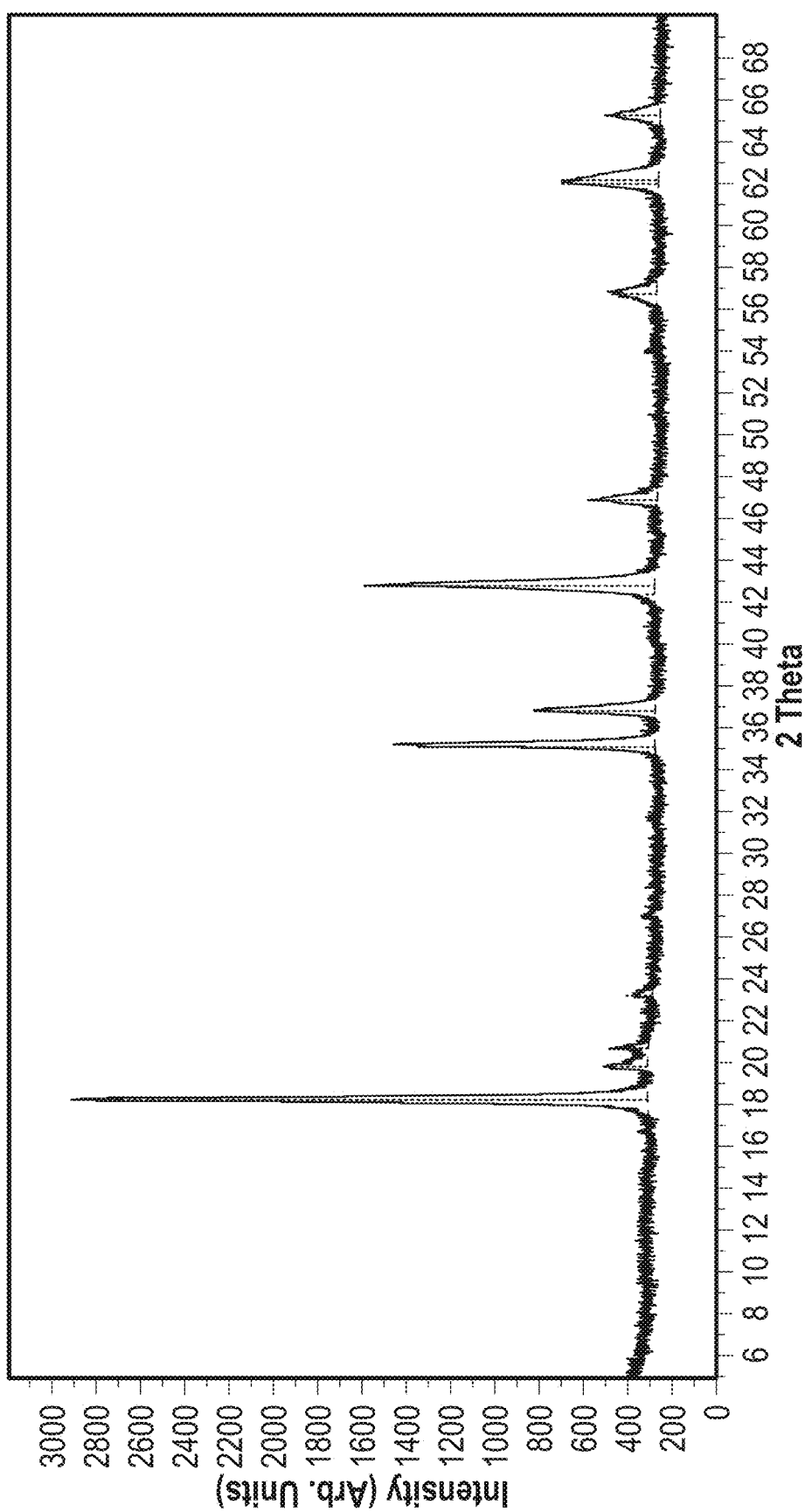
FIG. 3a shows the XRD pattern of $Li_{1.0}Ni_{0.67}Sb_{0.33}O_2$.
Figure 3B:
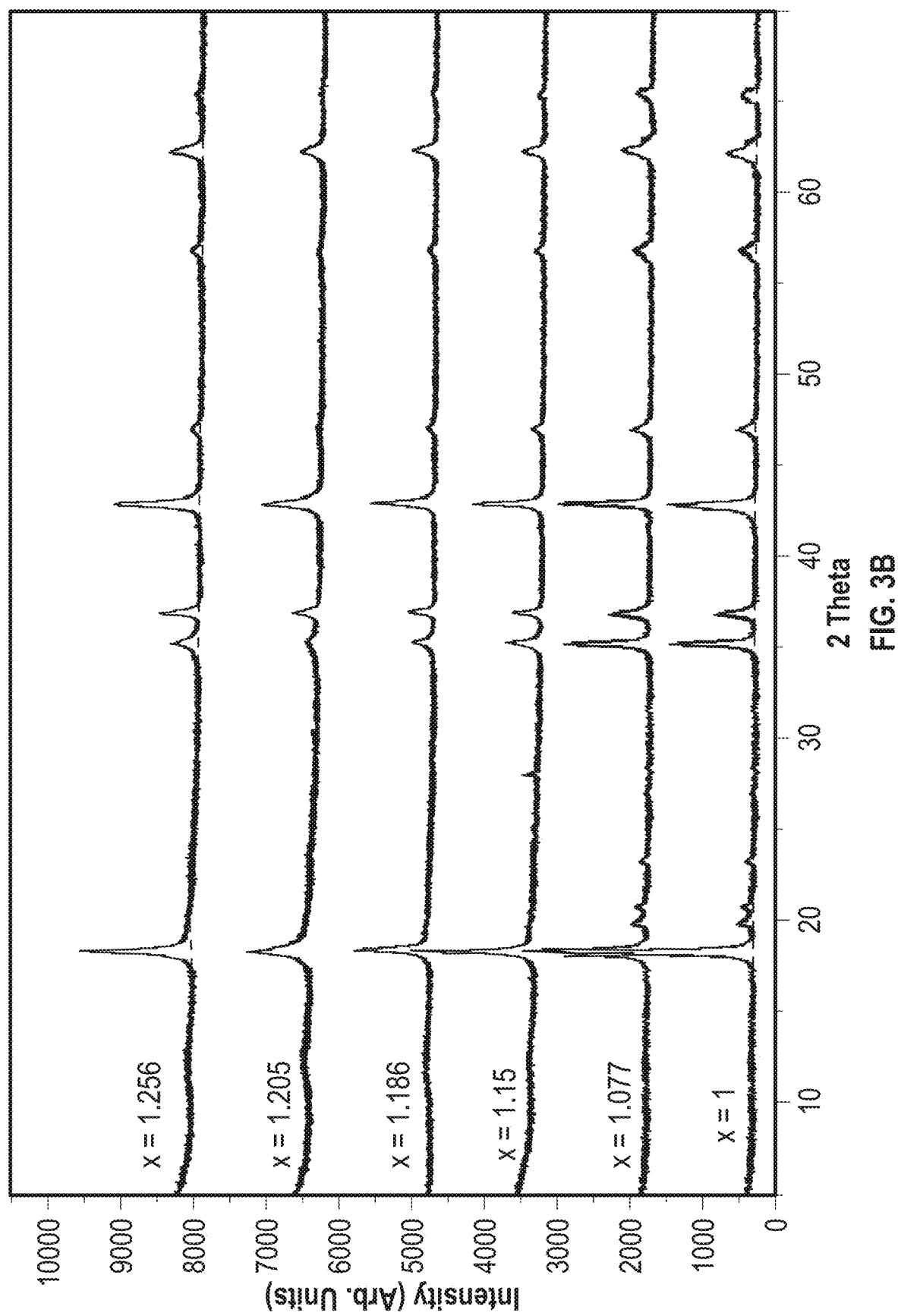
FIG. 3b shows a series of XRD patterns of $Li_xNi_{2-4x/3}(M_{1-y}M'_y)_{x/3}O_2$ with M=Sb and x=1.0 to 1.256.
Figure 4A:
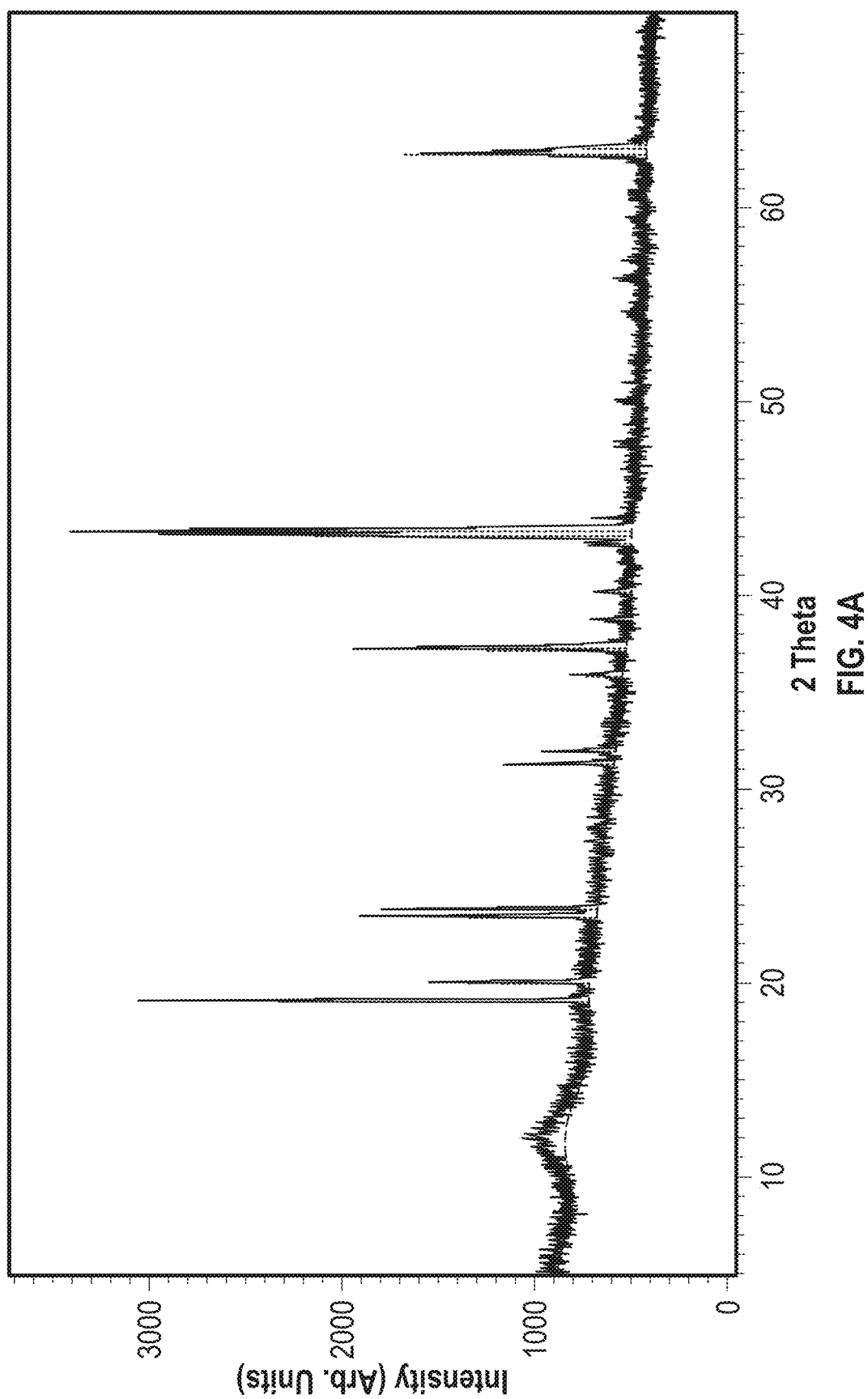
FIG. 4a shows the XRD of an ordered rock-salt superstructure of $Li_{1.0}Ni_{0.67}Nb_{0.33}O_2$ with the vertical lines representing the fit to orthorhombic space group Fddd with a=5.9069(4) Å, b=8.4012(4) Å, and c=17.750(1) Å.
Figure 4B:
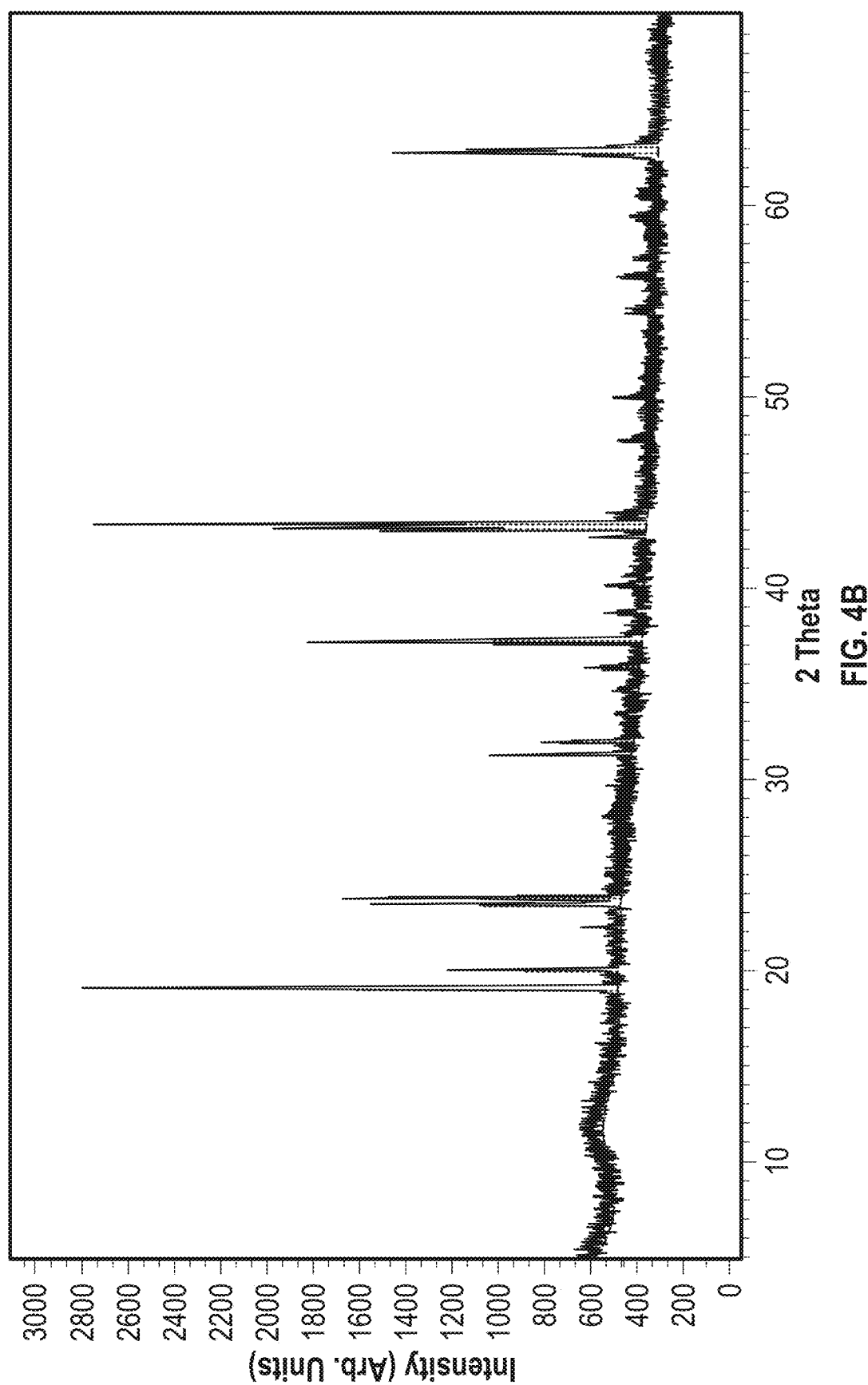
FIG. 4b shows the XRD of $Li_{1.0}Ni_{0.633}Al_{0.022}Nb_{0.33}O_2$ which is indeed identical with that of $Li_{1.0}Ni_{0.67}Nb_{0.33}O_2$.
Figure 5:
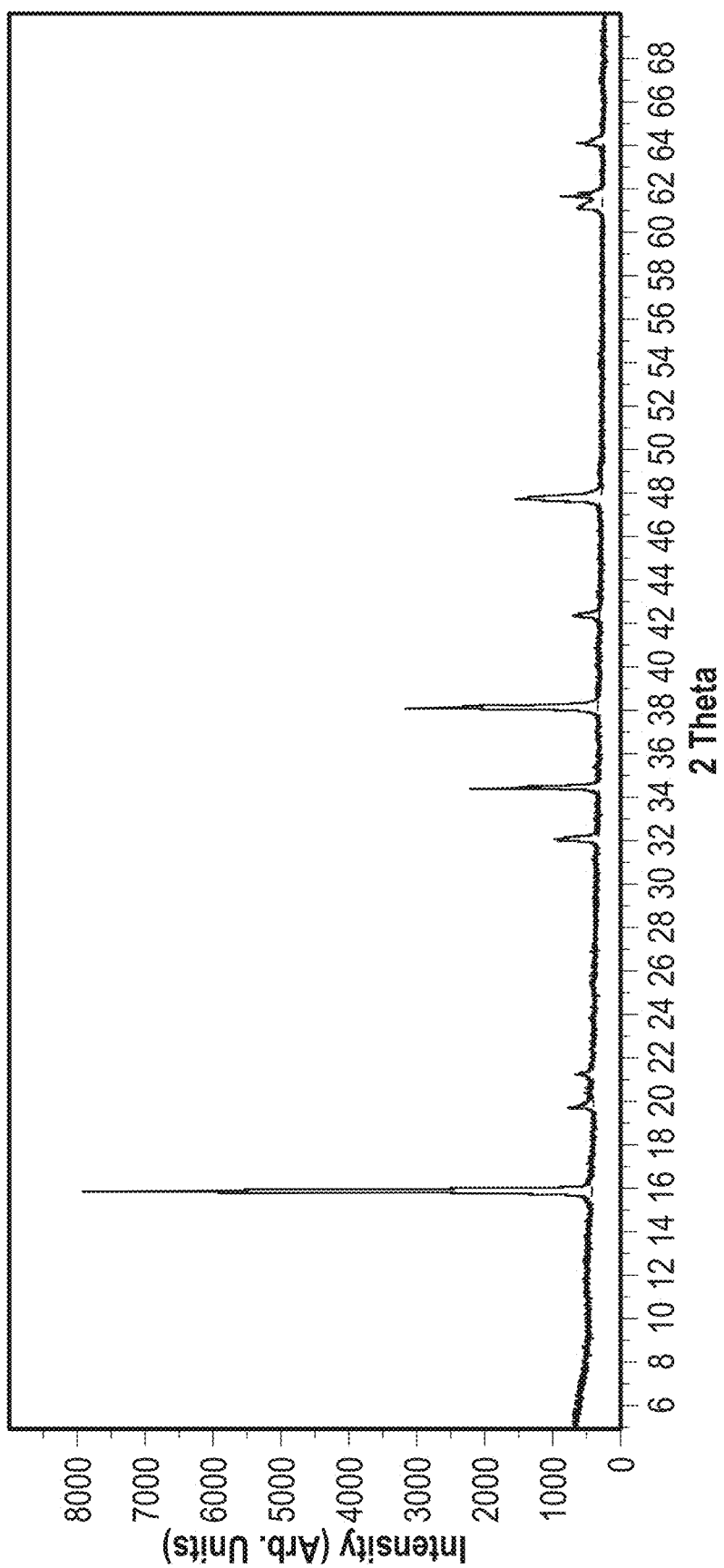
FIG. 5 shows an XRD pattern of $Na_{0.667}Ni_{0.667}Te_{0.33}O_2$.

XRD patterns of selected powders are shown in FIGS. 3-5. FIG. 3a shows the XRD pattern of $Li_{1.0}Ni_{0.67}Sb_{0.33}O_2$ prepared by calcination. The XRD pattern in FIG. 3a shows narrow peaks, indicating a high degree of crystallinity. The experimental curve is fit to a pseudo-hexagonal structure with the monoclinic space group, C2/m where a=5.1828(2), b=8.9677(3), and c=5.1577(2) Å, β=109.696(2°), as indicated by the vertical red lines. FIG. 3b shows a series of XRD patterns of $Li_xNi_{2-4x/3}(M_{1-y}M'_y)_{x/3}O_2$ with M=Sb and x=1.0 to 1.256. Notably, the peak at 2Θ of 19° has not changed its peak position and the relative intensity to that of other reflections (e.g. 2Θ of 43°). This indicates that the layered structure was not disturbed with varying values of x. It is to be noted, however, that two hkl reflections, [100] and [101], at 2Θ of 20° and 21°, respectively, in $Li_{1.0}Ni_{0.67}Sb_{0.33}O_2$ were immediately broadened even with slightly higher Li. With higher Li content (x>1.15), they are completely absent. In addition, the relative intensity in the two peaks at 2Θ around 35° and 37° is inverted when x is larger than 1.186. Increasing x not only increases Li content, but also increases Sb while decreasing Ni content, thus having more Li and Sb and less Ni occupying the metal layer, while maintaining the layered crystalline or semi-crystalline structure of this material.

FIG. 4 shows XRD patterns of Nb-containing lithium nickel oxides. FIG. 4a shows the XRD of an ordered rock-salt superstructure of $Li_{1.0}Ni_{0.67}Nb_{0.33}O_2$ with the vertical lines representing the fit to orthorhombic space group Fddd with a=5.9069(4) Å, b=8.4012(4) Å, and c=17.750(1) Å. FIG. 4b shows the XRD of $Li_{1.0}Ni_{0.633}Al_{0.022}Nb_{0.33}O_2$ which is indeed identical with that of $Li_{1.0}Ni_{0.67}Nb_{0.33}O_2$. This curve indicates that substituting small amount of Ni with Al did not alter the ordered phase.

FIG. 5 shows an XRD pattern of $Na_{0.667}Ni_{0.667}Te_{0.33}O_2$, prepared by calcination. The XRD pattern in FIG. 5 shows narrow peaks, indicating a high degree of crystallinity. The curve may be fit to a crystal structure with the space group P6$_3$/mcm (#193), where the lattice parameters are a=5.21247(7) Å and c=11.1659(1) Å.

For size-reduction, the lithium nickel oxide particles (i.e., powder) (1.5 g) is added to 9 mL of desired solvent and 30 g of 0.1 mm $ZrO_2$ balls, in the bowl of the mill. The milling cycle parameters are typically 500 rpm for 3 min, followed by 5 min of rest time (to allow the mill bowls to cool), and the cycle is repeated 20 times, for a total of 1 hour active milling time. Some materials were milled with different rpm and different sizes of milling media, within the ranges described in this disclosure. The formulation is then extracted from milling bowls and filtered to separate the milling media from the formulation. The slurry is characterized by TGA to determine weight % of the resulting size-reduced particles. An aliquot of the formulation is diluted and characterized by dynamic light scattering (DLS) for particle size analysis. Ball-milling parameters and the particle-size distribution (PSD) data for selected lithium nickel oxide nanostructure dispersions are summarized in Table 4.

An example of $Li_{1.186}Ni_{0.417}Sb_{0.396}O_2$ particle size distribution (PSD) after milling, washing, and separating from the washing fluid is shown in FIG. 6. FIG. 6a shows the PSD of the particles size-reduced in water solvent, and FIG. 6b shows the PSD of the particles size-reduced in 1-propanol solvent. The mean particle size in FIG. 6a is 259 nm with a PDI of 0.33, whereas in FIG. 6b, the mean particle size and PDI are 104 nm and 0.13, respectively.

TABLE 4

Ball-milling parameters and resulting particle-size distribution (PSD) and polydispersity index (PDI) data for selected lithium nickel oxide nanostructure dispersions

| Example No. | Nanoparticle anode Composition | Size of milling media (ZrO$_2$, mm) | solvent | rpm | Number of cycle | z-average (nm), PDI |
|---|---|---|---|---|---|---|
| 1 | Li$_1$Ni$_{0.67}$Sb$_{0.33}$O$_2$ | 0.1 | water | 500 | 20 | 503, 0.522 |
|   |   | 0.1 | 1-heptanol | 500 | 20 | 153, 0.239 |
| 2 | Li$_{1.077}$Ni$_{0.564}$Sb$_{0.359}$O$_2$ | 0.1 | water | 500 | 20 | 332, 0.473 |
| 3 | Li$_{1.15}$Ni$_{0.47}$Sb$_{0.38}$O$_2$ | 0.1 | water | 500 | 20 | 292, 0.259 |
| 4 | Li$_{1.15}$Ni$_{0.47}$(Sb$_{0.8}$Nb$_{0.2}$)$_{0.38}$O$_2$ | 0.1 | water | 500 | 20 | 149, 0.246 |
| 5 | Li$_{1.15}$Ni$_{0.47}$(Sb$_{0.5}$Nb$_{0.5}$)$_{0.38}$O$_2$ | 0.1 | water | 500 | 20 | 96, 0.236 |
| 6 | Li$_{1.186}$Ni$_{0.417}$Sb$_{0.396}$O$_2$ | 0.1 | water | 500 | 20 | 259, 0.334 |
|   |   | 0.1 | 1-Propanol | 500 | 20 | 104, 0.130 |
|   |   | 0.1 | Di(ethyleneglycol) ethyl ether | 500 | 20 | >1 um |
| 7 | Li$_{1.205}$Ni$_{0404}$Sb$_{0.396}$O$_2$ | 0.1 | water | 500 | 20 | 885, 0.052 |
| 8 | Li$_{1.258}$Ni$_{0.326}$Sb$_{0.419}$O$_2$ | 0.1 | water | 500 | 20 | 528, 0.547 |
| 9 | Li$_1$Ni$_{0.67}$Sb$_{0.33}$O$_2$ | 0.1 | water | 500 | 20 | 205, 0.294 |
|   |   | 1.0 | water | 500 | 20 | 239, 0.164 |
|   |   | 0.1 | water | 500 | 20 | 242, 0.272 |
|   |   | 1.0 | water | 500 | 20 | 233, 0.186 |
| 10 | Li$_{1.2}$Ni$_{0.4}$Nb$_{0.4}$O$_2$ | 0.1 | water | 500 | 20 | 168, 0.170 |
| 12 | Li$_{1.05}$Ni$_{0.458}$Ti$_{0.453}$Mo$_{0.033}$O$_2$ | 0.1 | 1-propanol | 500 | 20 | 248, 0.180 |
| 13 | Li$_{1.2}$Ni$_{0.32}$Ti$_{0.35}$Mo$_{0.135}$O$_2$ | 0.1 | 1-propanol | 500 | 20 | 132, 0.245 |
| 14 | Li$_1$Ni$_{0.583}$Al$_{0.0553}$Sb$_{0.33}$O$_2$ | 0.1 | water | 500 | 20 | 368, 0.446 |
| 15 | Li$_1$Ni$_{0.583}$Zn$_{0.083}$Sb$_{0.33}$O$_2$ | 0.1 | water | 500 | 20 | 430, 0.485 |
| 16 | Li$_1$Ni$_{0.633}$Al$_{0.022}$Nb$_{0.33}$O$_2$ | 0.1 | water | 500 | 20 | 330, 0.314 |
| 17 | Na$_{0.667}$Ni$_{0.667}$Te$_{0.33}$O$_2$ | 0.1 | isopropanol | 500 | 20 | 202, 0.245 |

After milling, the lithium nickel oxide nanostructures are coated onto a substrate using wire-bar coating to form nanostructure thin films. The rod size (RDS) varied between 10 and 50 (wire coil diameter in the range of 0.010-0.050 in). The concentration by mass of the solid nanostructures is approximately 8-10%, and the dry film thickness is approximately 600 nm to 1 micron. The coating speed is approximately 100 cm/min. The film was coated and dried at ambient air. The dried films were further calcined for 0.5 h in ambient air at 350-420° C.

Figure 7A:
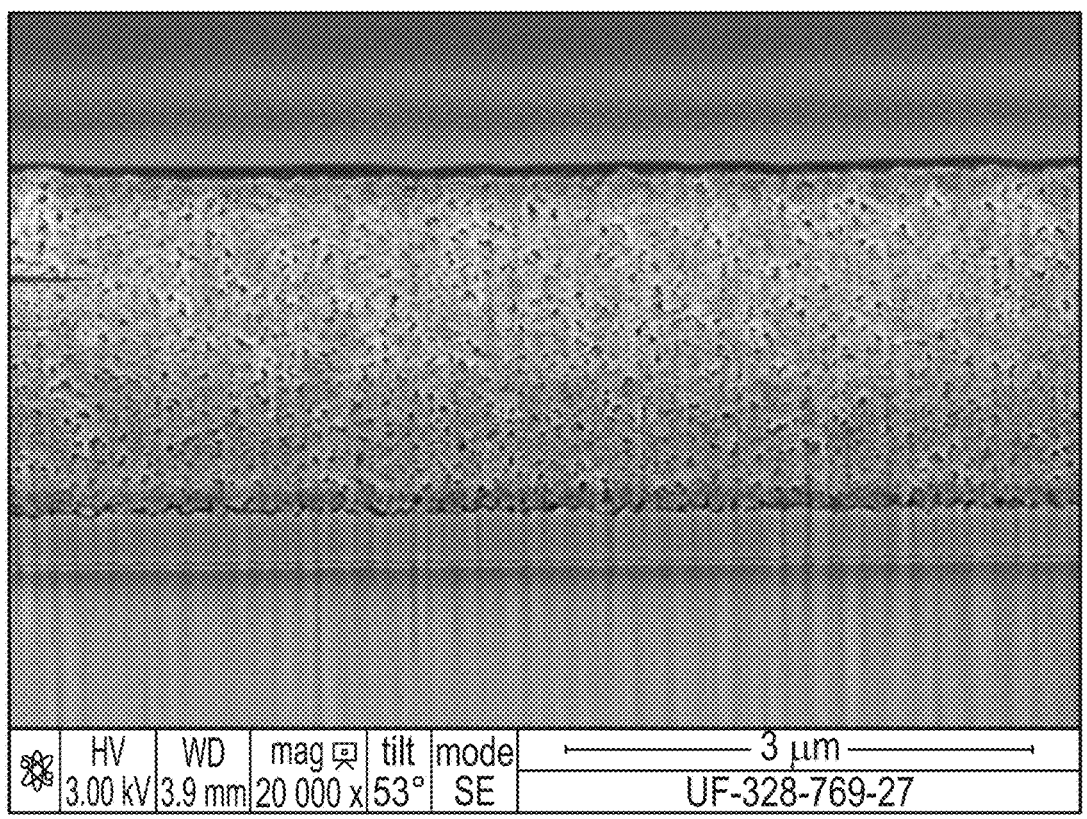
FIGS. 7a-7c show an SEM example of Example 6c (Table 4) for $Li_{1.186}Ni_{0.417}Sb_{0.396}O_2$ coated from a di(ethylene glycol) ethyl ether dispersion onto FTO/glass substrate taken by FIB-SEM analysis (Focused Ion beam—Scanning Electron Microscopy).
Figure 7B:
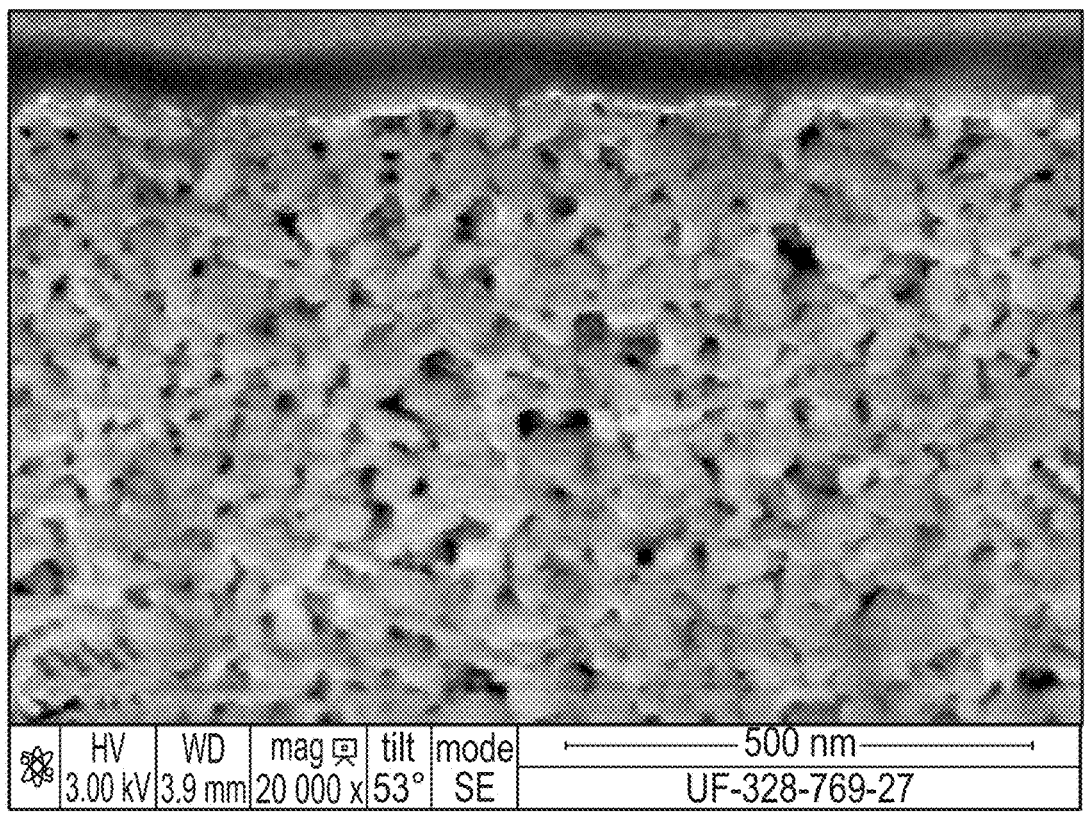
Figure 7C:
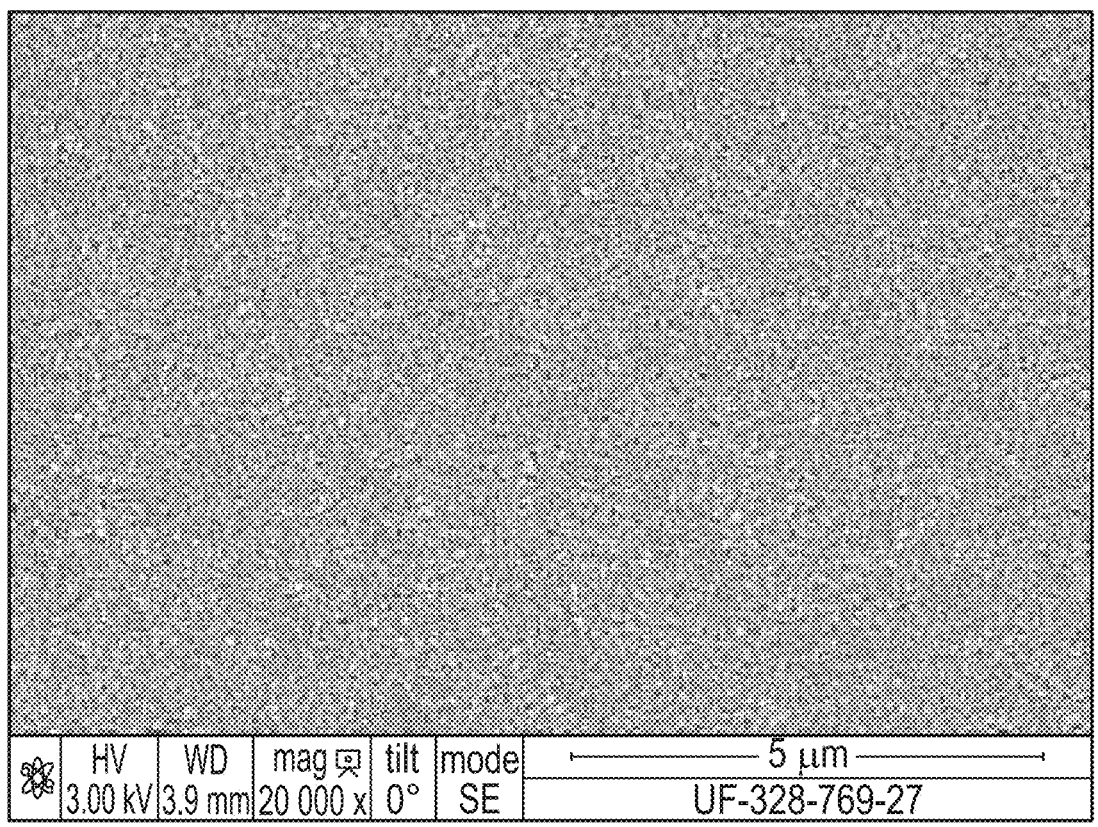

FIGS. 7a-7c show an SEM example of Example 6c (Table 4) for Li$_{1.186}$Ni$_{0.417}$Sb$_{0.396}$O$_2$ coated from a di(ethylene glycol) ethyl ether dispersion onto FTO/glass substrate taken by FIB-SEM analysis (Focused Ion beam—Scanning Electron Microscopy). To enhance the responding signal from the sample, the surface was coated with a thin layer of Au. FIG. 7a shows the cross-section of the oxide particle layer and FTO layer underneath it. As shown in FIG. 7b, a higher resolution shows a uniform morphology of particles with small size of less than 100 nm. Notably, this primary particle size is far smaller than what has been measured by DLS. This indicates that oxide nanoparticles, as represented in the DLS data shown in FIG. 6 have presumably agglomerated in the diluted dispersion. FIG. 7c shows uniform particle shape and size from the perspective of the top of the film surface.

Figure 8A:
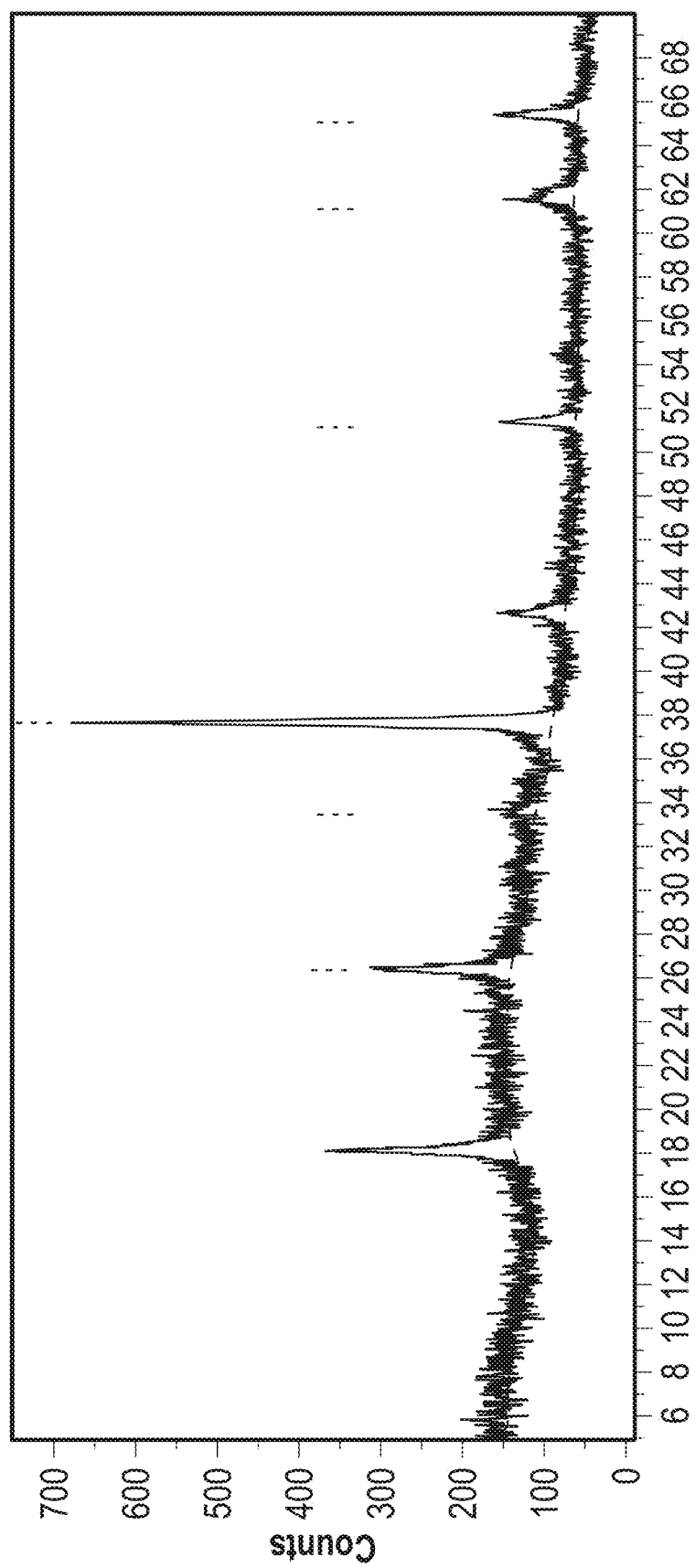
FIGS. 8a-8b and FIG. 9 show the size-reduced nanoparticles of $Li_{1.186}Ni_{0.417}Sb_{0.396}O_2$, $Li_1Ni_{0.67}Nb_{0.33}O_2$, and $Na_{0.667}Ni_{0.667}Te_{0.33}O_2$, respectively.
Figure 8B:
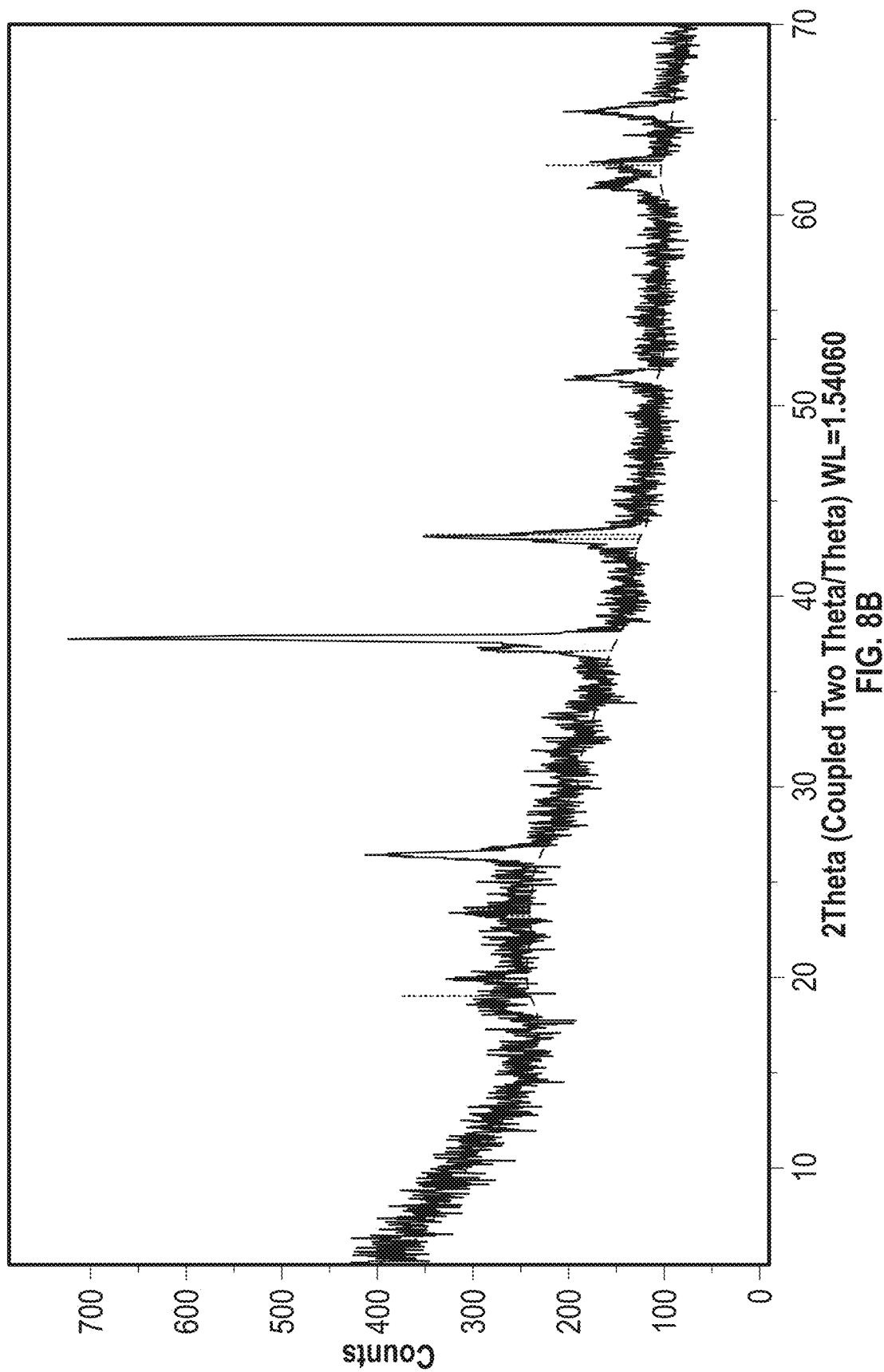
Figure 9:
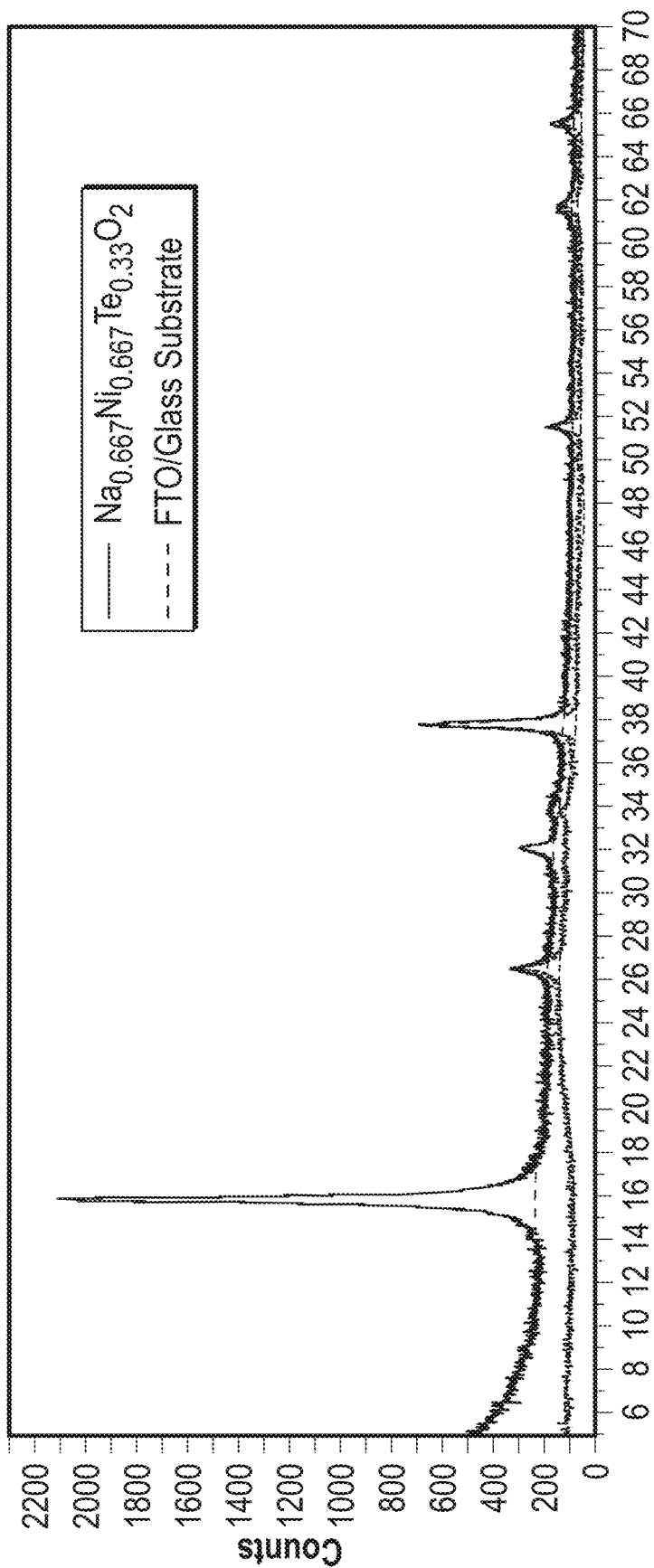

Thin film XRD patterns were taken of the lithium nickel oxide nanostructure thin film on FTO/glass or ITO/glass substrates. In general, film XRD of these nanostructures show significantly broadened peak shapes and overall less intensity, compared with those of the pre-milling powder. As examples, FIGS. 8a-8b and FIG. 9 show the size-reduced nanoparticles of Li$_{1.186}$Ni$_{0.417}$Sb$_{0.396}$O$_2$, Li$_1$Ni$_{0.67}$Nb$_{0.33}$O$_2$, and Na$_{0.667}$Ni$_{0.667}$Te$_{0.33}$O$_2$, respectively. The peak positions in each thin film sample match the peak positions of its respective powder. Some peaks are present in the powder samples which are not present in the nanostructure thin film samples. These differences are due to both higher crystallinity and larger particle sizes in the powder samples. In addition, some thin film samples may be prone to preferred ordering and as such, intensities of powders may be different than what may be observed in a thin film sample.

Thin film samples were brought into an Ar-filled glove box, and the electrochemical and EC properties were examined in a combined electrochemical/optical setup consisting of a three electrode cell in a cuvette placed in the path of a white light source and spectrometer. Data were obtained by sequential oxidation and reduction under galvanostatic control followed by a constant voltage hold (CC-CV). The electrolyte was 1 M LiClO$_4$ in propylene carbonate. Typically voltage ranges of 2.5-4.0, 2.5-4.1 or 2.5-4.2 V vs Li/Li$^+$ were applied. Separate pieces of lithium metal were used as the reference and counter electrodes. Optical data were recorded every 1-5 s. Coloration efficiency (CE) was calculated from the transmission data (at 550 nm) and the amount of charge passed during the first reduction event of the film over the applied voltage range.

Electrochromic data of the anode nanostructure thin films are summarized in Table 5. The measured charge capacity are comparable to that of a sol-gel anode with a film thickness <2 μm and in the voltage range of 2.5~4.2V. Some anode nanostructure thin films have relatively high metal dopant content (non-lithium or non-nickel), and show low charge capacity in the applied voltage range. Without being held to any certain theory, this behavior could be attributed to the relatively low nickel content and/or to a possible shift of the nickel oxidation potential out of the applied voltage range. Optical properties of particle anode films are also comparable to those of sol-gel anode.

Additional EC data associated with switching speed (rate), cyclic stability (fade), and color characteristics (e.g., b* in the clear state) are summarized in Table 6, for selected anode nanostructure thin films. With the switching time constrained to 2 min by applying constant current, anode nanostructure thin films performed comparably to sol-gel anode films. Additionally, low cyclic stability was found in layered lithium nickel antimonate nanostructure thin films.

als where irreversible oxidation occurs after the first cycle. In some anode nanostructure thin films, such irreversible oxidation after the first cycle can also be accompanied by slight coloration and lowered clear state transmission.

TABLE 5

Electrochromic data for lithium nickel oxide anode nanostructure thin films

| Example No. | Anode nanostructure thin film composition | Upper voltage (V) | Q* (mC/cm$^2$) | T$_{clear}$** (%) | T$_{dark}$** (%) | Abs. coloration efficiency (cm$^2$/C) |
|---|---|---|---|---|---|---|
|  | Sol-gel anode | 4.0 | 30 | 82 | 9.7 | 30 |
| 1 | Li$_1$Ni$_{0.67}$Sb$_{0.33}$O$_2$ | 4.2 | 46 | 60 | 4.3 | 29 |
| 2 | Li$_{1.077}$Ni$_{0.564}$Sb$_{0.359}$O$_2$ | 4.1 | 35 | 76 | 10 | 26 |
| 3 | Li$_{1.15}$Ni$_{0.47}$Sb$_{0.38}$O$_2$ | 4.2 | 27 | 72 | 14 | 19 |
| 4 | Li$_{1.15}$Ni$_{0.47}$(Sb$_{0.8}$Nb$_{0.2}$)$_{0.38}$O$_2$ | 4.2 | 27 | 71 | 14 | 19 |
| 5 | Li$_{1.15}$Ni$_{0.47}$(Sb$_{0.5}$Nb$_{0.5}$)$_{0.38}$O$_2$ | 4.1 | 10 | 61 | 16 | 24 |
| 6 | Li$_{1.186}$Ni$_{0.417}$Sb$_{0.396}$O$_2$ | 4.1 | 29 | 73 | 15 | 24 |
| 7 | Li$_{1.205}$Ni$_{0404}$Sb$_{0.396}$O$_2$ | 4.2 | 1.1 | 78 | 75 | 27 |
| 8 | Li$_{1.258}$Ni$_{0.326}$Sb$_{0.419}$O$_2$ | 4.2 | 2.0 | 61 | 55 | 28 |
| 9 | Li$_1$Ni$_{0.67}$Sb$_{0.33}$O$_2$ | 4.0 | 16 | 52 | 7 | 33 |
| 10 | Li$_{1.2}$Ni$_{0.4}$Nb$_{0.4}$O$_2$ | 4.0 | 6.3 | 63 | 41 | 29 |
| 11 | Li$_{1.0}$Ni$_{0.5}$Ti$_{0.5}$O$_2$ | 4.2 | 5.8 | 35 | 23 | 31 |
| 12 | Li$_{1.05}$Ni$_{0.458}$Ti$_{0.453}$Mo$_{0.033}$O$_2$ | 4.2 | 3.9 | 45 | 31 | 30 |
| 13 | Li$_{1.2}$Ni$_{0.32}$Ti$_{0.35}$Mo$_{0.135}$O$_2$ | 4.2 | 1.2 | 71 | 64 | 38 |
| 16 | Li$_1$Ni$_{0.633}$Al$_{0.022}$Nb$_{0.33}$O$_2$ | 4.0 | 14 | 51 | 12 | 46 |
| 17 | Na$_{0.667}$Ni$_{0.667}$Te$_{0.33}$O$_2$ | 4.2 | 3.3 | 40 | 25 | 62 |

$^a$Charge capacity (Q) was estimated from the first cycle reduction.
$^b$T$_{clear}$ and T$_{dark}$ refer to the transmission at 550 nm in the clear state and dark state, respectively.

Without being held to any certain theory, this is potentially attributed to the instability of the high-surface area nanostructures at above 4 V in the carbonate electrolyte. For example, cycling stability of the films was significantly improved when assembled in Ni—W devices using a gel electrolyte, not containing carbonate solvent, and cycled under a lower cell voltage (see FIGS. 13a and b). Not to be limited by theory, it has been observed in layered lithium nickel oxide battery materials, that nickel migration during oxidation into the positions previously occupied by lithium can impact durability. On the other hand, a nanostructure thin film anode with a rock-salt structure (e.g., Example 9) showed improved stability (see FIG. 13).

Figure 10A:
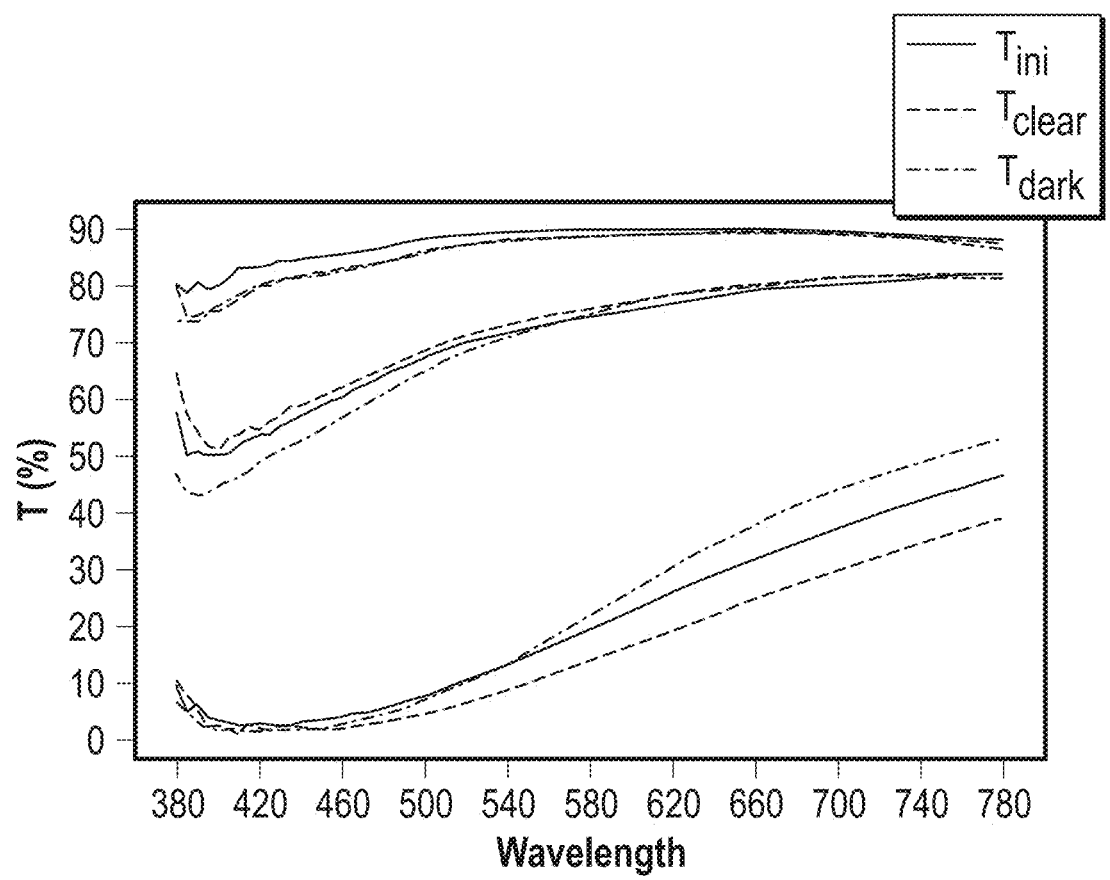
FIGS. 10a-10c show optical transmission spectra of several anode nanostructure thin films recorded at the initial state ($T_{ini}$), and then at the clear ($T_{clear}$) and dark states ($T_{dark}$) while switching in the applied voltage range.
Figure 10B:
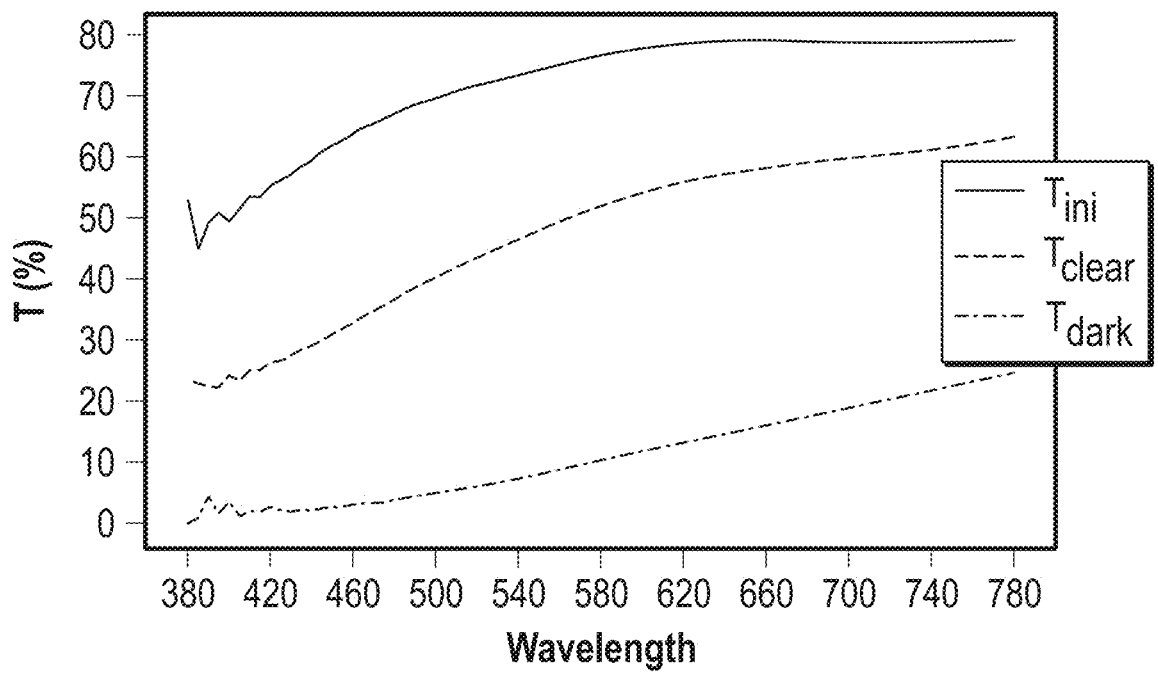
Figure 10C:
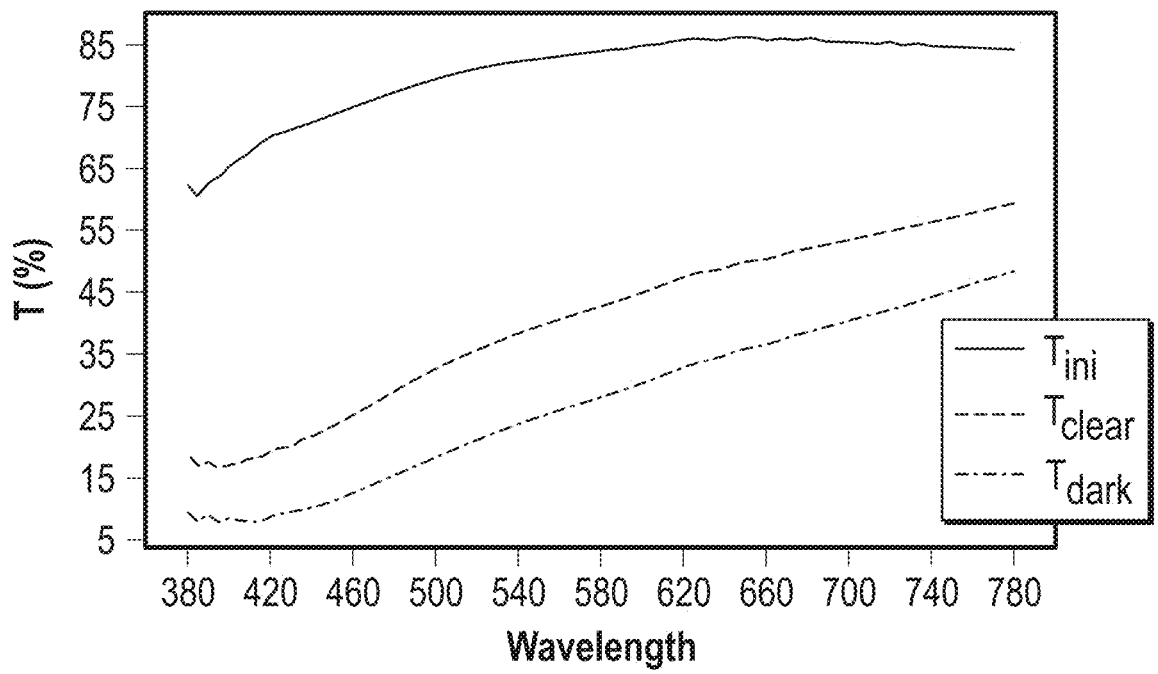

FIGS. 10a-10c show optical transmission spectra of anode nanostructure thin films recorded at the initial state (T$_{ini}$), and then at the clear (T$_{clear}$) and dark states (T$_{dark}$) while switching in the applied voltage range. The term T$_{ini}$ is defined as the % transmission measured at 550 nm through the as-synthesized film before any electrochemical switching has been performed. The term T$_{clear}$ is defined as the % transmission measured at 550 nm at the first cycle reduction, when the absolute current reaches less than 25 μA at the lowest applied voltage. The term T$_{dark}$ is defined as the % transmission measured at 550 nm at the first cycle oxidation, when the absolute current reaches less than 25 μA at the highest applied voltage. FIG. 10a shows the optical spectra of Li$_x$Ni$_{2-4x/3}$(M$_{1-y}$M'$_y$)$_{x/3}$O$_2$ anode nanostructure thin films with M=M'=Sb and x=1.08, 1.15 and 1.19, which demonstrates high transparency both at the initial and clear state. FIG. 10b shows the optical transmission spectra of Li$_1$Ni$_{0.67}$Nb$_{0.33}$O$_2$, in which the film haziness is responsible for low transmissions in all the states. FIG. 10c shows the optical spectra of Na$_{0.667}$Ni$_{0.667}$Te$_{0.33}$O$_2$ anode nanostructure thin film, demonstrating high transparency in an initial state but incomplete bleaching after cycling. Not to be limited by theory, this can be associated with what has been commonly observed in lithium nickel oxide battery materi-

TABLE 6

Additional EC data for selected lithium nickel oxide anode nanostructure thin films.

| Example No. | Anode nanostructure thin film composition | Upper voltage (V) | Rate$^a$ | Fade$^b$ | Maximum number of cycle$^b$ | b* |
|---|---|---|---|---|---|---|
| NA | Sol-gel anode | 4.0 | −28 | 4 | 23 | 4.0 |
| 1 | Li$_1$Ni$_{0.67}$Sb$_{0.33}$O$_2$ | 4.2 | −17 | −68 | 10 | 17 |
| 6 | Li$_{1.186}$Ni$_{0.417}$Sb$_{0.396}$O$_2$ | 4.1 | −24 | −8 | 7 | 14 |
| 9 | Li$_1$Ni$_{0.67}$Nb$_{0.33}$O$_2$ | 4.0 | −30 | −8 | 10 | 20 |

$^a$Rate is defined as the percent loss of the charge capacity when the constant current was applied for the materials to switch within 2 minutes.
$^b$Fade is defined as the percent loss of the charge capacity after the maximum number of cycles.

Five layer devices were assembled using anode nanostructure thin films on TCO substrates (active area ~900 mm$^2$) and both sol-gel and nanostructure based tungsten oxide cathodes prepared on TCO substrates (active area ~900 mm$^2$). The nanostructure based tungsten oxide cathodes were deposited from dispersions containing crystalline tungsten trioxide nanostructures with hexagonal crystal structures. Near the edge of the substrate containing cathode, 4 PIB of 400 microns thickness and 7 mm width were placed such that they protruded above the substrate surface by ~2 mm. All the substrates were transferred into an inert atmosphere glove box, and a Li electrolyte solution was deposited onto the surface of the cathode-containing substrates. The ion conductor formed from the Li electrolyte solution was a solid polymer electrolyte with a dissolved lithium salt. The anode containing substrate was placed upon the electrolyte with an overlap of ~900 mm$^2$ relative to the cathode containing substrate. The entire assembly was laminated at 120° C. for 5 min under vacuum at a pressure of ~1 atm. Then, the assembled devices were transferred into an oven, and were further cured at 130° C. After 16 h, the devices were cooled down and were measured in a two electrode electrochemical setup combined with an optical light source and spectrometer. Data were obtained by sequential oxidation and reduction under potentiostatic control cycling voltage between 1.5 and −0.9 V, the anode being connected to the positive lead at 25° C. Cycles were switched when the absolute residual current fell below 5 μA. Optical data were recorded every 1-5 s.

Table 7 shows the EC data of anode nanostructure thin film devices assembled with both sol-gel and nanostructure-based tungsten oxide cathodes. In these examples, the measured charge capacity is larger when the applied cell voltage is higher. Optical properties of the anode nanostructure thin film devices are also comparable to those of the sol-gel anode devices. Some anode nanostructure thin film devices show low transmission in all states due to the film haziness. As is known to those skilled in the art, haze refers to light that is scattered rather than specularly reflected or transmitted.

Figure 11A:
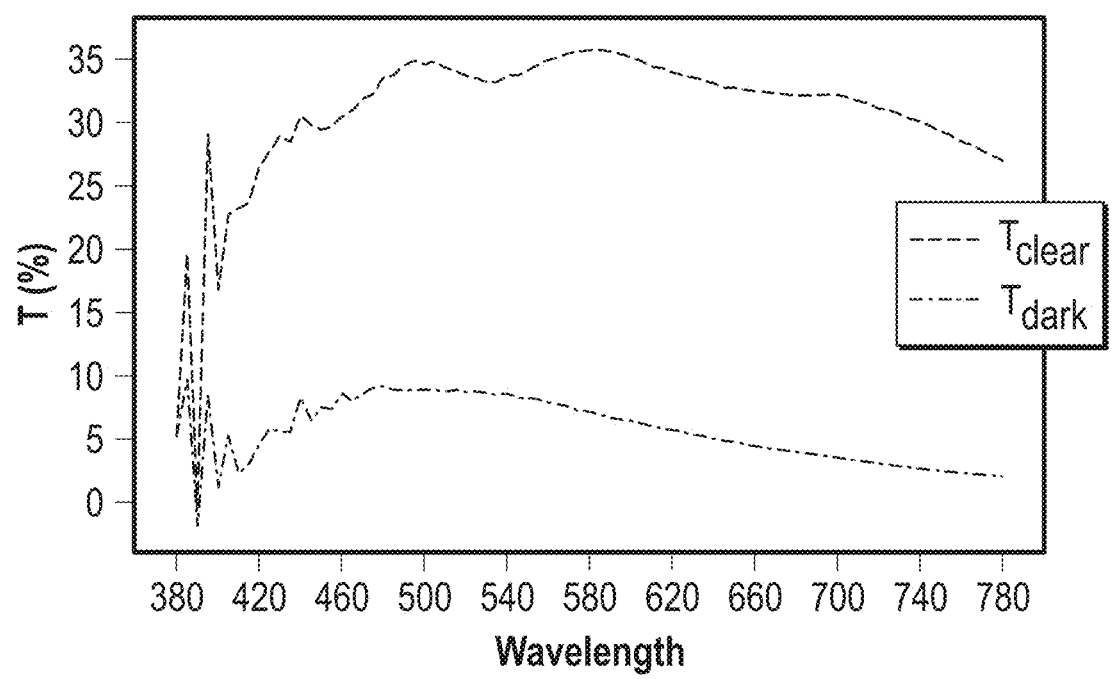
FIGS. 11a-11e show optical transmission spectra at the clear ($T_{clear}$) and dark states ($T_{dark}$) of several anode nanostructure thin film devices assembled with either sol-gel or nanostructure thin film cathodes.
Figure 11B:
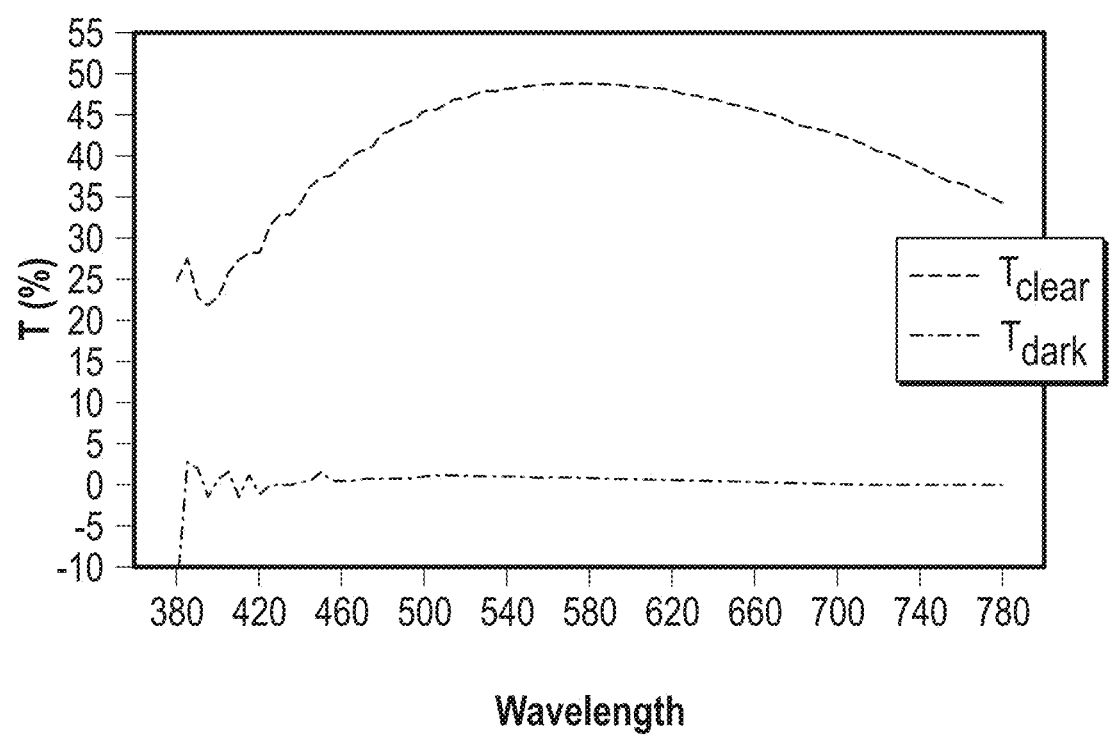
Figure 11C:
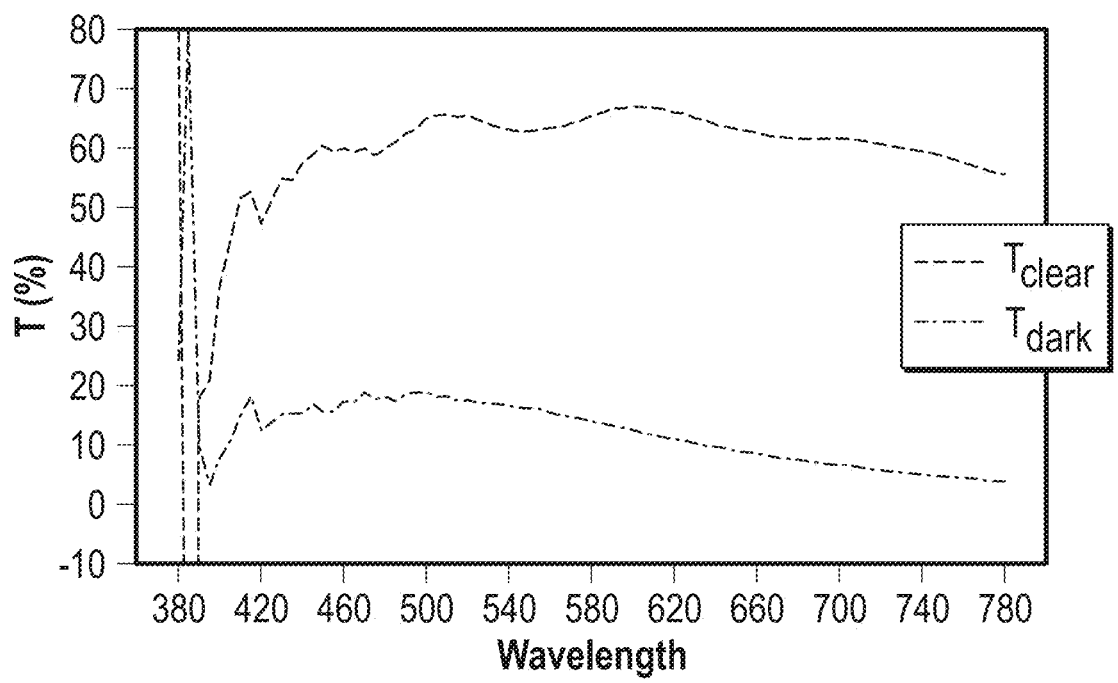
Figure 11D:
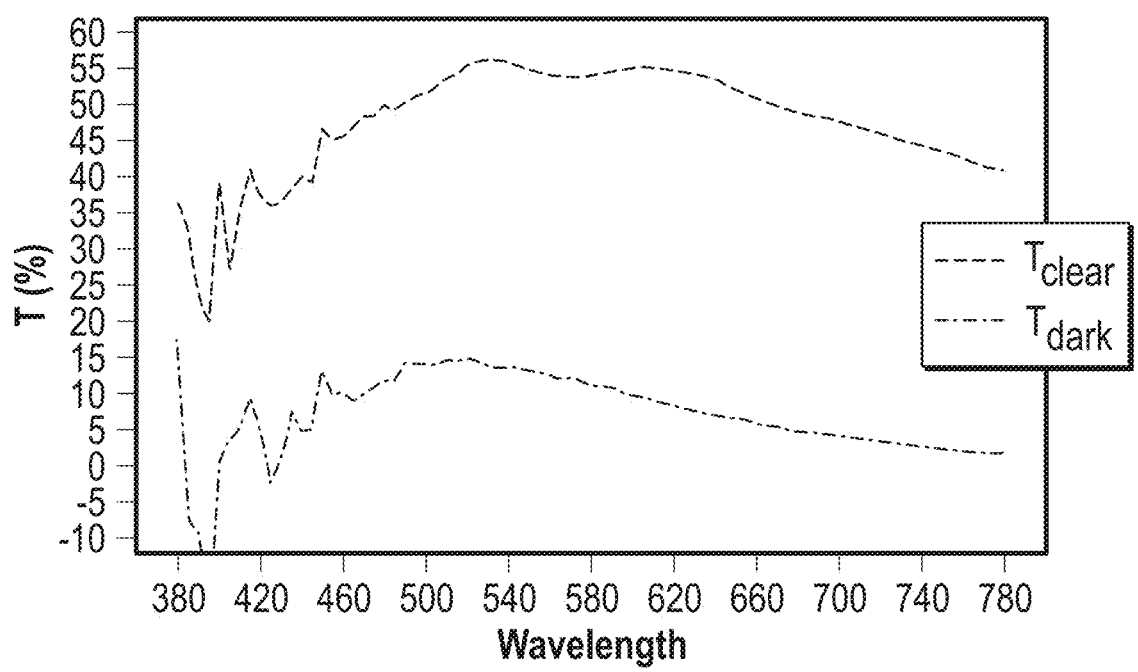
Figure 11E:
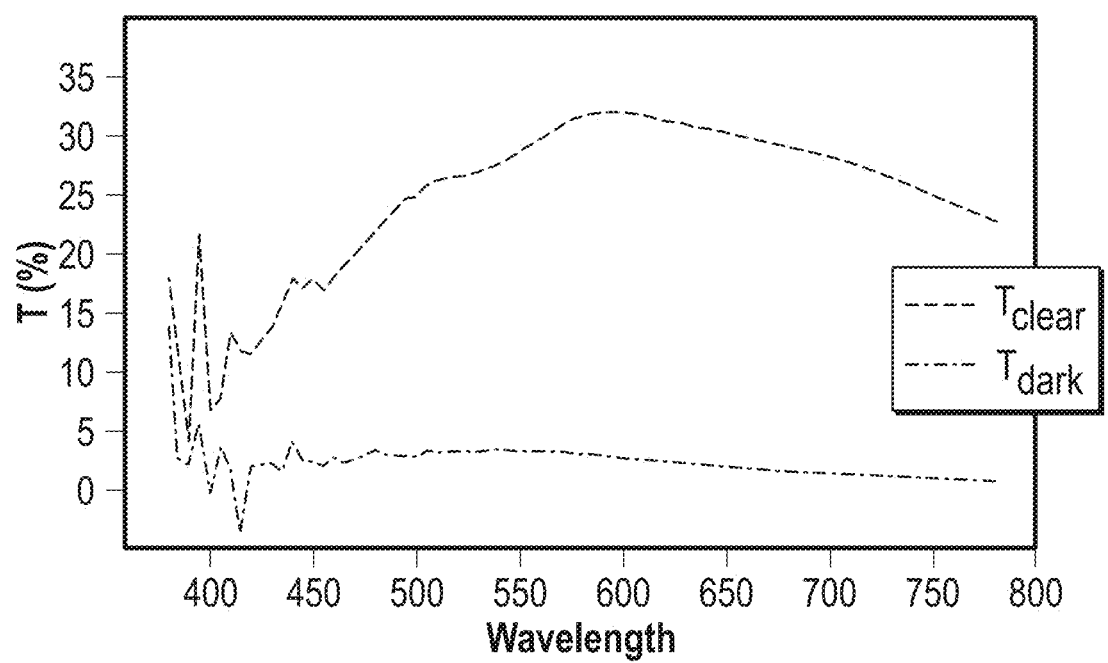

FIGS. 11a-11e show optical transmission spectra at the clear ($T_{clear}$) and dark states ($T_{dark}$) of anode nanostructure thin film devices assembled with either sol-gel or nanostructure thin film cathodes. FIGS. 11a-11d show optical transmission spectra of the devices of $Li_1Ni_{0.67}Sb_{0.33}O_2$, $Li_{1.077}Ni_{0.564}Sb_{0.359}O_2$, $Li_1Ni_{0.583}Al_{0.0553}Sb_{0.33}O_2$ and $Li_1Ni_{0.583}Zn_{0.083}Sb_{0.33}O_2$, respectively, demonstrating neutral color in the clear and dark states. FIG. 11d shows optical transmission spectra of the particle anode device of $Li_1Ni_{0.67}Nb_{0.33}O_2$, demonstrating highly neutral color in the dark state.

Figure 12A:
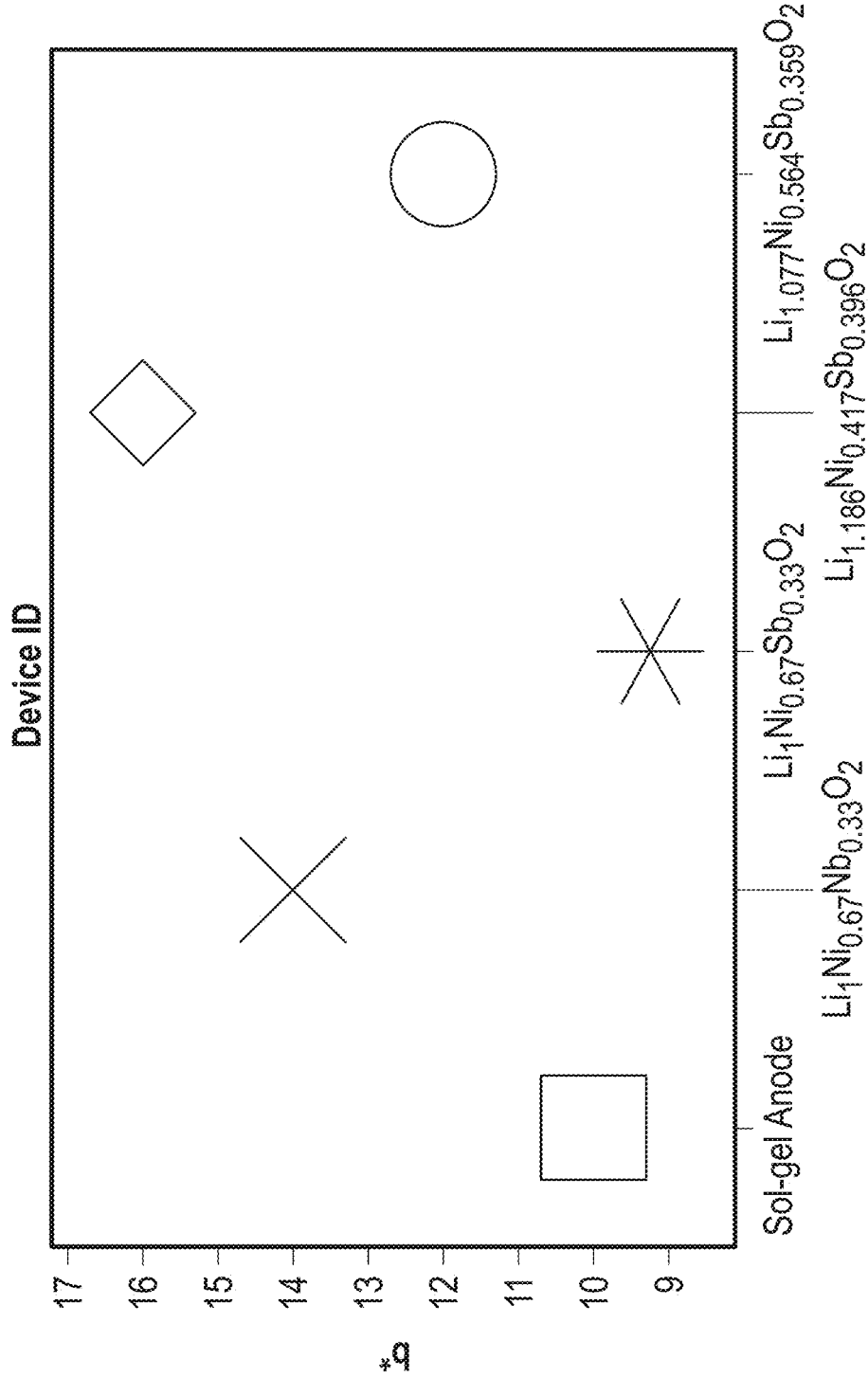
FIGS. 12a and 12b show the color characteristic data (b* at the clear state) of several anode nanostructure thin film devices assembled with a particle cathode and sol-gel cathode, respectively.
Figure 12B:
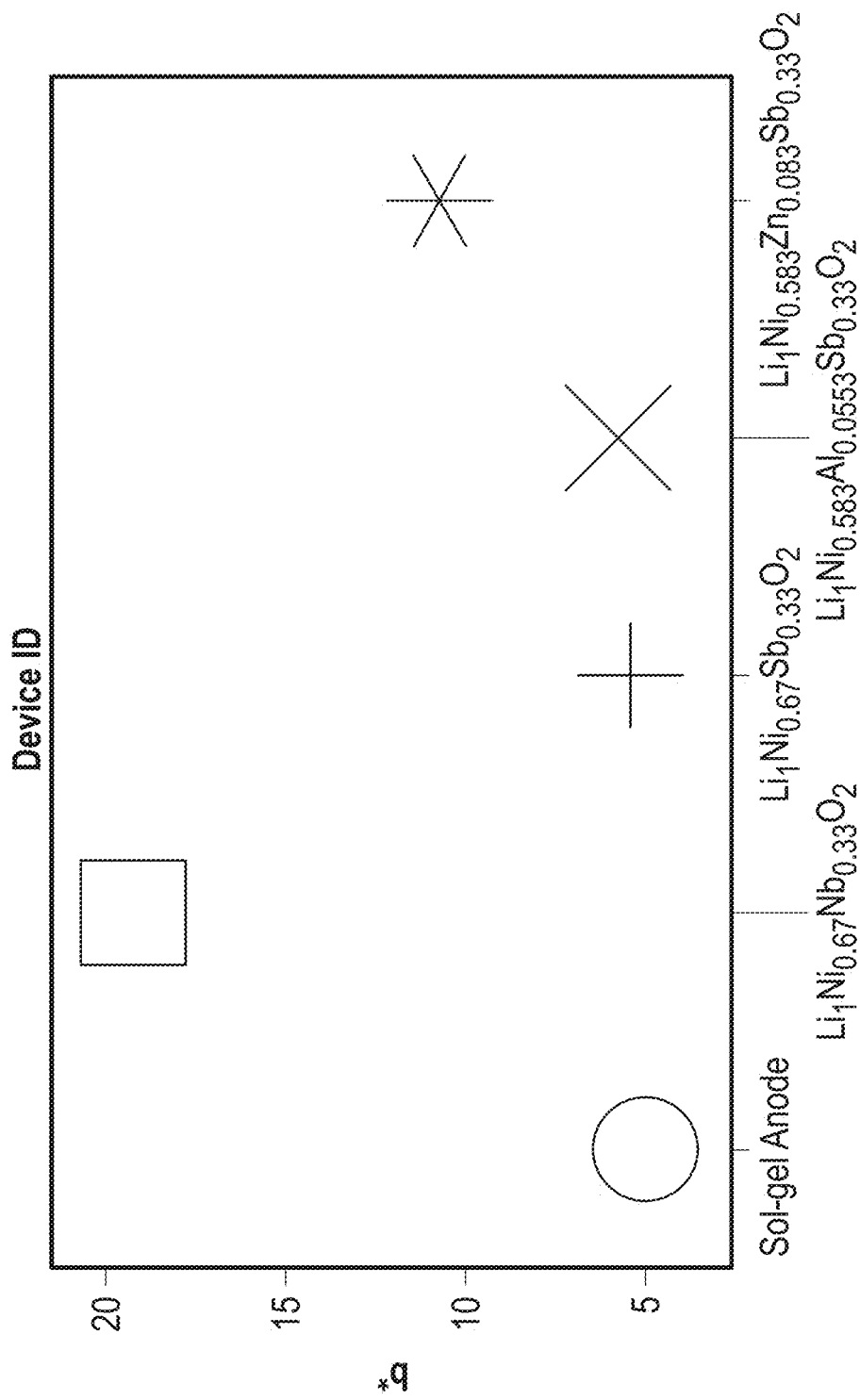

FIGS. 12a and 12b show the color characteristic data (b* at the clear state) of anode nanostructure thin film devices assembled with a particle cathode and sol-gel cathode, respectively. It is noted that b* of the devices using the nanostructure thin film cathode (FIG. 12a) are in general higher than those using sol-gel cathode (FIG. 12b), due to the slight haziness of particle cathode film. Also, high b* above 15 was found in the device of lithium nickel niobate because of film haziness.

Figure 13A:
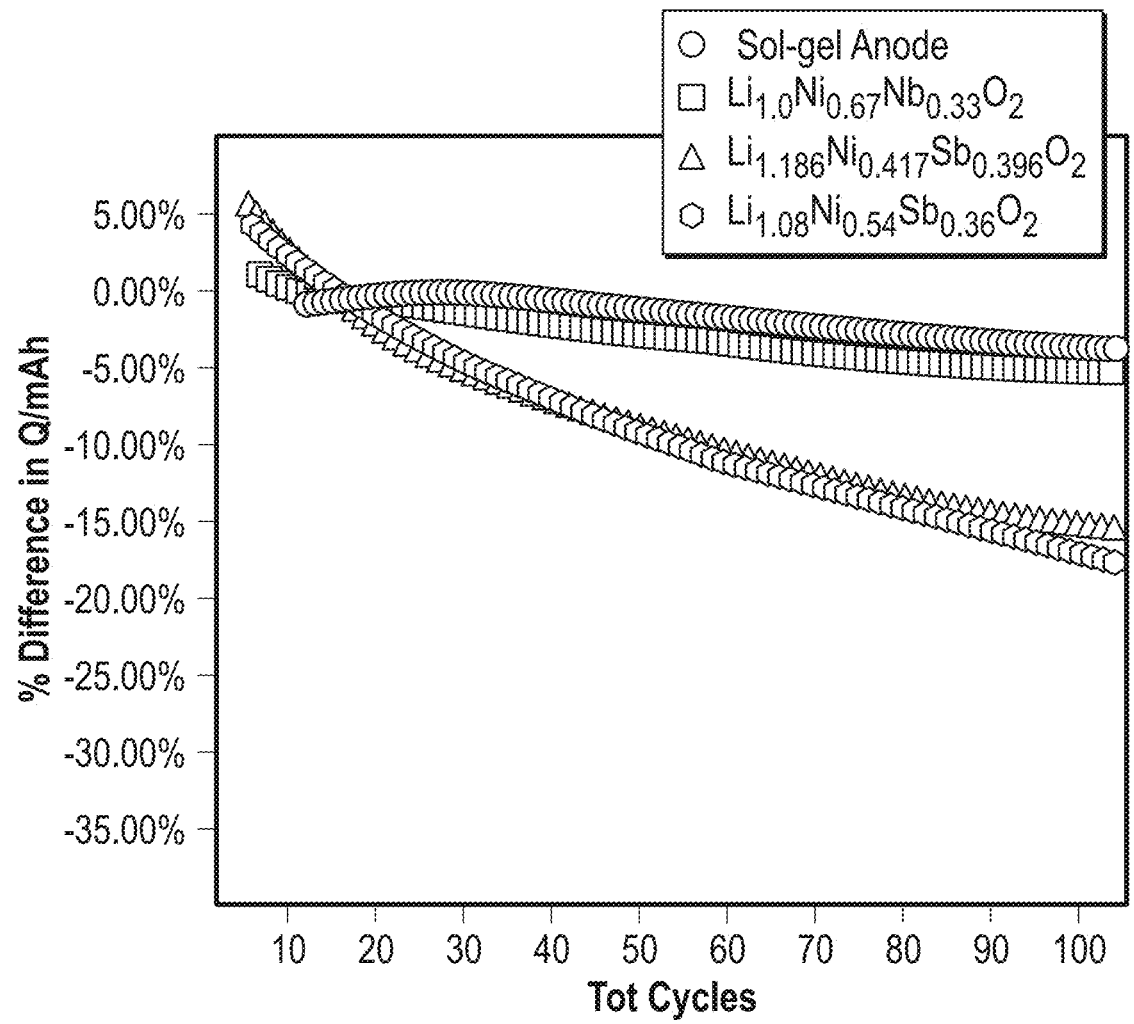
FIGS. 13a-13d show durability data at room temperature for several anode nanostructure thin film devices assembled with either nanostructure-based or sol-gel cathodes.
Figure 13B:
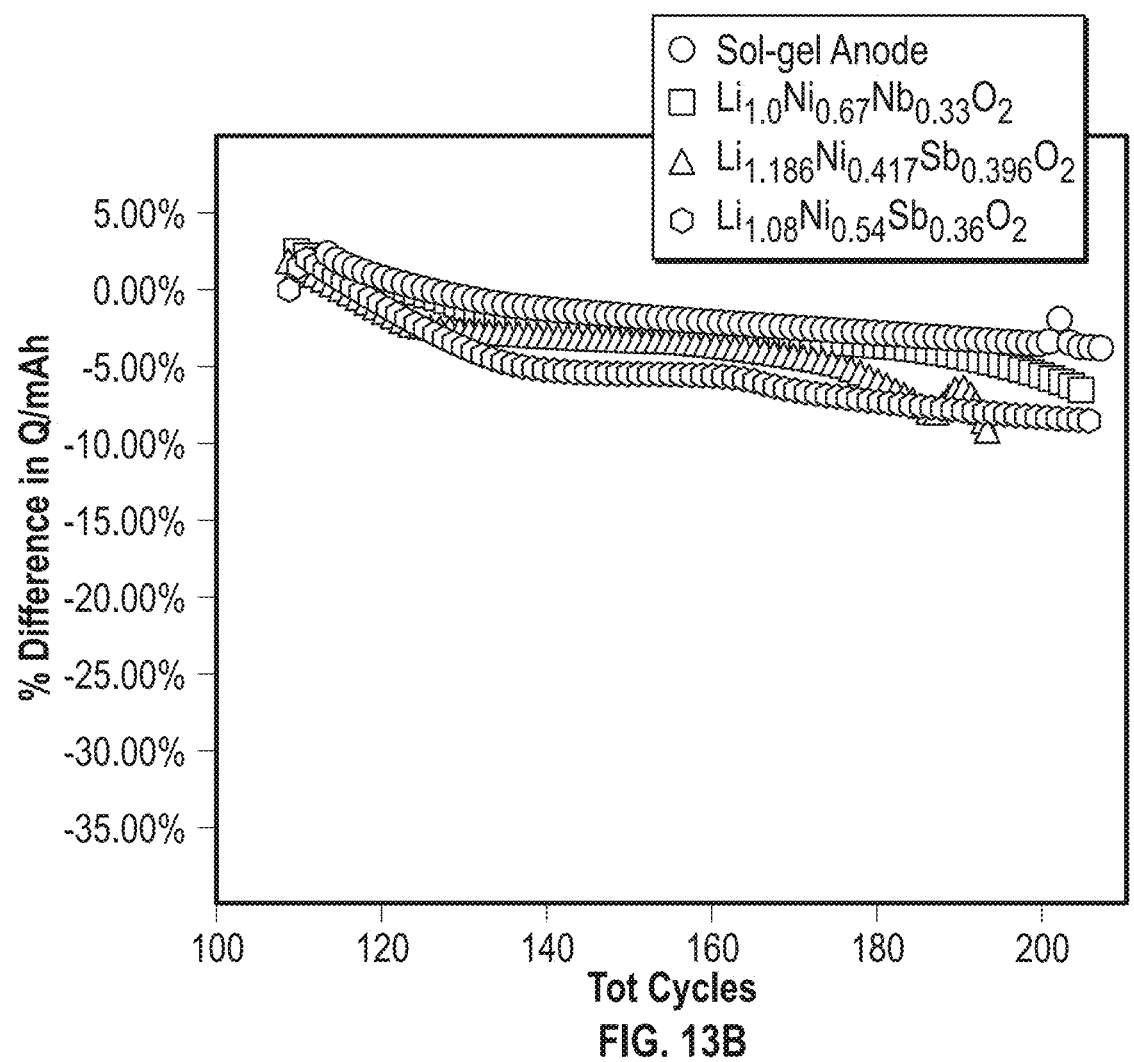
Figure 13C:
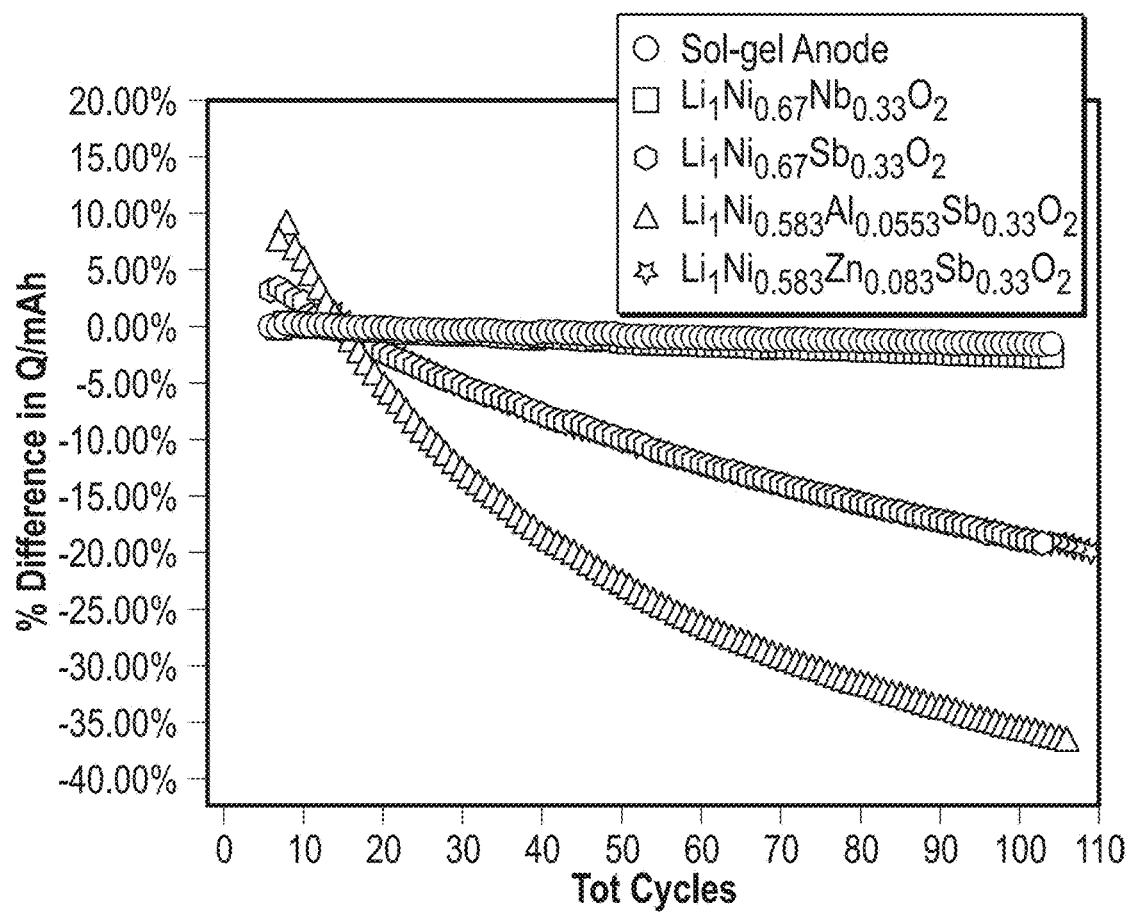
Figure 13D:
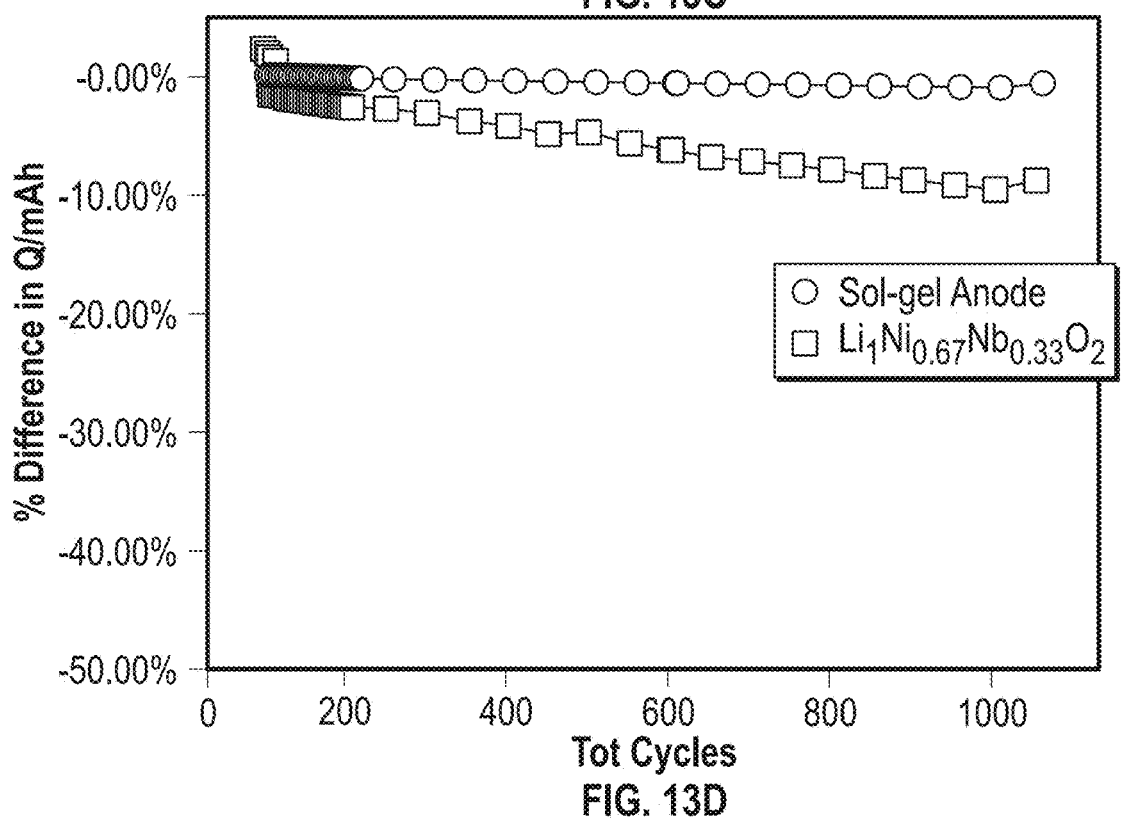

FIGS. 13a-13d show durability data at room temperature for anode nanostructure thin film devices assembled with either nanostructure-based or sol-gel cathodes. FIGS. 13a and 13b shows durability data of all-particle devices in the different cell voltage range, demonstrating significantly better durability at lower darkening cell voltage. FIG. 13c shows durability data of various anode nanostructure thin film devices assembled with sol-gel cathodes, demonstrating that the ordered rock-salt based anode nanostructure thin film in this example is significantly more durable than the layered particle anodes in this example. In FIG. 13d, shows the extended durability of the anode nanostructure thin film up to 1000 cycles. The devices containing the ordered rock-salt based lithium nickel niobate is the most durable in this example, showing only 10% capacity loss after 1000 cycles.

TABLE 7

Five-layer EC devices and EC data at 25° C.

| Example No. | Anode nanostructure thin film Composition | Cathode composition | Upper end of Cell voltage (mV) | Q (mC/cm²) | $T_{bleached}$ (%)* | $T_{dark}$ (%) |
|---|---|---|---|---|---|---|
| NA | Sol-gel anode | Nanoparticle h-WO₃ | 1700 | 27 | 66 | 4 |
| 1 | $Li_1Ni_{0.67}Sb_{0.33}O_2$ | Sol-gel WO₃ | 1500 | 22 | 35* | 7 |
| 2 | $Li_{1.077}Ni_{0.564}Sb_{0.359}O_2$ | Nanoparticle h-WO₃ | 1700 | 20 | 68 | 18 |
| 6 | $Li_{1.186}Ni_{0.417}Sb_{0.396}O_2$ | Nanoparticle h-WO₃ | 1700 | 18 | 20* | 0.2 |
| 9 | $Li_1Ni_{0.67}Sb_{0.33}O_2$ | Sol-gel WO₃ | 1500 | 10 | 60 | 20 |
|  | $Li_1Ni_{0.67}Sb_{0.33}O_2$ | Nanoparticle h-WO₃ | 1700 | 25 | 10* | 0.2 |
| 14 | $Li_1Ni_{0.583}Al_{0.0553}Sb_{0.33}O_2$ | Sol-gel WO₃ | 1500 | 25 | 62 | 15 |
| 15 | $Li_1Ni_{0.583}Zn_{0.083}Sb_{0.33}O_2$ | Sol-gel WO₃ | 1500 | 21 | 50 | 15 |
| 16 | $Li_1Ni_{0.633}Al_{0.022}Nb_{0.33}O_2$ | Sol-gel WO₃ | 1500 | 15 | Very hazy | Very hazy |
| 17 | $Na_{0.667}Ni_{0.667}Te_{0.33}O_2$ | Sol-gel WO₃ | 1500 | [−] |  |  |

*aLow $T_{clear}$ is due to film haziness, not dark color. $T_{clear}$ and $T_{dark}$ refer to transmission at 550 nm in the clear state and dark state, respectively.

Examples 18-20

Figure 14A:
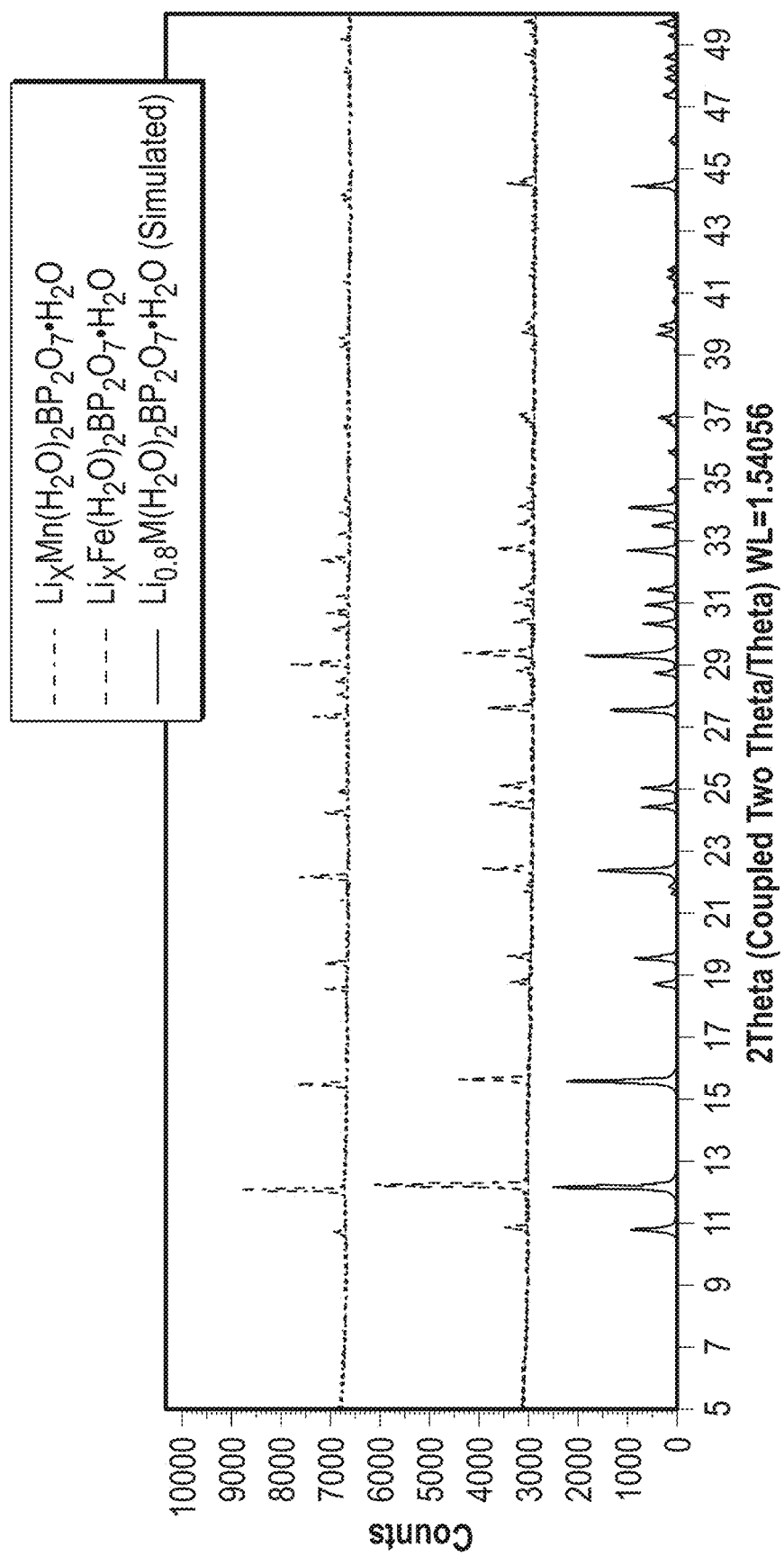
FIG. 14a shows an XRD pattern of $Li_xM(H_2O)2[BP_2O_8].H_2O$ where M is Mn, Fe and Ni.

FIG. 14a shows example XRD patterns of $Li_xM(H_2O)2[BP_2O_8]\cdot H_2O$ where M is Mn, Fe and Ni prepared using hydrothermal synthesis. This XRD pattern of the as-synthesized product may be fit to a crystal structure of the space group P6₅22 (#179), where the lattice parameters are a=b=approximately 9.37 (Angstroms), and c=approximately 15.61 (Angstroms). The borophosphate particles were prepared according to the following procedure.

A 125 mL steel autoclave vessel with a Teflon insert is used. 0.015 mol of $MCl_2 \cdot mH_2O$ where M=Mn, Fe, Ni (m=4 for Mn, 0 for Fe and 6 for Ni), 0.1 mmol $H_3BO_3$, 0.45 mmol LiOH and 47 mL 85 wt % o-$H_3PO_4$ (aq.) is added to 20 mL of DI $H_2O$. The reaction mixture is then loaded into the autoclave vessel, and heated to 175° C. for 72, 100 or 196 hours, respectively.

After the reaction products cool to room temperature, the supernatant liquid is discarded, and the precipitate product is collected into a centrifuge tube using DI water. DI water is used to dilute the product to a total of about 45 mL, and then centrifuged at 4500 RPM for 4 min. The supernatant is again discarded, and DI $H_2O$ is added to the precipitate to get 25 mL total volume. A second centrifuge procedure is performed at 4500 RPM for 4 min. The supernatant is again discarded, and the centrifuge procedure is repeated two more times, diluting each time with isopropanol. After decanting the isopropanol, the centrifuge tubes are dried in a vacuum environment. After drying, the powder is ground with a mortar and pestle and is further dried before the XRD pattern in FIG. 14 was taken.

The x-ray diffraction (XRD) pattern in FIG. 14a shows narrow peaks, indicating a high degree of crystallinity. Samples were analyzed using a Bruker D8 Advance diffractometer employing CuKα radiation. Scans were made in Bragg-Brentano geometry using a Ni filter between 5-110° 2Θ with a step size of 0.01°. A simulated PXRD pattern based on the crystal structure is also shown.

In these examples, the dried powder is size-reduced by grinding using an agitator bead mill. The mill has 30 mL bowls with $ZrO_2$ liners. The milling media are 1.0 mm diameter $ZrO_2$ balls. The primary particle size of the starting material is approximately between 5 and 500 nm, however, agglomerates>1 micron are also observed. Powders were hand-ground initially with an agate mortar and pestle.

1.5 (+/−0.1) g of borophosphate materials to be size-reduced by milling (e.g., product from the reaction batches using the synthetic procedure described above) is added to 9 mL of IPA (isopropanol) and 30 (+/−1) g of 1.0 mm $ZrO_2$ balls, in the bowl of the mill. The milling cycle parameters are 500 RPM for 3 min, followed by 5 min of rest time (to allow the mill bowls to cool). The cycle is repeated 20 times, for a total of approximately 1 hour active milling time. The formulation is then extracted from milling bowls and filtered to separate the milling media from the formulations.

Additional IPA is then added to the milling bowls and the mixture is shaken and sonicated to remove any remaining particles from the milling balls and bowl. This process is continued until a total formulation volume of 9-10 mL is achieved. Formulations are milled again using the same process and filtered. After the final formulation volumes are achieved, the slurries are characterized by TGA to determine the wt% solids.

Figure 14B:
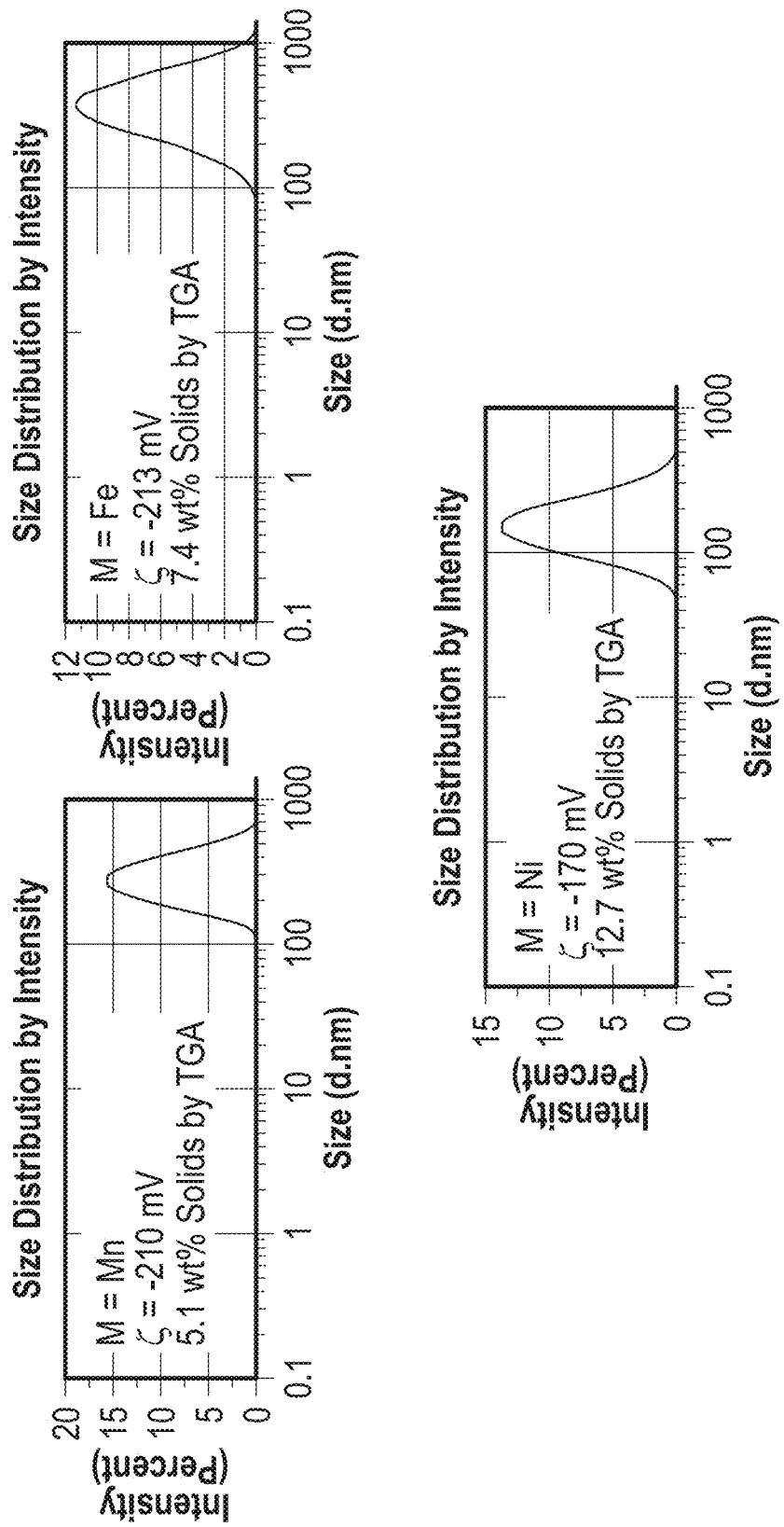
FIG. 14b shows particle size distributions of $Li_xM(H_2O)2[BP_2O_8].H_2O$ where M is Mn, Fe and Ni.

Aliquots of the formulations are then diluted and characterized by dynamic light scattering (DLS) for particle size analysis (FIG 14b). Resulting particle sizes after size-reduction for Mn, Fe and Ni are approximately 300, 400 and 165 nm, respectively. Zeta potentials are measured to be −210, −213 and −170 mV, respectively.

What is claimed is:

1. A method of manufacturing a thin film comprising:
   providing a plurality of crystalline anodic electrochromic particles;
   size-reducing the crystalline anodic electrochromic particles by grinding to produce crystalline anodic electrochromic nanostructures; and
   coating the crystalline anodic electrochromic nanostructures onto a substrate to produce an electrochromic thin film;
   wherein the crystalline anodic electrochromic nanostructures comprise an alkali metal oxide material.

2. The method of claim 1, wherein the crystalline anodic electrochromic nanostructures comprise a lithium nickel metal oxide material.

3. The method of claim 2, wherein the lithium nickel metal oxide material comprises Li, Ni, O, and at least one metal selected from the group consisting of Al, Ti, Zn, Nb, Mo, Sb, and Te.

4. The method of claim 2, wherein the lithium nickel oxide material comprises $Li_xNi_{(2-(4x/3))}(Sb_yNb_{1-y})_{(x/3)}O_2$, wherein x is from 1 to 1.2 and y is from 0 to 0.5.

5. The method of claim 1, wherein the crystalline anodic electrochromic nanostructures comprise Li, a first metal, a second metal, and O, wherein
   the first metal is selected from the group consisting of Mn, Fe, Co, Ni, and Sn;
   and the second metal is selected from the group consisting of P, B, Si, Ge, Sn, Sb and Te.

6. The method of claim 1, wherein the crystalline anodic electrochromic particles are produced using a thermal treatment at a temperature greater than 600° C.

7. The method of claim 1, wherein the electrochromic thin film does not include a binder material.

8. The method of claim 1, wherein the substrate comprises a material with a softening point less than 600° C.

9. The method of claim 1, wherein the substrate comprises a material with a softening point less than 300° C.

10. The method of claim 1, wherein the electrochromic thin film is an electrochromic anode layer in an electrochromic device.

11. An electrochromic multi-layer stack comprising:
    an electrochromic anode layer comprising crystalline anodic electrochromic nanostructures;
    an electrically conductive layer; and
    an outer substrate;
    wherein:
    the multi-layer stack is incorporated into an electrochromic device;
    the electrochromic anode layer does not include a binder;
    the crystalline anodic electrochromic nanostructures comprise an alkali metal oxide material;
    the crystalline anodic electrochromic nanostructures comprise a lithium nickel metal oxide material; and
    the lithium nickel oxide material comprises $Li_xNi_{(2-(4x/3))}(Sb_yNb_{1-y})_{(x/3)}O_2$, wherein x is from 1 to 1.2 and y is from 0 to 0.5.

12. The electrochromic multi-layer stack of claim 11, wherein the transparent substrate comprises a material with a softening point less than 600° C.

13. The electrochromic multi-layer stack of claim 11, wherein the transparent substrate comprises a material with a softening point less than 300° C.

14. The electrochromic device of claim 11, wherein the electrochromic device comprises a clear state and a dark state, wherein
    the clear state comprises a CIE-Lab L* in transmission from 50 to 95, b* in transmission from −8 to 8, and a* in transmission from −4 to 4; and
    the dark state comprises a CIE-Lab L* in transmission from 0 to 30, b* in transmission from −5 to −2, and a* in transmission from −7 to −5.

* * * * *